(12) United States Patent
Clevers et al.

(10) Patent No.: US 12,497,596 B2
(45) Date of Patent: Dec. 16, 2025

(54) HEPATOCYTE EXPANSION METHODS

(71) Applicant: Koninklijke Nederlandse Akademie Van Wetenschappen, Utrecht (NL)

(72) Inventors: Johannes Carolus Clevers, Utrecht (NL); Huili Hu, Utrecht (NL)

(73) Assignee: KONINKLIJKE NEDERLANDSE AKADEMIE VAN WETENSCHAPPEN, Utrecht (NL)

(*) Notice: Subject to any disclaimer, the term of this patent is extended or adjusted under 35 U.S.C. 154(b) by 891 days.

(21) Appl. No.: 17/296,049

(22) PCT Filed: Nov. 26, 2019

(86) PCT No.: PCT/EP2019/082618
§ 371 (c)(1),
(2) Date: May 21, 2021

(87) PCT Pub. No.: WO2020/109324
PCT Pub. Date: Jun. 4, 2020

(65) Prior Publication Data
US 2022/0017860 A1    Jan. 20, 2022

(30) Foreign Application Priority Data
Nov. 26, 2018  (GB) ..................................... 1819224

(51) Int. Cl.
C12N 5/071    (2010.01)
A61K 35/407   (2015.01)
A61P 1/16     (2006.01)

(52) U.S. Cl.
CPC ............ *C12N 5/067* (2013.01); *A61K 35/407* (2013.01); *A61P 1/16* (2018.01); *C12N 5/0671* (2013.01);
(Continued)

(58) Field of Classification Search
CPC .. C12N 5/067; C12N 5/0671; C12N 2500/32; C12N 2500/38; C12N 2501/11;
(Continued)

(56) References Cited

U.S. PATENT DOCUMENTS 5,981,483 A    11/1999   Dennis et al.
6,743,626 B2    6/2004   Baum et al.
(Continued)

FOREIGN PATENT DOCUMENTS

AU    2012265814 A2    12/2012
CN    101420964 A       4/2009
(Continued)

OTHER PUBLICATIONS

Park et al. Differential activities and mechanisms of the four R-spondinsin potentiating Wnt/b-catenin signaling. J Biol Chem .Jun. 22, 2018;293(25):9759-9769. Epub May 11, 2018. (Year: 2018).*

(Continued)

*Primary Examiner* — Peter Paras, Jr.
*Assistant Examiner* — Briana N Ebbinghaus
(74) *Attorney, Agent, or Firm* — McNeill PLLC

(57) ABSTRACT

This invention relates to culture methods and media for in vitro expansion of hepatocytes, particularly primary hepatocytes; hepatocyte cultures and organoids obtainable and obtained by said methods; and uses of said hepatocyte cultures and organoids.

11 Claims, 45 Drawing Sheets

(52) U.S. Cl.
CPC ...... *C12N 2500/32* (2013.01); *C12N 2500/38* (2013.01); *C12N 2501/11* (2013.01); *C12N 2501/117* (2013.01); *C12N 2501/119* (2013.01); *C12N 2501/12* (2013.01); *C12N 2501/148* (2013.01); *C12N 2501/15* (2013.01); *C12N 2501/415* (2013.01); *C12N 2501/727* (2013.01); *C12N 2501/999* (2013.01); *C12N 2503/04* (2013.01); *C12N 2513/00* (2013.01); *C12N 2533/90* (2013.01)

(58) Field of Classification Search
CPC ........ C12N 2501/117; C12N 2501/119; C12N 2501/12; C12N 2501/148; C12N 2501/15; C12N 2501/415; C12N 2501/727; C12N 2501/999; C12N 2503/04; C12N 2513/00; C12N 2533/90; C12N 2501/724; A61K 35/407; A61P 1/16; Y02A 50/30
See application file for complete search history.

(56) References Cited

U.S. PATENT DOCUMENTS

| | | | |
|---|---|---|---|
| 8,642,339 | B2 | 2/2014 | Sato et al. |
| 8,685,726 | B2 | 4/2014 | Schulz et al. |
| 10,597,633 | B2 | 3/2020 | Ortega et al. |
| 11,591,572 | B2 | 2/2023 | Clevers et al. |
| 2003/0003088 | A1 | 1/2003 | Tsao et al. |
| 2003/0129751 | A1 | 7/2003 | Grikscheit et al. |
| 2003/0138948 | A1 | 7/2003 | Fisk et al. |
| 2003/0138951 | A1 | 7/2003 | Yin |
| 2004/0175367 | A1 | 9/2004 | Herlyn et al. |
| 2004/0191902 | A1 | 9/2004 | Hambor et al. |
| 2004/0229355 | A1 | 11/2004 | Chen et al. |
| 2007/0010008 | A1 | 1/2007 | Tseng et al. |
| 2007/0036769 | A9 | 2/2007 | Li et al. |
| 2007/0122903 | A1 | 5/2007 | Rezania et al. |
| 2007/0128719 | A1 | 6/2007 | Tseng et al. |
| 2008/0112890 | A1 | 5/2008 | Elkes et al. |
| 2008/0113433 | A1 | 5/2008 | Robins et al. |
| 2008/0166327 | A1 | 7/2008 | Asahara et al. |
| 2008/0182328 | A1 | 7/2008 | Snyder et al. |
| 2008/0233088 | A1 | 9/2008 | Guha et al. |
| 2008/0242594 | A1 | 10/2008 | McKay et al. |
| 2009/0275067 | A1 | 11/2009 | Taniguchi et al. |
| 2010/0047853 | A1 | 2/2010 | Kuo et al. |
| 2010/0100396 | A1 | 4/2010 | Daven et al. |
| 2010/0275280 | A1 | 10/2010 | Clevers et al. |
| 2011/0008893 | A1 | 1/2011 | Sugimura et al. |
| 2011/0191868 | A1 | 8/2011 | Gupta et al. |
| 2012/0021513 | A1 | 1/2012 | Schulz et al. |
| 2012/0028355 | A1 | 2/2012 | Sato et al. |
| 2012/0196312 | A1 | 8/2012 | Sato et al. |
| 2012/0207744 | A1 | 8/2012 | Mendlein et al. |
| 2013/0005737 | A1 | 1/2013 | Prabhu et al. |
| 2013/0008956 | A1 | 1/2013 | Ashfield |
| 2013/0052729 | A1 | 2/2013 | Pourquie et al. |
| 2013/0089562 | A1 | 4/2013 | French et al. |
| 2013/0189327 | A1 | 7/2013 | Ortega et al. |
| 2013/0280809 | A1 | 10/2013 | Efe et al. |
| 2014/0044713 | A1 | 2/2014 | Lau et al. |
| 2014/0243227 | A1 | 8/2014 | Clevers et al. |
| 2014/0256037 | A1 | 9/2014 | Sato et al. |
| 2014/0302491 | A1 | 10/2014 | Nadauld et al. |
| 2015/0140013 | A1 | 5/2015 | Ramaswamy |
| 2015/0231201 | A1 | 8/2015 | Clevers et al. |
| 2015/0276719 | A2 | 10/2015 | Beekman et al. |
| 2016/0002595 | A1 | 1/2016 | Keller et al. |
| 2017/0191030 | A1 | 7/2017 | Ortega et al. |
| 2017/0275592 | A1 | 9/2017 | Sachs et al. |
| 2017/0342385 | A1 | 11/2017 | Sachs et al. |
| 2018/0066233 | A1 | 3/2018 | Ortega et al. |
| 2018/0072995 | A1 | 3/2018 | Sato et al. |
| 2018/0187191 | A1 | 7/2018 | Zeng |
| 2018/0221441 | A1 | 8/2018 | Clevers et al. |
| 2018/0258400 | A1 | 9/2018 | Ng et al. |
| 2019/0031992 | A1 | 1/2019 | Kerns et al. |
| 2019/0100728 | A1 | 4/2019 | Sato et al. |
| 2019/0383799 | A1 | 12/2019 | Beekman et al. |
| 2020/0172861 | A1 | 6/2020 | Ortega et al. |
| 2020/0377860 | A1 | 12/2020 | Freedman et al. |
| 2021/0040454 | A1 | 2/2021 | Clevers et al. |
| 2021/0047618 | A1 | 2/2021 | Clevers et al. |
| 2021/0333266 | A1 | 10/2021 | Beekman et al. |
| 2022/0340879 | A1 | 10/2022 | De Lau et al. |
| 2024/0076624 | A1 | 3/2024 | Beumer et al. |

FOREIGN PATENT DOCUMENTS

| | | |
|---|---|---|
| CN | 103180436 A | 6/2013 |
| CN | 103237888 A | 8/2013 |
| CN | 104508121 A | 4/2015 |
| EP | 0953633 A1 | 11/1999 |
| EP | 2412800 A1 | 2/2012 |
| EP | 2420566 A1 | 2/2012 |
| EP | 2772534 A1 | 9/2014 |
| EP | 2138571 B1 | 4/2017 |
| EP | 3318627 A1 | 5/2018 |
| EP | 3505620 B1 | 7/2023 |
| JP | 2012000097 A | 1/2012 |
| WO | 2004050827 A2 | 6/2004 |
| WO | 2004087896 A3 | 11/2004 |
| WO | 2005040391 A1 | 5/2005 |
| WO | 2005120547 A1 | 12/2005 |
| WO | 2007141657 A2 | 12/2007 |
| WO | 2007127454 A3 | 4/2008 |
| WO | 2008046649 A1 | 4/2008 |
| WO | 2008101215 A1 | 8/2008 |
| WO | 2009022907 A2 | 2/2009 |
| WO | 2009024595 A2 | 2/2009 |
| WO | 2010011352 A2 | 1/2010 |
| WO | 2010015938 A2 | 2/2010 |
| WO | 2010016766 A2 | 2/2010 |
| WO | 2010090513 A1 | 8/2010 |
| WO | 2010090513 A2 | 8/2010 |
| WO | 2010119819 A1 | 10/2010 |
| WO | 2010129294 A3 | 4/2011 |
| WO | 2011098402 A1 | 8/2011 |
| WO | 2011043591 A2 | 9/2011 |
| WO | 2012014076 A2 | 2/2012 |
| WO | 2012025725 A1 | 3/2012 |
| WO | 2012044992 A2 | 4/2012 |
| WO | 2012068251 A2 | 5/2012 |
| WO | 2012014076 A3 | 9/2012 |
| WO | 2012087965 A3 | 10/2012 |
| WO | 2012140274 A2 | 10/2012 |
| WO | 2012168930 A2 | 12/2012 |
| WO | 2012140274 A9 | 3/2013 |
| WO | 2013054112 A1 | 4/2013 |
| WO | 2013061608 A1 | 5/2013 |
| WO | 2013093812 A2 | 6/2013 |
| WO | 2013074681 A9 | 11/2013 |
| WO | 2014015777 A1 | 1/2014 |
| WO | 2014066649 A1 | 5/2014 |
| WO | 2014124527 A1 | 8/2014 |
| WO | 2014127170 A1 | 8/2014 |
| WO | 2014127219 A1 | 8/2014 |
| WO | 2014145389 | 9/2014 |
| WO | 2014159356 A1 | 10/2014 |
| WO | 2014170411 A1 | 10/2014 |
| WO | 2015040142 A1 | 3/2015 |
| WO | 2015173425 A1 | 11/2015 |
| WO | 2015179393 A1 | 11/2015 |
| WO | 2015200901 A1 | 12/2015 |
| WO | 2016016894 A1 | 2/2016 |
| WO | 2016056999 A1 | 4/2016 |
| WO | 2016083612 A1 | 6/2016 |
| WO | 2016083613 A2 | 6/2016 |
| WO | 2016094457 A1 | 6/2016 |
| WO | 2017048193 A1 | 3/2017 |
| WO | 2017120543 A1 | 7/2017 |
| WO | 2017149025 A1 | 9/2017 |
| WO | 2017205511 A1 | 11/2017 |
| WO | 2017220586 A1 | 12/2017 |

(56) References Cited

FOREIGN PATENT DOCUMENTS

| WO | 2018035138 | A1 | | 2/2018 | |
|---|---|---|---|---|---|
| WO | 2018052953 | A1 | | 3/2018 | |
| WO | WO-2018036119 | A1 | * | 3/2018 | ........... A61K 35/407 |
| WO | 2018102202 | A1 | | 6/2018 | |
| WO | 2019122388 | A1 | | 6/2019 | |
| WO | 2019228516 | A1 | | 12/2019 | |
| WO | 2020205755 | A1 | | 10/2020 | |
| WO | 2020234250 | A1 | | 11/2020 | |

OTHER PUBLICATIONS

Drost et al., "Organoid culture systems for prostate epithelial and cancer tissue", Nat. Protoc, Jan. 2016 (Jan. 21, 2016), 11(2): 347-358 (25 pages).

Drost et al., "Sequential cancer mutations in cultured human intestinal stem cells," Nature, vol. 521, May 7, 2015 (23 pages).

Duncan et al., "The ploidy-conveyor of mature hepatocytes as a source of genetic variation," Nature. Oct. 7, 2010; 467(7316): 707-710 (14 pages).

Eccles, "The epidermal growth factor receptor/Erb-B/HER family in normal and malignant breast biology," International Journal of Developmental Biology, University of the Basque Country Pres., 55(7-9): 685-696 (Jan. 1, 2011).

Eden et al., "Gorilla: a tool for discovery and visualization of enriched GO terms in ranked gene lists," BMC Bioinformatics 2009, 10:48.

Egerod et al., "A Major Lineage of Enteroendocrine Cells Coexpress CCK, Secretin, Gip, GLP-1, PYY, and Neurotensin but Not Somatostatin Endocrinology," Dec. 2012, 153(12):5782-5795.

Engelhardt et al., "Detection of α-foetoprotein in mouse liver differentiated hepatocytes before their progression through S phase," 1976 Nature 263: 146-148.

English translation of Official Action issued in Russian Application No. RU2018145539A, dated Mar. 19, 2021 (8 pages).

English translation of Search Report issued in Russian Application No. RU2018145539A, dated Mar. 19, 2021 (2 pages).

Evarts et al., "A precursor—product relationship exists between oval cells and hepatocytes in rat liver," Carcinogenesis 8(11): 1737-1740, 1987 (4 pages).

Fan et al. "Cholangiocarcinomas can originate from hepatocytes in mice," J Clin Invest, Aug. 2012, 122(8): 2911-2915 (5 pages).

Farin et al., "Basic and Translational-Alimentary Tract," (2012) Gastroenterology, 143:1518-1529.

Farin et al., "Visualization of a short-range Wnt gradient in the intestinal stem-cell niche," Nature, 340 Feb. 18, 2016 (15 pages).

Finnberg et al., "Application of 3D tumoroid systems to define immune and cytotoxic therapeutic responses based on tumoroid and tissue slice culture molecular signatures", Oncotarget, Sep. 15, 2017, 8(40): 66747-66757 (11 pages).

Finnberg et al., Abstract 3990: "Use of 3D tumoroid systems to define immune and cytotoxic therapeutic responses based on tumoroid and tissue slice culture molecular signatures : Cancer Research", Proceedings of the American Association for Cancer Research Annual Meeting 2017; Apr. 1-5, 2017; Washington, DC., Apr. 1, 2017 (4 pages).

Font-Burgada et al., "Hybrid Periportal Hepatocytes Regenerate the Injured Liver without Giving Rise to Cancer," 2015 Cell 162: 766-779 (15 pages).

Fuchs, Ota, "Inhibition of TGF-B Signaling for the Treatment of Tumor Metastatis and Fibrotic Diseases", Bentham Science Publishers Ltd.; (2011); 15 pages.

Furuyama et al., "Continuous cell supply from a Sox9-expressing progenitor zone in adult liver, exocrine pancreas and intestine," 2011 Nat Genet 43: 34-41 (11 pages).

Gao et al., "3D Spheroid/Organoid Models of Lung Cancer to Study Lung Cancer Pathogenesis and Testing of New Therapeutics", Journal of Thoracic Oncology, vol. 12, S1544, 1 page (Jun. 21, 2017).

Gerbal-Chaloin et al., "The WNT/b-Catenin Pathway Is a Transcriptional Regulator of CYP2E1, CYP1A2, and Aryl Hydrocarbon Receptor GeneExpression in Primary Human Hepatocytes," (2014) Molecular Pharmacology 86:624-634.

Ghosh et al., "Activity Assay of Epidermal Growth Factor Receptor Tyrosine Kinase Inhibitors in Triple-Negative Breast Cancer Cells Using Peptide-Conjugated Magnetic Beads," Assay and Drug Development Technologies, 11(1):44-51; Jan./Feb. 2013.

Greene et al., "Partial Hepatectomy in the Mouse: Technique and Perioperative Management," 2003 J Invest Surg 16: 99-102 (4 pages).

Grompe, M., "Liver Stem Cells, Where Art Thou?," Cell Stem Cell 15: 257-258, 2014 (2 pages).

Grompe,M. "Fah Knockout Animals as Models for Therapeutic Liver Repopulation," Hereditary Tyrosinemia, Advances in Experimental Medicine and Biology, 2017, 959: 215-230 (16 pages).

Grun et al., "Single-cell messenger RNA sequencing reveals rare intestinal cell types," Nature 525: 251-255 (Sep. 10, 2015).

Gui et al., "Heregulin protects mesenchymal stem cells from serum deprivation and hypoxia-induced apoptosis," Mol Cell Biochem, 305:171-178 (2007).

Gunawardene et al., "Classification and functions of enteroendocrine cells of the lower gastrointestinal tract, " Int. J. Exp. Path. (2011), 92: 219-231.

Harada et al., "Rapid formation of hepatic organoid in collagen sponge by rat small hepatocytes and hepatic nonparenchymal cells," Journal of Hepatology (2003) 39: 716-723.

Haramis et al., "De novo crypt formation and juvenile polyposis on BMP inhibition in mouse intestine." Science Mar. 12, 2004, 303(5664): 1684-1686.

Hashimshony et al., "CEL-Seq: Single-Cell RNA-Seq by Multiplexed Linear Amplification," Cell Reports 2: 666-673, Sep. 27, 2012.

Hashimshony et al., "CEL-Seq2: sensitive highly-multiplexed single-cell RNA-Seq," Genome Biol 17: 77, 2016 (7 pages).

Hayashi et al., "Establishment and characterization of a parietal endoderm-like cell line derived from Engelbreth-Holm-Swarm tumor (EHSPEL), a possible resource for an engineered basement membrane matrix," Science Direct Matrix Biology (2004); 16 pages.

Heuberger et al., "Shp2/MAPK signaling controls goblet/paneth cell fate decisions in the intestine," PNAS 111(9): 3472-3477 (Mar. 4, 2014).

Hirshhaeuser et al., "Efficacy of catumaxomab in tumor spheroid killing is mediated by its trifunctional mode of action," Cancer Immunol Immunother, Jul. 2010, 59: 1675-1684 (10 pages).

Hofer and Drenckhahn, "Cytoskeletal markers allowing discrimination between brush cells and other epithelial cells of the gut including enteroendocrine cells," Cell Biol (1996) 105:405-412.

Homback-Klonisch et al., Adult stem cells and their transdifferentiation potential-perspectives and therapeutic applications. J Mol Med (Berl). 2008; 86(12):1301-1314 (26 pages).

Jou et al., "Pluripotent Stem Cells Induced from Mouse Somatic Cells by Small-Molecule Compounds," Science, 341 (6146):651-654, science.org/doi/10.1126/science. 1239278; 8 pages (Jul. 18, 2013).

Howitt et al., "Tuft cells, taste-chemosensory cells, orchestrate parasite type 2 immunity in the gut," Science. Mar. 18, 2016; 351(6279): 1329-1333.

Hsieh et al., "Truncated Mammalian Notch1 Activates CBF1/RBPJk-Repressed Genes by a Mechanism Resembling That of Esptein-Barr Virus EBNA2," Molecular and Cellular Biology, (Mar. 1996). pp. 952-959.

Hu et al., "Direct Conversion of Normal and Alzheimer's Disease Human Fibroblasts into Neuronal Cells by Small Molecules," Cell Stem Cell 17: 204-212, Aug. 6, 2015 (36 pages).

Huang et al., "Direct Reprogramming of Human Fibroblasts to Functional and Expandable Hepatocytes," Cell Stem Cell 14: 370-384, Mar. 6, 2014 (15 pages).

Huang et al., "Induction of functional hepatocyte-like cells from mouse fibroblasts by defined factors," Nature Jul. 21, 2011, 475: 386-389 (7 pages).

Huch & Clevers, "Sox9 marks adult organ progenitors," Nature Genetics, Jan. 11, 2011, 43(1): 9-10 (3 pages).

(56) References Cited

OTHER PUBLICATIONS

Huch et al., In vitro expansion of single Lgr51 liver stem cells induced by Wnt-driven regeneration 2013 Nature 494: 247-250 (7 pages).
Huch et al., Long-Term Culture of Genome-Stable Bipotent Stem Cells from Adult Human Liver, (2015) Cell 160: 299-312 (24 pages).
Huch et al., "Urokinase-Type Plasminogen Activator Receptor Transcriptionally Controlled Adenoviruses Eradicate Pancreatic Tumors and Liver Metastasis in Mouse Models," NeoPlasia, 11(6): 518-528 (Jun. 2009).
Huschtscha et al., "Normal human mammary epithelial cells proliferate rapidly in the pressure of elevated levels of the tumor suppressors p53 and p21WAF1/CIP1," Journal of Cell Science, 122: 2989-2995 (2009).
Hynds et al., "The Relevance of Human Stem Cell-Derived Organoid Models for Epithelial Translational Medicine," Europe PMC Funders Group Stem Cells (Mar. 2013); 11 pages.
Garashi et al., "Characterization of Recombinant Human Fibroblast Growth Factor (FGF)-10 Reveals Functional Similarities with Keratinocyte Growth Factor (FGF-7)," The Journal of Biological Chemistry, (May 1998) 273(21): 13230-13235.
International Preliminary Report on Patentability of International Application No. PCT/EP2019/082618, dated Jun. 10, 2021 (13 pages).
U.S. Appl. No. 16/078,354, filed Aug. 21, 2018, Johannes Carolus Clevers.
U.S. Appl. No. 16/310,933, filed Dec. 18, 2018, Johannes Carolus Clevers.
U.S. Appl. No. 17/915,771, filed Sep. 29, 2022, Joep Beumer
Besser et al., "Modifying interleukin—2 concentrations during culture improves function of T cells for adoptive immunotherapy," Cytotherapy (2009) 11(2): 206-217 (12 pages).
Beumer et al., "High-Resolution mRNA and Secretome Atlas of Human Enteroendocrine Cells", Cell, May 13, 2020, 181(6): 1291-1306 (40 pages).
Chang-Graham et al., "Human Intestinal Enteroids With Inducible Neurogenin-3 Expression as a Novel Model of Gut Hormone Secretion", Cellular and Molecular Gastroenterology, Sep. 10, 2019, 8(2): 209-229 (21 pages).
Dwyer et al., "A three-dimensional co-culture system to investigate macrophage-dependent tumor cell invasion," Journal of Biological Methods, vol. 3(3), e49, 10 pages (2016).
Gehart et al., "Identification of Enteroendocrine Regulators by Real-Time Single-Cell Differentiation Mapping," Cell 176: 1158-1173, Feb. 21, 2019 (33 pages).
International Search Report and Written Opinion of International Application No. PCT/EP2021/058527, dated Aug. 25, 2021 (23 pages).
Neal et al., "Organoid Modeling of the Tumor Immune Microenvironment," Cell. Dec. 13, 2018; 175(7):1972-1988.e16. doi: 10.1016/j.cell.2018.11.021 (34 pages).
Sinagoga et al., "Deriving functional human enteroendocrine cells from pluripotent stem cells," Development (2018) 145, dev165795, doi:10.1242/dev.165795 (11 pages).
Santhanam et al., "Upregulated Pathways and Products of Tryptophan Metabolism is Associated with the Neoplastic Transition in the Colon Epithelium," Gastroenterology 2016, 150, 4, suppl 1, p. S-492, Abstract Su1195(1 page).
Casey et al., "Theory of cell fate," WIREs Syst Biol Med, 2020; 12:e1471 (11 pages).
Supek et al., "REVIGO Summarizes and Visualizes Long Lists of Gene Ontology Terms," PLoS ONE 6(7): 2011; e21800, 9 pages.
Swenson, E., "Direct Conversion of Mouse Fibroblasts to Hepatocyte-Like Cells Using Forced Expression of Endodermal Transcription Factors," 2012 Hepatology 55(1): 316-318 (9 pages).
Takeda et al., "Inter-conversion between intestinal stem cell populations in distinct niches," Science. Dec. 9, 2011; 334(6061): 1420-1424.

Tanimizu et al., "Notch signaling controls hepatoblast differentiation by altering the expression of liver-enriched transcription factors," Journal of Cell Science, 2014, 117(15): 3165-3174.
Tanimizu et al., "Sry HMG Box Protein 9-positive (Sox9+) Epithelial Cell Adhesion Molecule-negative (EpCAM-) Biphenotypic Cells Derived from Hepatocytes Are Involved in Mouse Liver Regeneration," J Biol Chem, 289(11): 7589-7598; 2004 (12 pages).
Tarlow et al., "Bipotential Adult Liver Progenitors Are Derived from Chronically Injured Mature Hepatocytes," Nov. 6, 2014, Cell Stem Cell 15: 605-618 (15 pages).
Terry et al., "Impaired enteroendocrine development in intestinal-specific Islet1 mouse mutants causes impaired glucose homeostasis," Am J Physiol Gastrointest Liver Physiol 307: G979-G991, Sep. 11, 2014.
Tetteh et al., "Replacement of Lost Lgr5-Positive Stem Cells through Plasticity of Their Enterocyte-Lineage Daughters," Cell Stem Cell 18: 203-213, Feb. 4, 2016.
"The Wnt Family of Secreted Proteins", R&D Systems' 2004 Catalog, 7 pages (Jan. 1, 2004).
Thenappan et al., New Therapeutics Targeting Colon Cancer Stem Cells, Curr Colorectal Cancer Rep, vol. 5, No. 4, 2009 (12 pages).
Tian et al., "Integrin-specific hydrogels as adaptable tumor organoids for malignant Band T cells", Biomaterials, Sep. 11, 2015, 73: 110-119 (21 pages).
Tisato et al., "Upregulation of SOCS-1 by Nutlin-3 in acute myeloid leukemia cells but not in primary normal cells," Clinics (2014) pp. 68-74.
Tojo et al., "The ALK-5 inhibitor A-83-01 inhibits Smad signaling and epithelial-to-mesenchymal transition bytransforming growth factor-beta," Cancer Sci, 2005, 96(11): 791-800.
Trierweiler et al., "The transcription factor c-JUN/AP-1 promotesHBV-related liver tumorigenesis in mice," Cell Death and Differentiation 23: 576-582 (2016).
Tsai et al., "LGR4 and LGR5 Function Redundantly During Human Endoderm Differentiation", Cellular and Molecular Gastroenterology and Hepatology, 2016, 2: 648-662.
Upton et al., "De novo synthesis of T cells from mPB CD34+ cells cultured in a 3-dimensional thymic organoid," Blood 102(11): 279a, Nov. 16, 2003 (2 pages).
Van Amerongen et al., "Developmental Stage and Time Dictate the Fate of Wnt/β-Catenin-Responsive Stem Cells in the Mammary Gland," Sep. 7, 2012, Cell Stem Cell 11: 387-400 (14 pages).
Van de Wetering et al., "Prospective Derivation of a Living Organoid Biobank of Colorectal Cancer Patients," Cell, 161, May 7, 2015, 161: 933-945 (14 pages).
Van Es et al., "Dll1 marks early secretory progenitors in gut crypts that can revert to stem cells upon tissue damage," Nat Cell Biol. Oct. 2012; 14(10): 1099-1104.
Van Es et al., "Notch/γ-Secretase inhibition turns proliferative cells in intestinal crypts and adenomas into goblet cells," vol. 435; 5 pages, Jun. 2005.
Vaughan et al., "Lineage-negative Progenitors Mobilize to Regenerate Lung Epithelium after Major Injury," HHS Public Access Nature (Jan. 29, 2015); 25 pages.
Verbeke et al., "Humanization of the mouse mammary gland by replacement of the luminal layer with genetically engineered preneoplastic human cells," Breast Cancer Research (2014) 16: 504, 20 pages.
Verkhovskaya et al. Deystvie alkoksizameshchyonnykh glitserina na morfofunktsionalnye svoystva perevivaemoy kultury (Effect of Alkoxy-substituted of Glycerol on Morphofunctional Properties of a Passaged Culture), Kriobiologiya, 1990 (4 pages).
Verma et al., "Sustained Telomere Length in Hepatocytes and Cholangiocytes with Increasing Age in Normal Liver," 2012, Hepatology 56:1510-1520 (11 pages).
Vickaryous et al., "Human cell type diversity, evolution, development, and classification with special reference to cells derived from the neural crest,": Biol Rev Camb Philos Soc., 81(3):425-55, Aug. 2006 (31 pages).
Vincan et al., "Frizzled-7 dictates three-dimensional organization of colorectal cancer cell carcinoids", Oncogene 2007, 26: 2340-2352.
Voronkov et al., "Wnt/beta-Catenin Signaling and Small Molecule Inhibitors," Current Pharmaceutical Design, 19: 634-664 (2013).

(56) References Cited

OTHER PUBLICATIONS

Wang et al., "Self-renewing diploid Axin2l cells fuel homeostatic renewal of the liver," Aug. 13, 2015, Nature, 524: 180-185 (18 pages).
Williams et al., "The Role of the Wnt Family of Secreted Proteins in Rat Oval Stem" Cell-Based Liver Regeneration Wnt1 Drives Differentiation, American Journal of Pathology, Jun. 2010, 176(6): 2732-2742.
Wouters et al., "Evolution of distinct EGF domains with specific functions," Protein Science (2005) 14: 1091-1103.
Wu et al., "FGF19 Regulates Cell Proliferation, Glucose and Bile Acid Metabolism vai FGFR4-Dependent and Independent Pathways," PLOS One, Mar. 2011, 6(3): e17868, pp. 1-11.
Yan et al., "The intestinal stem cell markers Bmi1 and Lgr5 identify two functionally distinct populations," PNAS 109 (2): 466-471 (Jan. 10, 2012).
Yang et al., "Differentiation of Human Induced-Pluripotent Stem Cells into Smooth-Muscle Cells: Two Novel Protocols," PLoS One, 2016; 11(1):e0147155 (11 pages).
Yang et al., "In vitro trans-differentiation of adult hepatic stem cells into pancreatic endocrine hormoneproducing cells," PNAS, Jun. 11, 2002, 99(12): 8078-8083.
Yang et al., "Beta-catenin signaling in murine liver zonation and regeneration: A Wnt-Wnt situation!" (2014) Hepatology 60(3): 964-976.
Yanger et al., "Adult Hepatocytes Are Generated by Self-Duplication Rather than Stem Cell Differentiation," Sep. 4, 2014, Cell Stem Cell 15: 340-349 (10 pages).
Yanger et al., "Robust cellular reprogramming occurs spontaneously during liver regeneration," 2013, Genes Dev 27: 719-724 (8 pages).
Yimlamai et al., "Hippo Pathway Activity Influences Liver Cell Fate," Jun. 5, 2014, Cell, 157(6): 1324-1338 (23 pages).
Yin et al., "Niche-independent high-purity cultures of Lgr5+ intestinal stem cells and their progeny," Nat Methods. Jan. 2014; 11(1): 106-112.
Yokoyama et al., "Regeneration of Mouse Liver after Partial Hepatectomy," 1953 Cancer Res 13: 80-85 (7 pages).
Yoshimura et al., "Vascular endothelial cells and smooth muscle cells mediate carbachol-induced hepatocyte proliferation via muscarinic receptors and IP3/PKC signaling cascades," Cell Biol Int. Apr. 2009; 33(4): 516-23.
Yu et al., "Ex vivo culture of circulating breast tumor cells for individualized testing of drug susceptibility," HHS Public Access Science (Jul. 11, 2014); 345(6193): 216-220.
Zaret et al., "Genetic programming of liver and pancreas progenitors: lessons for stem-cell differentiation," Nature Reviews, May 2008, 9: 329-340.
Zauli et al., "MDM2 Antagonist Nutlin-3 Suppresses the Proliferation and Differentiation of Human Pre-Osteoclasts Through a p53-Dependent Pathway," Journal of Bone and Mineral Research vol. 22, No. 10; (2007) 10 pages.
Zhu et al., "Chemical Strategies for Stem Cell Biology and Regenerative Medicine", The Annual Review of Biomedical Engineering Apr. 20, 2011, 13(1): 73-90.
Zhu et al., "Mouse liver repopulation with hepatocytes generated from human fibroblasts," Apr. 3, 2014, Nature 508 (7494): 93-97 (34 pages).
Zilberberg et al., "A Rapid and Sensitive Bioassay to Measure Bone Morphogenetic Protein Activity," BMC Cell Biology BioMed Central (Sep. 19, 2007), vol. 8, Article 41, 10 pages.
Zimmerman, "Lung organoid culture," Differentiation; Research in Biological Diversity, 36(1): 86-109 (1987).
Zong et al., "Notch signaling controls liver development by regulating biliary differentiation," Development 136: 1727-1739 (2009).
Zuo et al., "P63 + Krt5 + distal airway stem cells are essential for lung regeneration," Nature (2014) 517:616-620, 17 pages.
Basak et al., "Induced quiescence of Lgr5+ stem cells in intestinal organoids enables differentiation of hormone-producing enteroendocrine cells," Cell Stem Cell.; 20 (2), 177-190.e4 (2017).
Beumer et al., "Enteroendocrine cells switch hormone expression along the crypt-to-villus BMP signalling gradient," Nature Cell Biology. 20 (8), pp. 909-916 (2018).
Blume et al., "Temperature corrected transepithelial electrical resistance (TEER) measurement to quantify rapid changes in paracellular permeability," Die Pharmazie; 65 (1), pp. 19-24 (2010).
Boj et al., "Forskolin-induced swelling in intestinal organoids: An in vitro assay for assessing drug response in cystic fibrosis patients," Journal of Visualized Experiments, 2017 (120), pp. 1-12 (2017).
De Lau et al., "The R-spondin protein family," Genome Biology. 13:242, 2012 (10 pages).
Dinter et al., "Pharmacologic strategies for assaying BMP signaling function," (2019) Methods Mol Biol; 1891:221-233 (13 pages).
Drakos et al., "Inhibition of p53-Murine Double Minute 2 Interaction by Nutlin-3A Stabilizes p53 and Induces Cell Cycle Arrest and Apoptosis in Hodgkin Lymphoma," Clin Cancer Res 2007; 13 (11), Jun. 1, 2007, pp. 3380-3387 (8 pages).
Grimaldi et al., A Cell Model Suitable for a High-Throughput Screening of Inhibitors of the Wnt/β-catenin pathway, Frontiers in Pharmacology, vol. 9, Article 1160, Oct. 2018 (3 pages).
Gupta et al., "Scaffolding kidney organoids on silk," Tissue Eng Regen Med. May 2019 ; 13(5): 812-822 (20 pages).
Hosic et al., "Cholinergic Activation of Primary Human Derived Intestinal Epithelium Does Not Ameliorate TNF-a Induced Injury," Cellular and Molecular Bioengineering, vol. 13, No. 5, Oct. 2020 (2020) pp. 487-505 (19 pages).
International Search Report and Written Opinion of International Application No. PCT/EP2022/069354, dated Nov. 1, 2022, by Examiner (14 pages).
Kucab et al., "Selection of TP53-mutated human TP53 knock-in (Hupki) mouse embryo fibroblasts using the MDM2 inhibitor Nutlin-3a," Mutagenesis, vol. 29 No. 1 pp. 79-96, Abstracts of the 36th Annual Meeting of the United Kingdom Environmental Mutagen Society, Jul. 15-17, 2013 at The University of the West of England, Bristol, UK (18 pages).
Leonard et al., "Screening of Budesonide Nanoformulations for Treatment of Inflammatory Bowel Disease in an Inflamed 3D Cell-Culture Model," Altex, 29(3):275-285, 2012 (11 pages).
Martínez-Maqueda, et al., "HT29 Cell Line. in The Impact of Food Bio-Actives on Gut Health: In Vitro and Ex Vivo Models," Verhoeckx, K. et al. (eds), Cham 20 (CH): Springer, 113-124 (2015).
Miao, Y. et al., "Next-generation surrogate Wnts support organoid growth and deconvolute Frizzled pleiotropy in vivo." Cell Stem Cell. 27 (5), 840-851 (2020).
Miyachi et al., "Restoration of p53 Pathway by Nutlin-3 Induces Cell Cycle Arrest and Apoptosis in Human Rhabdomyosarcoma Cells," Clin Cancer Res, 15(12), Jun. 15, 2009, pp. 4077-4084 (8 pages).
Noben et al., "Human intestinal epithelium in a dish: Current models for research into gastrointestinal pathophysiology," United European Gastroenterology Journal 2017, vol. 5(8) 1073-1081 (9 pages).
Nusse et al., Wnt/β-Catenin Signaling, Disease, and Emerging Therapeutic Modalities, Jun. 1, 2017, Cell 169 (6):985-999.
Romier et al., "New cell-based HTRF® assays for the exploration of Wnt signalling pathway" Cisbio Bioassays, 2015 (1 page).
Sanchez-Duffhues, "Bone morphogenetic protein receptors: Structure, function and targeting by selective small molecule kinase inhibitors," (2020) Bone 138:115472 (13 pages).
Schmohl et al., "Characterization of immunologically active drugs in a novel organotypic co-culture model of the human gut and whole blood," International Immunopharmacology 14 (2012) pp. 722-728 (7 pages).
Schutgens et al., "Tubuloids derived from human adult kidney and urine for personalized disease modeling," Nature Biotechnology 37: 303-313, (2019).
Singh et al., "Review on EGFR Inhibitors: Critical Updates," (2016) Mini-Reviews in Medicinal Chemistry 16:1134-1166.
Snyder et al., "Materials and Microenvironments for Engineering the Intestinal Epithelium," Ann Biomed Eng., vol. 48, No. 7, Feb. 4, 2020, pp. 1916-1940.

(56) References Cited

OTHER PUBLICATIONS

Srinivasan et al., "TEER measurement techniques for in vitro barrier model systems." Journal of Laboratory 5 Automation. 20 (2), 107-126 (2015).

Tran and Zheng, "Modulating the wnt signaling pathway with small molecules," (2017) Protein Science 26:650-661 (12 pages).

Trenker and Jura, "Receptor tyrosine kinase activation: From the ligand perspective," Current Opinion in Cell Biology, 2020, 63:174-185 (12 pages).

Vadstrup et al., "Ex Vivo Assay of Intestinal Mucosal Biopsies in Crohn's Disease: Reflects Inflammation and Drug Effects," PLoS One, May 2016 (18 pages).

Van der Vaart et al., "Modelling of primary ciliary dyskinesia using patient-derived airway organoids," EMBO reports; 2021; 22: e52058 (16 pages).

Van Es et al., "Wnt signalling induces maturation of Paneth cells in intestinal crypts," Nature Cell Biology. 7(4), 381-386 (2005).

Vanuytsel et al., "Major Signaling Pathways in Intestinal Stem Cells," Biochim Biophys Acta. Feb. 2013; 1830(2): 2410-2426 (42 pages).

Villalonga-Planells et al., "Activation of p53 by Nutlin-3a Induces Apoptosis and Cellular Senescence in Human Glioblastoma Multiforme," PLoS One, vol. 6, Issue 4, Apr. 2011, e18588 (12 pages).

Zhao Y, et al. Cancer Research, 101st Annual Meeting of the American Association for Cancer Research, AACR 2010, Washington, DC, United States, Apr. 17, 2010-21, (Apr. 15, 2010) vol. 70, No. 8, Supp. Suppl. 1. Abstract No. 4529 (3 pages).

Kohno et al., "Effects of hyaluronidase on doxorubicin penetration into squamous carcinoma multicellular tumor spheroids and its cell lethality," J Cancer Res Clin Oncol. 1994; 120(5):293-7 (6 pages).

Koo et al., "Controlled gene expression in primary Lgr5 organoid cultures," Nat Methods. 2012 9(1): 81-84 (4 pages).

Kramer et al., "Small-Molecule Inhibitors of GSK-3: Structural Insights and Their Application to Alzheimer's Disease Models," International Journal of Alzheimer's Disease, vol. 2012, Article ID 381029, 32 pages.

Kross et al., "Co-culture of Head and Neck Squamous Cell Carcinoma Spheroids with Autologous Monocytes Predicts Prognosis," Scand J Immunol. 2008; 67(4):392-9 (8 pages).

Laban et al., "Sorafenib sensitizes head and neck squamous cell carcinoma cells to ionizing radiation," Radiotherpy and Oncology, 2013, 109(2): 286-292 (7 pages).

Lau et al., "The R-spondin protein family," Genome Biol. 2012; 13(3):242, 2012 (10 pages).

Leemans et al., "The molecular landscape of head and neck cancer," May 2018, Nat. Rev. Cancer, vol. 18(5): 269-282 (14 pages).

Lengauer et al., "Genetic instability in colorectal cancers," Nature. Apr. 10, 1997; 386: 623-627 (5 pages).

Li and Durbin, "Fast and accurate long-read alignment with Burrows-Wheeler transform," Bioinformatics. 2010, 26(5): 589-595 (7 pages).

Li et al., "Conformational equilibria and intrinsic affinities define integrin activation," (2017) EMBO 36:629-645 (17 pages).

Luque et al., "Activated Conformations of Very Late Activation Integrins Detected by a Group of Antibodies (HUTS) Specific for a Novel RegulatoryRegion (355-425) of the Common β1 Chain," (1996) J. Bio Chem. 271(19): 11067-11075 (9 pages).

Machiels et al., "Activity and safety of afatinib in a window preoperative EORTC study in patients with squamous cell carcinoma of the head and neck (SCCHN)," Annals of Oncology 29: 985-991, 2018 (7 pages).

Machiels et al., "Afatinib versus methotrexate as second-line treatment in patients with recurrent or metastatic squamous-cell carcinoma of the head and neck progressing on or after platinum-based therapy (LUX-Head & Neck 1): an open-label, randomised phase 3 trial," Lancet Oncol. 2015; 16:583-594 (13 pages).

Martin et al., "Modeling antibody hypervariable loops: A combined algorithm," Proc. Natl. Acad. Sci. USA, 86: 9268-9272, Dec. 1989 (5 pages).

Maushagen et al., "Effects of paclitaxel on permanent head and neck squamous cell carcinoma cell lines and Identification of anti-apoptotic caspase 9b," J Cancer Res Clin Oncol. 2016; 142(6):1261-71.

Mayer et al., "A Phase Ib Study of Alpelisib (BYL719), a PI3Kα-Specific Inhibitor, with Letrozole in ER+/HER2− Metastatic Breast Cancer," Metastatic Breast Cancer, Clin Cancer Res. Jan. 1, 2017, 23(1): 26-34 (10 pages).

Meng et al., "Characterization of integrin engagement during defined human embryonic stem cell culture," (2010) The FASEB Journal, 24(4): 1056-1065 (17 pages).

Méry et al., "Preclinical models in HNSCC: A comprehensive review," Oral Oncol. 2017, 65: 51-56 (6 pages).

Monnet et al., "Selection of IgG variants with increased FcRn binding using random and directed mutagenesis: impact on effector functions," Frontiers in Immunology, vol. 6, Article 39, Feb. 2015 (15 pages).

Munster et al., "Abstract A46: Inhibition of PIK3CA with BYL719 canovercome resistance to cetuximab in squamous cellcarcinoma of the head and neck (SCCHN)," Mol Cancer Ther. Jul. 2015; vol. 14, Issue 7 Supplement (4 pages).

Pokharel et al., "Integrin activation by the lipid molecule 25-hydroxycholesterol induces a proinflammatory response," Nature Communications, (2019) 10:1482 (17 pages).

Polychronopoulos et al., Structural Basis for the Synthesis of Indirubins as Potent and Selective Inhibitors of Glycogen Synthase Kinase-3 and Cyclin-Dependent Kinases, (2004) J Med Chem 47: 935-946 (12 pages).

Pyeon et al., "Production of infectious human papillomavirus independently of viral replication and epithelial cell differentiation," Proc Natl Acad Sci. 2005; 102(26):9311-9316 (6 pages).

Reed, "Plantinum-DNA adduct, nucleotide excision repair and platinum based anti-cancer chemotherapy," Cancer Treat. Rev. 1998. p. 331-44 (14 pages).

Sachs et al., "A Living Biobank of Breast Cancer Organoids Captures Disease Heterogenity," Cell 172: 373-386 (Jan. 11, 2018).

Sachs et al., "Long-term expanding human airway organoids for disease modeling," The EMBO Journal (2019) 38: e100300 (20 pages).

Sayers and Elliott, Herpes Simplex Virus 1 Enters Human Keratinocytes by a Nectin-1-Dependent, Rapid Plasma Membrane Fusion Pathway That Functions at Low Temperature J Virol. 2016; 90(22):10379-10389 (11 pages).

Schrader et al., "Kallikrein-related peptidase 6 regulates epithelial-to-mesenchymal transition and serves as prognostic biomarker for head and neck squamous cell carcinoma patients," Mol Cancer. 2015; 14:107 (14 pages).

Shah et al., "Metabolic Imaging of Head and Neck Cancer Organoids," PLoS ONE, 2017, 12(1):e0170415 (17 pages).

Shaner et al., "A bright monomeric green fluorescent protein derived from Branchiostoma lanceolatum," Nat Methods. 2013 10(5): 407-414 (8 pages).

Shattil et al., "The final steps of integrin activation: the end game," (Apr. 2010) Nature reviews, 11: 288-300 (13 pages).

Shimizu et al., "Identification of a novel therapeutic target for head and neck squamous cell carcinomas: A role for the heurotensin-neurotensin receptor 1 oncogenic signaling pathway," Int J Cancer. 2008; 123(8):1816-1823 (8 pages).

Simmini S et al., "Transformation of intestinal stem cells into gastric stem cells on loss of transcription factor Cdx2," Nat Commun. 2014; 5:5728 (10 pages).

Smith et al., "Animal models for the study of squamous cell carcinoma of the upperaerodigestive tract: A historical perspective with review of their utility and limitations. Part A. Chemically-induced de novo cancer, syngeneic animal models of HNSCC, animal models of transplanted xenogeneic human tumors," Int. J. Cancer. 2006, 118(9):2111-22 (12 pages).

Smits et al., "Immortalized N/TERT keratinocytes as an alternative cell source in 3D human epidermal models," Sci Rep. 2017; 7(1):11838 (14 pages).

Soulières D et al., "Buparlisib and paclitaxel in patients with platinum-pretreated recurrent or metastatic squamous cell carci-

(56) References Cited

OTHER PUBLICATIONS noma of the head and neck (BERIL-1): a randomised, double-blind, placebo-controlled phase 2 trial," Lancet Oncol. Mar. 2017, 18: 323-35 (14 pages).
Squier et al., "Biology of Oral Mucosa and Esophagus," J Natl Cancer Inst Monogr. 2001; 29:7-15 (9 pages).
Su et al., "Relating conformation to function in integrin α5β1," (2016) PNAS 113(27): E3872-E3881 (10 pages).
Sun et al., "Integrin activation by talin, kindlin and mechanical forces," Nature Cell Biology, Jan. 2019, 21: 25-31 (7 pages).
Tanaka et al., "Head and neck cancer organoids established by modification of the CTOS method can be used to predict in vivo drug sensitivity," Oral Oncology. 2018, 87: 49-57 (9 pages).
The Cancer Genome Atlas Network, "Comprehensive genomic characterization of head and neck squamous cell carcinomas," Nature. Jan. 29, 2015; 517: 576-582 (7 pages).
Tsuchida et al., "Classification of 'activation' antibodies against integrin BI chain," (1997) FEBS Letters 416: 212-21 (5 pages).
Valyi-Nagy T et al., "Herpes Simplex Virus 1 Infection Promotes the Growth of a Subpopulation of Tumor Cells in Three-Dimensional Uveal Melanoma Cultures," J Virol. Oct. 2018; 92(19): e00700-18 (12 pages).
Van Jaarsveld RH et al., "Difference Makers: Chromosomal Instability versus Aneuploidy in Cancer," Trends in cancer. 2(10): 561-571 (11 pages).
Vassilev et al., In Vivo Activation of the p53 Pathway by Small-Molecule Antagonist of MDM2, Science. 2004; 303 (5659):844-848 (7 pages).
Vlachogiannis et al., "Patient-derived organoids model treatment response of metastatic gastrointestinal cancers," Science. Feb. 23, 2018; 359(6378): 920-926 (17 pages).
Voskoglou-Nomikos et al., "Clinical Predictive Value of the in Vitro Cell Line, Human Xenograft, and Mouse Allograft Preclinical," Cancer Models1Clin Cancer Res. 2003, 9(11):4227-39 (14 pages).
Yan et al., "Expression profile analysis of head and neck squamous cell carcinomas using data from The Cancer Genome Atlas," Mol Med Rep. 2016; 13(5):4259-4265 (7 pages).
Yang et al., A Small Molecule Agonist of an Integrin, αLβ2*,S, Yang et al.(2006) Journal of biological chemistry, 281(49): 37904-37912 (18 pages).
Yu et al., β1-Integrin Orients Epithelial Polarity via Rac1 and Laminin, (Feb. 2005) Molecular Biology of the cell, 16: 433-445 (13 pages).
International Search Report and Written Opinion for International Application No. PCT/EP2015/060815, dated Jul. 28, 2015 (15 pages).
International Search Report and Written Opinion for International Application No. PCT/EP2015/077988, dated Apr. 20, 2016 (13 pages).
International Search Report and Written Opinion for International Application No. PCT/EP2015/077990, mailed Jul. 6, 2016 (17 pages).
International Search Report and Written Opinion of International Application No. PCT/EP2017/054797, dated May 31, 2017 (9 pages).
International Search Report and Written Opinion of International Application No. PCT/EP2017/065101, dated Oct. 6, 2017 (13 pages).
International Search Report and Written Opinion of International Application No. PCT/EP2019/082618, dated Feb. 11, 2020 (15 pages).
Janssen, and Depoortere, "Nutrient sensing in the gut: new roads to therapeutics? Trends in endocrinology and metabolism," 24: 92-100 (2013).
Jeong et al., "Neuregulin-1 induces cancer stem cell characteristics in breast cancer cell lines," Oncology Reports (2014), 32: 1218-1224.
Kamiya et al., "Oncostatin M and hepatocyte growth factor induce hepatic maturation via distinct signaling pathways," FEBS Letters 2001, 492: 90-94 (5 pages).

Kan et al., "MPp53-mediated growth suppression in response to Nutlin-3 in cyclin D1 transformed," Cancer Research (Nov. 2007) 9 pages.
Katsuda et al., "Conversion of Terminally Committed Hepatocytes to Culturable Bipotent Progenitor Cells with Regenerative Capacity," Cell Stem Cell 20: 41-55, Jan. 5, 2017 (16 pages).
Ke et al. "Down-regulation of Wnt signaling could promote bone marrow derived mesenchymal stem cells to differentiate into hepatocytes," BBRC, Jan. 2, 2008, 36: 342-348 (7 pages).
Kemp et al., "The Roles of Wnt Signaling in Early Mouse Development and Embryonic Stem Cells", Functional Development and Embryology, 2007, pp. 1-13.
Khetani et al., "Microscale culture of human liver cells for drug development," Nat Biotechnol 26(1): 120-126 (20 pages).
Kim et al., "Mitogenic Influence of Human R-Spondin1 on the Intestinal Epithelium" Science, Aug. 19, 2005, 309: 1256-1259.
Kirikoshi et al., "WNT10A and WNT6, Clustered in Human Chromosome 2q35 Region with Head-to-Tail Manner, Are Strongly Coexpressed in SW480 Cells," Biochemical and Biophysical Research Communications (2001), 283: 798-805.
Kogata et al., "Neuregulin 3 and Erbb Signalling Networks in Embryonic Mammary Gland Development," J Mammary Gland Biology Neoplasia (2013) 18: 149-154.
Koo et al., "Stem Cells Marked by the R-Spondin Receptor LGR5," Gastroenterology 2014; 147:289-302.
Morin et al., "Activation of β-Catenin-Tcf-Signaling in Colon Cancer by Mutations in β-Catenin or APC," Science, 275: 1787-1790, Mar. 21, 1997.
Korinek et al., "Constitutive Transcriptional Activation by a β-Catenin-Tcf Complex in APC -/- Colon Carcinoma," (1997) Science 275:1784-1787.
Kuball et al., "Facilitating matched pairing and expression of TCR chains doi:10.1182/blood introduced into human T cells," Blood, 109(6): 2331-2338, 8 pages (2007).
Latorre et al., "Enteroendocrine Cells: A Review of Their Role In Brain-Gut Communication," Neurogastroenterol Motil. May 2016; 28(5): 620-630.
Lee et al., "Lung stem cell differentiation in mice directed by endothelial cells via a BMP4-NFATc1-Thrombospondin-1 axis," Cell. Jan. 30, 2014; 156(3): 440-455.
Lee et al., "Neuregulin Autocrine Signaling Promotes Self-Renewal of Breast Tumor-Initiating Cells by Triggering HER2/HER3 Activation," Tumor and Stem Cell Biology Cancer Research 74(1):341-52 (2014).
Lemaigre et al., "Mechanisms of Liver Development: Concepts for Understanding Liver Disorders and Design of Novel Therapies", Gastroenterology Jul. 1, 2009, (137)(1): 62-79.
Levy et al., "Long-term culture and expansion of primary human hepatocytes," 2015 Nat Biotechnol 33: 1264-1271 (10 pages).
Li et al., "Adult Mouse Liver Contains Two Distinct Populations of Cholangiocytes," Stem Cell Reports, 9: 478-489, Aug. 8, 2017 (12 pages).
Li et al., "Hepatoblast-Like Progenitor Cells Derived From Embryonic Stem Cells Can Repopulate Livers of Mice," Gastroenterology 139: 2158-2169, e2158 2010 (20 pages).
Li et al., "Isolation and Culture of Adult Mouse Hepatocytes," Methods Mol Biol, 633: 185-196, 2010 (12 pages).
Liang et al., "Genetic and Epigenetic Variations in iPSCs: Potential Causes and Implications for Application," Cell Stem Cell 13: 149-159, Aug. 1, 2013 (11 pages).
Lin et al., "Distributed hepatocytes expressing telomerase repopulate the liver in homeostasis and injury," Nature 556: 244-248, Apr. 12, 2018 (7 pages).
Little et al., "Engineering Biomaterials for Synthetic Neural Stem Cell Microenvironments," (2008) Chem. Rev 108, 1787-1796.
Liu et al., "Osteopontin Promotes Hepatic Progenitor Cell Expansion and Tumorigenicity via Activation of β-Catenin in Mice," 2015 Stem Cells 33: 3569-3580 (12 pages).
Love et al., "Moderated estimation of fold change and dispersion for RNA-seq data with DESeq2," Genome Biology, 15: 550, 2014 (21 pages).
Lund et al., "Genetic and epigenetic stability of human pluripotent stem cells," 2012, Nat Rev Genet 13: 732-744 (14 pages).

(56) References Cited

OTHER PUBLICATIONS

Lyzikov A.N. et al., Stvolovye kletki v regenerativnoy meditsine: dostizheniya i perspektivy (Stem Cells in Regenerative Medicine: Achievements and Prospects), Problemy zdorovya i ekologii, 2015.
Macchiarini et al., "Clinical Transplantation of a Tissue-Engineered Airway," The Lancet (Nov. 19, 2008) 8 pages.
Malato et al., "Fate tracing of mature hepatocytes in mouse liver homeostasis and regeneration," Dec. 2011, J Clin Invest, 121(12): 4850-4860 (11 pages).
Malorni et al., "The antioxidant N-acetyl-cysteine protects cultured epithelial cells from menadione-induced cytopathology", Chemico-Biological Interactions 1995, 96: 113-123.
Manandhar et al., "Glucagon-like Peptide-1 (GLP-1) Analogs: Recent Advances, New Possibilities, and Therapeutic Implications," J. Med. Chem. 2015, 58: 1020-1037.
Marquardt et al., "Functional and genetic deconstruction of the cellular origin in liver cancer," Nov. 2015, J Nat Rev Cancer 15: 653-667 (15 pages).
Martin-Belmonte et al., "Cell-Polarity Dynamics Controls the Mechanism of Lumen Formation in Epithelial Morphogenesis", Current Biology, 2008, 18: 507-513.
McEwen et al., "Regulation of the Fibroblast Growth Factor Receptor 3 Promoter and Introm I Enhancer by Sp1 Family Transcription Factors," The Journal of Biological Chemistry, 273(9): 5349-5357 (Feb. 27, 1998).
MediLexicon Dictionary, http://www.medilexicon.com/medicaldictionary.php?t=63274, "Organoid", 2006, p. 1.
Michalopoulos, G., "Liver Regeneration after Partial Hepatectomy," Jan. 2010, Am J Pathol 176(1): 2-13 (13 pages).
Mitaka, Toshihiro, "Reconstruction of hepatic organoid by hepatic stem cells", J. Hepatobiliary Pancreat Sug, Jan. 1, 2002, 9(6): 697-703.
Miyajima et al., "Stem/Progenitor Cells in Liver Development, Homeostasis, Regeneration, and Reprogramming," May 1, 2014, Cell Stem Cell 14: 561-574 (14 pages).
Munoz et al., "The Lgr5 intestinal stem cell signature: robust expression of proposed quiescent '+4' cell markers," The EMBO Journal (2012) 31: 3079-3091.
Murry et al. "Differentiation of embryonic stem cells to clinically relevant populations: lessons from embryonic development," Cell, 22;132(4):661-80, Feb. 2008 (20 pages).
Ahmed et al., "Extracellular Matrix Regulation of Stem Cell Behavior," Curr Stem Cell Rep (2016) 2:197-206 (10 bages).
Al-Lazikani et al., "Standard Conformations for the Canonical Structures of Immunoglobulins," J. Mol. Biol. (1997) 273: 927-948 (22 pages).
Andersson et al., "Pharmacokinetics of Cisplatin and Its Monohydated Coplex in Humans," J Pharm Sci. Aug. 1996; 85(8): 824 827 (4 pages).
Argiris et al., "Head and neck cancer," Lancet. May 17, 2008; 371(9625): 1695-1709 (32 pages).
Atsushi et al., A comparison of in vitro platinum-DNA adduct formation between carboplatin and cisplatin, Int J Biochem. 1994; 26(8): 1009-1016 (8 pages).
Barretina et al., "The CancerCell Line Encyclopedia enables predictive modelling of anticancer drug sensitivity," Nature, 2012; 483(7391): 603-607 (8 pages).
Bhosale et al., "Chromosomal Alterations and Gene Expression Changes Associated with the Progression of eukoplakia to Advanced Gingivobuccal Cancer," Transl Oncol. 2017; 10(3):396-409 (14 pages).
Bigorgne et al., "TTC7A mutations disrupt intestinal epithelial apicobasal polarity," J Clin Invest. 2014; 124(1):328-337 (11 pages).
Boj et al., "Organoid Models of Human and Mouse Ductal Pancreatic Cancer," Cell. Jan. 15, 2015; 160(1-2): 324-338 (28 pages).
Bossi et al., "Prognostic and predictive value of EGFR in head and neck squamous cell carcinoma," Oncotarget. 2016; 7(45): 74362-74379 (18 pages).
Braakhuis et al., "The Potential of the Nude Mouse Xenograft Model for the Study of Head and Neck Cancer," Arch Otorhinolaryngol. 1984, 239(1): 69-79 (11 pages).
Byron et al."Anti-integrin monoclonal antibodies," J Cell Sci. Nov. 15, 2009; 122(Pt 22): 4009-4011 (6 pages).
Cai Y et al., "Dysregulations in the PI3K pathway and targeted therapies for head and neck squamous cell carcinoma," Oncotarget. 2017; 8 (13): 2203-22217 (15 pages).
Calderwood et al., "Integrin activation," Journal of Cell Science 117(5): 657-666, 2004 (10 pages).
Castillo-González et al., "Dysregulated cholinergic network as a novel biomarker of poor prognostic in patients with head and neck squamous cell carcinoma," BMC Cancer. 2015; 15:385 (13 pages).
Cavalieri et al., "Efficacy and safety of single-agent pan-human epidermal growth factor receptor (HER) inhibitor dacomitinib in locally advanced unresectable or metastatic skin squamous cell cancer," Eur J Cancer (2018) 97: 7-15 (9 pages).
Clarkson et al., "Oral Viral Infections—Diagnosis and Managementg," Dent. Clin. North Am. 2017, 61(2): 351-363 (13 pages).
Co et al., "Controlling Epithelial Polarity: A Human Enteroid Model for Host-Pathogen Interactions," Cell Reports 26: 2509-2520, Feb. 26, 2019 (17 pages).
Cruz-Acuña et al., "Synthetic hydrogels for human intestinal organoid generation and colonic wound repair," Nature Cell Biology, Nov. 2017, 19(11): 326-1348 (23 pages).
D'Souza et al., "Case-Control Study of Human Papillomavirus and Oropharyngeal Cancer," N Engl J Med. 2007; 356:1944-56 (13 pages).
Dijkstra et al., "Generation of Tumor-Reactive T Cells by Co-culture of Peripheral Blood Lymphocytes and Tumor Organoids," 2018, Cell 174: 1586-1598 (26 pages).
Driehuis & Clevers, "WNT signalling events near the cell membrane and their pharmacological targeting for the treatment of cancer," British Journal of Pharmacology, (2017) 174: 4547-4563 (17 pages).
Driehuis et al., "Oral Mucosal Organoids as a Potential Platform for Personalized Cancer Therapy," Cancer Discov., 2019, 9(7): 852-871 (21 pages).
Drost and Clevers, "Organoids in cancer research," Nat Rev Cancer. Jul. 2018; 18: 407-18 (12 pages).
Dutta et al., "A Key Tyrosine (Y1494) in the 4 Integrin Regulates Multiple Signaling Pathways Important for Tumor Development and Progression," Cancer Res., Nov. 1, 2008, 68 (21): 8779-8787 (10 pages).
Economopoulou et al., "The emerging role of immunotherapy in head and neck squamous cell carcinoma (HNSCC): anti-tumor immunity and clinical applications," Ann Transl Med. 2016; 4(9): 173 (13 pages).
Egles et al., "Integrin-Blocking Antibodies Delay Keratinocyte Re-Epithelialization in a Human Three-Dimensional Wound Healing Model," PlosOne, 5(5): e10528, May 2010, 8 pages.
Etienne et al., "Visualization of herpes simplex virus type 1 virions using fluorescent colors," J Virol Methods. J Virol Methods. Mar. 2017 ; 241: 46-51 (14 pages).
Faas et al., "Virtual nanoscopy: Generation of ultra-large high resolution electron microscopy maps," J Cell Biol. 198 (3): 457-469 (13 pages).
Fitzmaurice et al., "Global, Regional, and National Cancer Incidence, Mortality, Years of Life Lost, Years Lived With Disability, and Disability-Adjusted Life-years for 32 Cancer Groups, 1990 to 2015:A Systematic Analysis for the Global Burden of Disease Study," JAMA Oncol. United States; Apr. 1, 2017; 3(4): 524-548 (56 pages).
Freed-Pastor et al., "Mutant p53: one name, many proteins," Genes Dev. 2012, 26(12): 1268-1286 (20 pages).
Fritsch et al., "Characterization of the Novel and Specific PI3Kα Inhibitor NVP-BYL719 and Development of the Patient Stratification Strategy for Clinical Trials," Mol Cancer Ther. 2014; 13(5):1117-29 (14 pages).
Fujii M et al., "A Colorectal Tumor Organoid Library Demonstrates Progressive Loss of Niche Factor Requirements during Tumorigenesis," Cell Stem Cell. Jun. 2, 2016; 18:827-838 (13 pages).

(56) References Cited

OTHER PUBLICATIONS

Ghasemi et al., "High-throughput testing in head and neck squamous cell carcinoma identifies agents with preferential activity in human papillomavirus-positive or negative cell lines," Ocotarget, 2018, 9(40): 26064-26071 (8 pages).
Gillison et al., "A causual role for human papillomavirus in head and neck cancer," Lancet. 2004, 363(9420):1488-9 (2 pages).
Gjorevski et al., "Designer matrices for intestinal stem cell and organoid culture," Nature, Nov. 2016, 539: 560-564 (17 pages).
Gonzalez et al., "Identification of 9 Genes differentially Expressed in Head and Neck Squamous Cell Carcinoma," Arch Otolaryngol Head Neck Surg. United States; 2003; 129:754-759 (6 pages).
Griffin et al., "Human Keratinocyte Cultures in the Investigation of Early Steps of Human Papillomavirus Infection," Methods Mol Biol. 2014; 219-238 (19 pages).
Guan et al., "A meta-analysis comparing cisplatin-based to carboplatinbased chemotherapy in moderate to advanced squamous cell carcinoma of head and neck (SCCHN)," Oncotarget. 2016; 7(6): 7110-7119 (10 pages).
Hall et al., "The $\alpha1/\beta6$ and $\alpha6/\beta1$ Integrin Heterodimers Mediate Cell Attachment to Distinct Sites on Laminin," The Journal of Cell Biology, Jun. 1990, 110: 2175-2184 (10 pages).
Ho et al., "Preliminary Results From a Phase 2 Trial of Tipifarnib in HRAS-Mutant Head and Neck Squamous Cell Carcinomas," Int J Radiat Oncol Biol Phys. 2018; 100(5): 1367 (1 page).
Hoogstraat et al., "Simultaneous Detection of Clinically Relevant Mutations and Amplifications for Routine Cancer Pathology," J Mol Diagnostics. 2015; 17(1): 10-18 (9 pages).
Hughes et al., "Matrigel: A complex protein mixture required for optimal growth of cell culture," (2010) Proteomics, 10(9):1886-90 (6 pages).
Humphries et al., "Integrin Ligands," J Cell Sci., Oct. 1, 2006; 119(Pt 19): 3901-3903 (5 pages).
Humphries, "Integrin Structure," (2000) Biochemical Society Transactions vol. 28, part 4 (31 pages).
International Search Report and Written Opinion of International Application No. PCT/EP2020/057147, dated May 14, 2020 (19 pages).
Janda et al., "Surrogate Wnt agonists that phenocopy canonical Wnt and $\beta$-catenin signalling," (2017) Nature, 545 (7653):234-237 (19 pages).
Johnson et al., "Relationships between drug activity in NCI preclinical in vitro and in vivo models and early clinical trials, " Br J Cancer. 2001; 84(10):1424-31 (8 pages).
Juric et al., "Phosphatidylinositol 3-Kinase a-Selective Inhibition With Alpelisib (BYL719) in PIK3CA-Altered Solid Tumors: Results From the First-in-Human Study," J Clin Oncol.May 1, 2018; 36(13): 1291-1299 (12 pages).
Kijima et al., "Three-Dimensional Organoids Reveal Therapy Resistance of Esphagal and Oropharyngeal Squamous Cell Carinoma Cells," Cellular and Molecular Gastroenterlogy and Hepatology, 7(1): 73-91 (19 pages).
Caporale et al., "Locoregional IL-2 Therapy in the Treatment of Colon Cancer. Cell-induced Lesions of a Murine Model," Anticancer Research 27: 985-990 (2007).
Perez et al., "Comparative cytotoxicity of CI-973, cisplatin, carboplatin and tetraplatin in human ovarian carcinoma cell lines," Int J Cancer. 1991;48:265-269 (5 pages).
Zhu and Ding, "Study on a 3D Hydrogel-Based Culture Model for Characterizing Growth of Fibroblasts under Viral Infection and Drug Treatment," SLAS Discovery 2017, vol. 22(5) 626-634 (9 pages).
Zolk et al., "Transporter Gene Expression in Human Head and Neck Squamous Cell Carcinoma and Associated Epigenetic Regulatory Mechanisms," Am J Pathol. Jan. 2013; 182(1):234-43 (10 pages).
Naftalin et al., "Progesterone stimulation of fluid absorption by the rat uterine gland", Reproduction, 2002, 123: 633-638.
Nakamura et al., "Anti-patched-1 Antibodies Suppress Hedgehog Signaling Pathway and Pancreatic Cancer Proliferation," Anticancer Research 27: 3743-3748 (2007).

Nakamura et al., "Molecular cloning and expression of human hepatocyte growth factor," Nov. 23, 1989, Nature 342: 440-443 (4 pages).
Nakamura et al., "Crosstalk between Wnt and Notch signaling in intestinal epithelial cell fate decision," Journal of Gastroenterology, 2007, 42(9): 705.
Nakanishi et al., "Dclk1 distinguishes between tumor and normal stem cells in the intestine," 45(1): 98-105 (Jan. 2013).
Namkung et al., "Small-molecule activators of TMEM16A, a calcium-activated chloride channel, stimulate epithelial chloride secretion and instestinal constraction," The FASEB Journal (Nov. 25, 2011) 18 pages.
Nault et al., "High frequency of telomerase reverse-transcriptase promoter somatic mutations in hepatocellular carcinoma and preneoplastic lesions," Jul. 26, 2013, Nature Communications, 4: 221 (7 pages).
Nozaki et al. "Co-culture with intestinal epithelial organoids allows efficient expansion and motility analysis of intraepithelial lymphocytes", J Gastroenterol, 51: 206-216, 8 pages (2016).
Oda et al., "A comprehensive pathway map of epidermal growth factor receptor signaling," Mol Syst Biol. 2005.0010; 2005 (17 pages).
Oeztuerk-Winder et al., "Regulation of Human Lung Alveolar Multipotent Cells by a Novel p38a MAPK/miR-17-92 axis," The EMBO Journal (2012) 31: 3431-3441.
Ornitz et al., "Regulation of the Fibroblast Growth Factor Receptor 3 Promoter and Intron I Enhancer by Sp1 Family Transcription Factors," The Journal of Biological Chemistry, (Feb. 27, 1998) 273(9): 5349-5357.
Pasic et al., "Sustained activation of the HER1-ERK1/2-RSK signaling pathway controls myoepithelial cell fate in human mammary tissue," Genes & Development (2011) 25: 1641-1653.
Pasic et al., "Sustained activation of the HER1-ERK1/2-RSK signaling pathway controls myoepithelial cell fate in human mammary tissue," Supplementary Material, 18 pages, Genes & Development 25 (2011).
Peterson et al., "Interaction with basement membrane serves to rapidly distinguish growth and differentiation pattern of normal and malignant human breast epithelial cells," Proc. Natl. Acad. Sci., Oct. 1992, 89: 9064-9068.
Pin et al., "Modelling the Spatio-Temporal Cell Dynamics Reveals Novel Insights on Cell Differentiation and Proliferation in the Small Intestinal Crypt," PLoS ONE, PLoS ONE 7(5): e37115, 14 pages (May 2012).
Planas-Paz et al., "The RSPO-LGR4/5-ZNRF3/RNF43 module controls liver zonation and size," 2016, Nat Cell Biol 18: 467-479 (22 pages).
Purwada et al., "Modular Immune Organoids with Integrin Ligand Specificity Differentially Regulate Ex Vivo B Cell Activation" ACS Biomater. Sci. Eng., Jan. 2017, 3: 214-225 (12 pages).
Rabinowitz et al., Transforming Growth Factor $\beta$ Signaling Controls Activities of Human Intestinal CD8+T Suppressor Cells Gastroenterology, Mar. 2013; 144(3):601-612 (13 pages).
Raven et al., "Cholangiocytes act as Facultative Liver Stem Cells during Impaired Hepatocyte Regeneration," Nature. Jul. 20, 2017; 547(7663): 350-354 (35 pages).
Rennert, et al., "A microfluidically perfused three dimensional human liver model", Biomaterials, Aug. 25, 2015 (Aug. 25, 2015), 71: 119-131 (14 pages).
Robinton et al., "The promise of induced pluripotent stem cells in research and therapy," NIH Public Access Nature 481 (May 13, 2013); 24 pages.
Rogoz et al., "A 3-D enteroid-based model to study T-cell and epithelial cell interaction," J Immunol Methods, Jun. 2015; 421:89-95 (13 pages).
Sachs et al., "Intestinal epithelial organoids fuse to form self-organizing tubes in floating collagen gels", Development, Mar. 2017, 144: 1107-1112 (6 pages).
Sadelain et al., "Therapeutic T cell engineering," Nature. 2017, 545: 423-431, 9 pages, (May 25, 2017).
Saha et al., "Designing synthetic materials to control stem cell phenotype," (2007) Curr Opin Chem Biol. 11(4): 381-387.

(56) References Cited

OTHER PUBLICATIONS

Saha et al., "Substrate Modulus Directs Neural Stem Cell Behavior," (2008) Biophysical Journal 95: 4426-4438.
Sangiorgi and Capecchi, "Bmi1 is expressed in vivo in intestinal stem cells," Nat Genet. Jul. 2008; 40(7): 915-920.
Sarkozi et al., "Oncostatin M is a novel inhibitor of TGF-B1-induced matricellular protein expression," Am J Physiol Renal Physiol, 2011, 301: F1014-F1025.
Sato et al., "Single Lgr5 stem cells build crypt villus structures in vitro without a mesenchymal niche," Nature, May 14, 2009, 459: 262-265.
Sato et al., "Long-term Expansion of Epithelial Organoids From Human Colon, Adenoma, Adenocarcinoma, and Barrett's Epithelium," Gastroenterology, 14: 1762-1772 (2011).
Sato et al., "Paneth cells constitute the niche for Lgr5 stem cells in intestinal crypts," Nature. Jan. 20, 2011; 469 (7330): 415-418.
Schaub et al., "Evidence against a Stem Cell Origin of New Hepatocytes in a Common Mouse Model of Chronic Liver Injury," Aug. 21, 2014, Cell Rep 8: 933-939 (8 pages).
Schuler et al., "Efficient Temporally Controlled Targeted Somatic Mutagenesis in Hepatocytes of the Mouse," 2004 Genesis 39: 167-172 (6 pages).
Schumacher et al., "The use of murine-derived fundic organoids in studies of gastric physiology," J Physiol, Feb. 2015, 593(8): 1809-1827 (19 pages).
Sebestyen et al., "RhoB Mediates Phosphoantigen Recognition by Vg9Vd2 T Cell Receptor," Cell Rep. May 31, 2016; 15(9):1973-85 (14 pages).
Sekiya & Suzuki, "Direct conversion of mouse fibroblasts to hepatocyte-like cells by defined factors," Jul. 21, 2011, Nature, 475: 390-395 (6 pages).
Sekiya & Suzuki, "Hepatocytes, Rather than Cholangiocytes, Can Be the Major Source of Primitive Ductules in the Chronically Injured Mouse Liver," The American Journal of Pathology, May 2014, 184(5): 1468-1478 (11 pages).
Sell et al., "Hepatocyte Proliferation and α1,-Fetoprotein in Pregnant, Neonatal, and Partially Hepatectomized Rats," Apr. 1974, Cancer Res 34: 865-871 (8 pages).
Semler et al., "Mechanochemical Manipulation of hepatocyte Aggregation Can Selectively Induce or Repress Liver-Specific Function", Biotechnology and Bioengineering, Sep. 1999, 69(4): 359-369.
Shi et al., "Directed differentiation of human pluripotent stem cells to cerebral cortex neurons and neural networks," Nat Protoc 7: 1836-1846, 2012 (11 pages).
Shibue et al., "Fatty acid-binding protein 5 regulates diet-induced obesity via GIP secretion from enteroendocrine K cells in response to fat ingestion," Am J Physiol Endocrinol Metab 308: E583-E591, 2015.
Shiina et al., MHC Genotyping in Human and Nonhuman Species by PCR-based Next-Generation Sequencing, Intech, Next Generation Sequencing—Advances, Applications and Challenges, Chapter 3, 31 pages (2016).
Si-Tayeb et al., "Highly Efficient Generation of Human Hepatocyte-Like Cells from Induced Pluripotent Stem Cells," 2010, Hepatology 51(1): 297-305 (9 pages).
Smith et al., "Comparison of Biosequences," Advances in Applied Mathematics 2, (1981), pp. 482-489.
Snykers et al., "Differentiation of neonatal rat epithelial cells from biliary origin into immature hepatic cells by sequential exposure to hepatogenic cytokines and growth factors reflecting liver development", Toxicology in Vitro, Apr. 4, 2007, 21: 1325-1331.
Snykers et al., "In Vitro Differentiation of Embryonic and Adult Stem Cells into Hepatocytes: State of the Art," Stem Cells, 27: 577-605 (2009).
Spence et al., "Directed differentiation of human pluripotent stem cells into intestinal tissue in vitro," Nature, 470 (7332): 105-109 (Feb. 3, 2011).
Stanger, B., "Cellular Homeostasis and Repair in the Mammalian Liver," 2015, Annu Rev Physiol 77: 179-200 (25 pages).
Stepniak et al.,"c-Jun/AP-1 controls liver regeneration by repressing p53/p21 and p38 MAPK activity," (2006) Genes Dev. 20(16):2306-14.
Sun et al., "The Progress on the Differentiation of the Stem Cells into Hepatocytes," Medical Recapitulate, vol. 16, No. 9, May 2010 (3 pages).
Blanpain et al., "Epithelial Stem Cells: Turning over New Leaves," Cell., Feb. 9, 2007, 128(3): 445-458 (24 pages).
Chai et al., "Wnt signaling induces proliferation of sensory precursors in the postnatal mouse cochlea," PNAS, May 22, 2012, 109(21): 8167-8172 (6 pages).
Gonzalez et al., "Notch Inhibition Prevents Differentiation of Human Limbal Stem/Progenitor Cells in vitro," Scientific Reports, (2019) 9:10373 pp. 1-11 (11 pages).
Haegebarth et al., "Wnt Signaling, Lgr5, and Stem Cells in the Intestine and Skin," The American Journal of Pathology, Mar. 2009, 174(3): 715-721 (7 pages).
Wei et al., Abstract: "Wnt Proteins in Intestinal Epithelial Progenitor Cells," R&D Systems, 2015 (1 page).
Bonner-Weir et al., "The pancreatic ductal epithelium serves as a potential pool of progenitor cells," Pediatric Diabetes, 2004; 5: 16-22 (7 pages).
Rulifson et al., "Wnt signaling regulates pancreatic β cell proliferation," PNAS, Apr. 10, 2007, 104(15): 6247-6252 (6 pages).
Kim et al., "Engraftment Potential of Spheroid-Forming Hepatic Endoderm Derived from Human Embryonic Stem Cells," Stem Cells and Development, vol. 22, No. 12, 2013, pp. 1818-1829 (12 pages).
Tostões et al., "Human Liver Cell Spheroids in Extended Perfusion Bioreactor Culture for Repeated-Dose Drug Testing," Hepatology, vol. 55, No. 4, 2012, pp. 1227-1236 (10 pages).
Huch et al., In vitro expansion of single Lgr51 liver stem cells induced by Wnt-driven regeneration 2013 Nature 494: 247-250 and Methods (6 pages).
Seikagaku et al., "Intestinal Epithelial Stem Cells," The Journal of Japanese Biochemical Society, 2013, vol. 85, No. 9, ps.743-748 (6 pages).
U.S. Appl. No. 17/437,477, filed Sep. 9, 2021, Johannes Carolus Clevers.
Abud et al., "Growth of intestinal epithelium in organ culture is dependent on EGF signalling" Experimental Cell Research, Academic Press 2005, 303: 252-262.
Afroze et al., "The physiological roles of secretin and its receptor," Ann Transl Med 2013, 1(3): 29.
Aini et al., "Accelerated telomere reduction and hepatocyte senescence in tolerated human liver allografts," Transplant Immunology (2014), 31(2): 55-59 (28 pages).
Anders and Huber, "Differential expression analysis for sequence count data," Genome Biology 2010, 11:R106.
Anonymous, Wikipedia Article "Secreted frizzled-related protein 1 also known as SFRP1 is a protein which in humans," Wayback Machine, 7 pages (Oct. 14, 2013).
Bahar et al., "Single-cell spatial reconstruction reveals global division of labor in the mammalian liver," Nature. Feb. 16, 2017; 542(7641): 352-356. doi:10.1038/nature21065 (29 pages).
Barker et al., "Identification of stem cells in small intestine and colon by marker gene Lgr5," Nature, 449: 1003-1008 (Oct. 25, 2007).
Barker et al., "Lgr proteins in epithelial stem cell biology," 2013, Development 140: 2484-2494 (11 pages).
Barker et al., "Lgr5+ve Stem Cells Drive Self-Renewal in the Stomach and Build Long-Lived Gastric Units In Vitro," Cell Stem Cell, 6: 25-36 (Jan. 8, 2010).
Bartfeld et al., "In Vitro Expansion of Human Gastric Epithelial Stem Cells and Their Responses to Bacterial Infection," Gastroenterology. Jan. 2015; 148(1): 126-136. e6. doi:10.1053/j.gastro.2014. 09.042 (22 pages).
Bedke et al., "A microplate co-culture assay allows individualised compound efficacy testing in patients derived 3D tumour spheroids and autologous immune cells," European Urology Supplements, Mar. 2017, 16(3): e1474 (2 pages).

(56) References Cited

OTHER PUBLICATIONS

Billerbeck et al., Humanized mice efficiently engrafted with fetal hepatoblasts and syngeneic immune cells develop human monocytes and NK cells, J Hepatol. Aug. 2016; 65(2): 334-343. doi:10.1016/j.jhep 2016.04.022 (20 pages).
Bjerknes et al., "Intestinal epithelial stem cells and progenitors" Methods in Enzymology, Academic Press Inc., Jan. 1, 2006, 419: 337-383.
Booth et al., "Maintenance of functional stem cells in isolated and cultured adult intestinal epithelium" Experimental Cell Research, Academic Press Jun. 15, 1999, 249: 359-366.
Bottenstein et al., "Growth of a rat neuroblastoma cell line in serum-free supplemented medium," Proc. Natl. Acad. Sci. USA, 76(1): 514-517, (Jan. 1979).
Brewer et al., "Optimized Survival of Hippocampal Neurons in B27-Supplemented Neurobasal, a New Serum-Free Medium Combination", Journal of Neuroscience Research 35: 567-576 (1993); 11 pages.
Brockbank et al., "Cryopreservation Guide", https://www.thermofisher.co.nz/Uploads/file/Scientific/Applications/Equipment-Furniture/Cryopreservation-Guide. PDF, 2007, pp. 1-30.
Broutier et al., "Culture and establishment of self-renewing human and mouse adult liver and pancreas 3D organoids and their genetic manipulation," Nat Protoc 2016, 11(9): 1724-1743 (20 pages).
Broutier et al., "Human Primary Liver Cancer-derived Organoid Cultures for disease modelling and drug screening," Nat Med. Dec. 23, 2017(12): 1424-1435 (35 pages).
Buczacki et al., "Intestinal label-retaining cells are secretory precursors expressing Lgr5," Nature, 495 (7493): 65-69, Feb. 27, 2013.
Burke et al., "Liver Zonation Occurs Through a-Catenin-Dependent, c-Myc-Independent Mechanism," Gastroenterology, 2009, 136: 2316-2324 (12 pages).
Cambridge Dictionary, definition for "sealed", http://dictionary.cambridge.org/us/dictionary/english/sealed , Sep. 24, 2016, p. 1.
Capaccio et al., "Modern management of obstructive salivary diseases", Acta Otorhinolaryngologica Italica, 2007, 27: 161-172.
Carraway et al., "Neuregulin-2, a new ligand of ErbB3/ErbB4-receptor tyrosine kinases," Nature vol. 387 (May 29, 1997); 5 pages.
Cassiman et al., "The Vagal Nerve Stimulates Activation of the Hepatic Progenitor Cell Compartment via Muscarinic Acetylcholine Receptor Type 3," American Journal of Pathology, Aug. 2002, 161(2): 521-530 (10 pages).
Chakrabarti et al., "Hedgehog Signaling Regulates PDL-1 Expression in Gastric Cancer Cells to Induce Tumor Proliferation", Gastron, Apr. 22, 2017 (2 pages).
Chakrabarti et al., "Hedgehog Signaling Regulates PDL-1 Expression in Gastric Cancer Cells to Induce Tumor Proliferation," Gastroenterology, Digestive Disease Week, May 2017, vol. 152, No. 5, Suppl. 1 (2 pages).
Chatterjee et al., Induced Pluripotent Stem (IPS) Cell Culture Methods and Induction of Differentiation into Endothelial Cells. Methods Mol Biol. 2016; 1357: 311-327 (16 pages).
Cheng et al., "Central and Peripheral Administration of Secretin Inhibits Food Intake in Mice through the Activation of the Melanocortin System," Neuropsychopharmacology (2011) 36: 459-471.
Chong et al., "The quest to overcome resistance to EGFR-targeted therapies in cancer," Nat Med. Nov. 2013, 19 (11): 1389-1400. doi: 10.1038/nm.3388 (28 pages).
Choo, "The HLA System: Genetics, Immunology, Clinical Testing, and Clinical Implications," Yonsei Med J. Feb. 28, 2007; 48(1): 11-23 (13 pages).
Clevers et al., "Modeling Development and Disease with Organoids," Cell. Jun. 16, 2016; 165(7):1586-1597 (12 pages).
Clotman et al., Control of liver cell fate decision by a gradient of TGFβ signaling modulated by Onecut transcription factors (2005) Genes Dev. 19(16): 1849-54.
Cole et al., "Measuring GSK3 Expression and Activity in Cells," (2008) Methods Mol Biol. 468: 45-65.
Combined Search and Examination Report issued in GB Application No. GB1819224.5, dated May 29, 2019 (9 pages).
Crawford et al., "The Notch Response Inhibitor DAPT Enhances Neuronal Differentiation in Embryonic Stem Cell-Derived Embryoid Bodies Independently of Sonic Hedgehog Signaling," Developmental Dynamics, 2007, 236: 886-892.
Crosnier et al., "Organizing cell renewal in the intestine: stem cells, signals and combinatorial control", Nature reviews—Genetics, May 2006, 7: 349-359.
Cuny et al., "Structure-activity relationship study of bone morphogenetic protein (BMP) signaling inhibitors," Bioorg Med Chem Lett. Aug. 1, 2008; 18(15): 4388-4392.
Daszkiewicz et al., "A 3D image-based quantification of immune cell-tumor spheroid interactions in the presence of checkpoint inhibition," Journal of Clinical Oncology, vol. 35, No. 7_Suppl, Mar. 1, 2017, (6 pages).
Daszkiewicz et al., Abstract 4611: "A 3D in vitro culture-based method to visualize and quantify effects of immuno-modulatory drugs", Proceedings of the American Association for Cancer Research Annual Meeting 2017; Apr. 1-5, 2017; Washington, DC, Apr. 1, 2017 (4 pages).
De Gouville et al., "Inhibition of TGF-B signaling by an ALK5 inhibitor protects rats from dimethylnitrosamine-induced liver fibrosis," British Journal of Pharmacology (2005); 12 pages.
De La Coste et al., "Somatic mutations of the B-catenin gene are frequent in mouse and human hepatocellular carcinomas," Proc. Natl. Acad. Sci. USA, 95: 8847-8851, Jul. 1998 (5 pages).
De Lau et al., "Lgr5 homologues associate with Wnt receptors and mediate R-spondin signalling," Nature vol. 476 (Aug. 18, 2011); 6 pages.
De Lau et al., "The R-spondin/Lgr5/Rnf43 module: regulator of Wnt signal strength," Genes and Development, 28:305-316 (2014).
Dekkers et al., "A functional CFTR assay using primary cystic fibrosis intestinal organoids," Nature Medicine vol. 19, No. 7 (Jul. 2013); 10 pages.
Dollé et al., "EpCAM and the biology of hepatic stem/progenitor cells," 2015 Am J Physiol Gastrointest Liver Physiol 308: G233-250 (18 pages).
Dong et al., "The Epithelial-Mesenchymal Transition Promotes Transdifferentiation of Subcutaneously Implanted Hepatic Oval Cells Into Mesenchymal Tumor Tissue," Stem Cells and Development 2009, 18(9): 1293-1298.
Dontu et al., "Role of Notch signaling in cell-fate determination of human mammary stem/progenitor cells," Breast Cancer Research, vol. 6, No. 6 (2004); 11 pages.
Dorrell et al., "Surface Markers for the Murine Oval Cell Response" NIH Public Access Hepatology (Oct. 2008) 17 pages.
Dou et al., "Expanding SCA-1+ mammary stem cell in the presence of oestrogen and growth hormone," Clin Transl Oncol (2012) 14:444-451 (8 pages).
Lian et al., "Directed cardiomyocyte differentiation from human pluripotent stem cells by modulating Wnt/b-catenin signaling under fully defined conditions," Nature Protocols, vol. 8, No. 1, 2013, pp. 162-175 (14 pages).
Nantasanti et al., "Disease Modeling and Gene Therapy of Copper Storage Disease in Canine Hepatic Organoids," Stem Cell Reports, vol. 5, pp. 895-907, Nov. 10, 2015 (13 pages).
Strazzabosco et al., "Functional Anatomy of Normal Bile Ducts," The Anatomical Record, 291:653-660 (2008).
Zhao et al., "Organoids," Nature Reviews Methods Primers, (2022) 2:94 (21 pages).
Anonymous, "Normal Liver Histology 101," Pathology Pearls, Liver Fellow Network, Jun. 12, 2020 (11 pages).
Anonymous, NIH National Cancer Institute definition of Organoid, retrieved from www.cancer.gov on May 6, 2025 (1 page).
Hisha et al., "Establishment of a Novel Lingual Organoid Culture System: Generation of Organoids Having Mature Keratinized Epithelium from Adult Epithelial Stem Cells," Scientific Reports, 3:3224 Nov. 15, 2013 (10 pages).
Kaushik et al., "Concise Review: Current Status of Three-Dimensional Organoids as Preclinical Models," Stem Cells 2018; 36: 1329-1340 (12 Pages).
Martinez-Jimenez et al., "Transcriptional regulation and expression of CYP3A4 in hepatocytes," Curr Drug Metab. Feb. 2007;8(2): 185-94.

(56) References Cited

OTHER PUBLICATIONS

Jeong et al., "Generating inner ear organoids containing putative cochlear hair cells from human pluripotent stem cells," Cell Death and Disease, (2018) 9:922, 2018 (13 pages).

Nie et al., "Directed Differentiation of Mouse Embryonic Stem Cells into Inner Ear Sensory Epithelia in 3D Culture," Ed. Tsuji, T, Organ Reg: 3D Stem Cell Culture Manipulation, Meth Mol Biol 1597: 67-83, 2017.

Velho et al., "Novel Targeted Agents in Head and Neck Squamous Cell Carcinoma," Hematol Oncol Clin N. Am 29 (2015) 993-1009 (17 pages).

Wikipedia, "Head and Neck Anatomy" downloaded from the internet on Jul. 11, 2025 at https://en.wikipedia.org/wiki/Head_and_neck_anatomy, (11 pages).

Yee et al., "Lgr5-EGFP marks taste bud stem/progenitor cells in posterior tongue," Stem Cells, 31(5): 992-1000, May 2013 (15 pages).

"CP-A31398, which restitutes mutant p53 functions, suppresses the increase of dominant negative p53 gene mutation-dependent cancer cell proliferation and metastasis," Acta Obstetrica et Gynaecologica Japonica, Published by Nihon Sanka Fujinka Gakkai Zasshi, 2006, vol. 58, No. 2, p. 1-88, p. 400 (S-252) (1 page).

Sato et al., "EGFR inhibitors prevent induction of cancer stem like cells in esophageal squamous cell carcinoma by suppressing epithelial-mesenchymal transition," Cancer Biology & Therapy, 16:6, 933-940, DOI: 10.1080/15384047.2015.1040959, May 28, 2015 (9 pages).

Tian et al., "Opposing activities of Notch and Wnt signaling regulate intestinal stem cells and gut homeostasis," Cell Rep. Apr. 7, 2015; 11(1): 33-42. doi:10.1016/j.celrep.2015.03.007 (18 pages).

You et al., "The type III TGF-b receptor signals through both Smad3 and the p38 MAP kinase pathways to contribute to inhibition of cell proliferation," Carcinogenesis vol. 28 No. 12 pp. 2491-2500, 2007 (10 pages).

\* cited by examiner

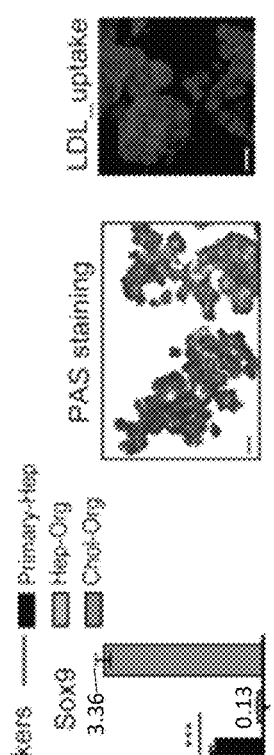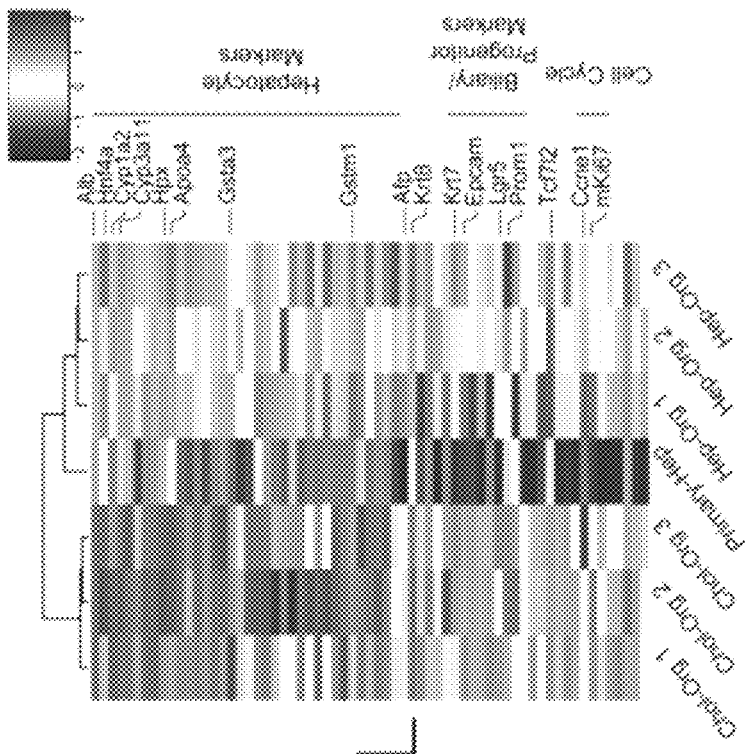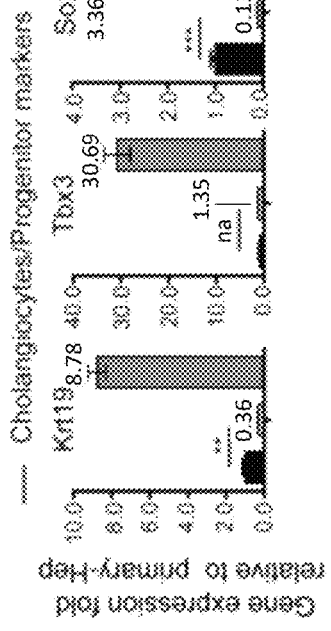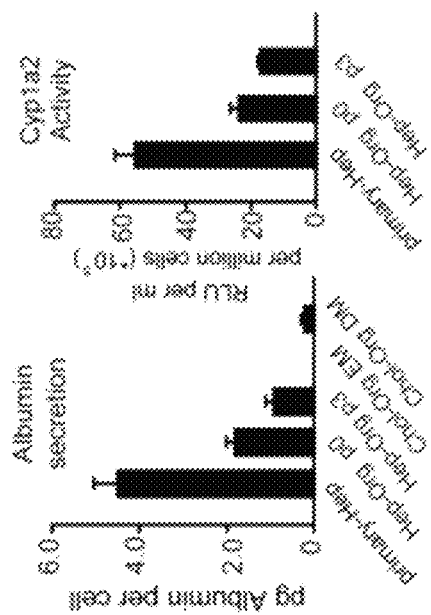

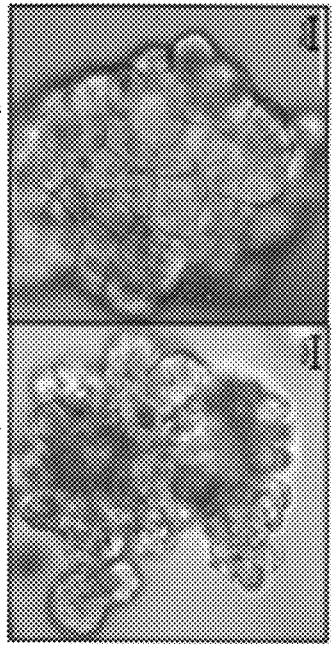
Fig. 5A
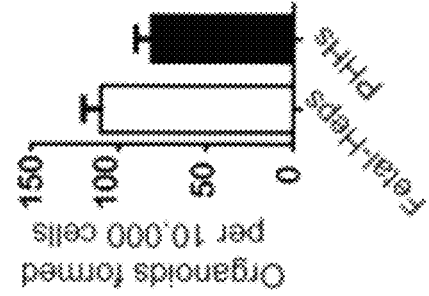
Fig. 5B
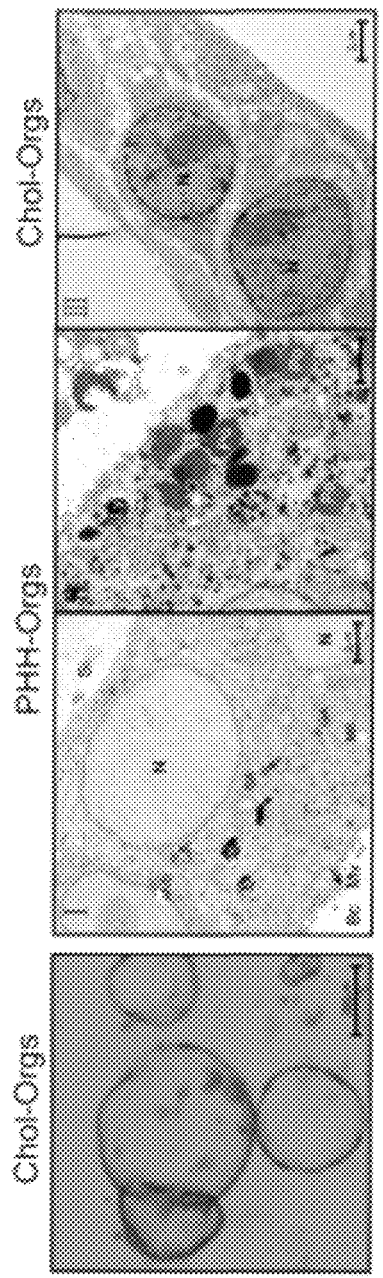
Fig. 5C
Fig. 5D
Fig. 5E

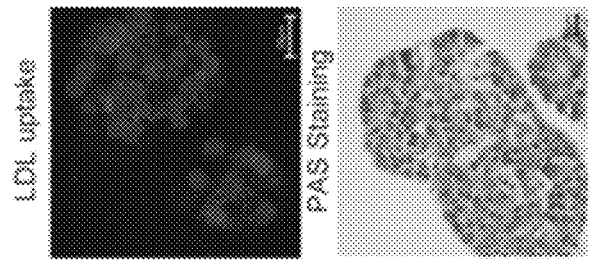
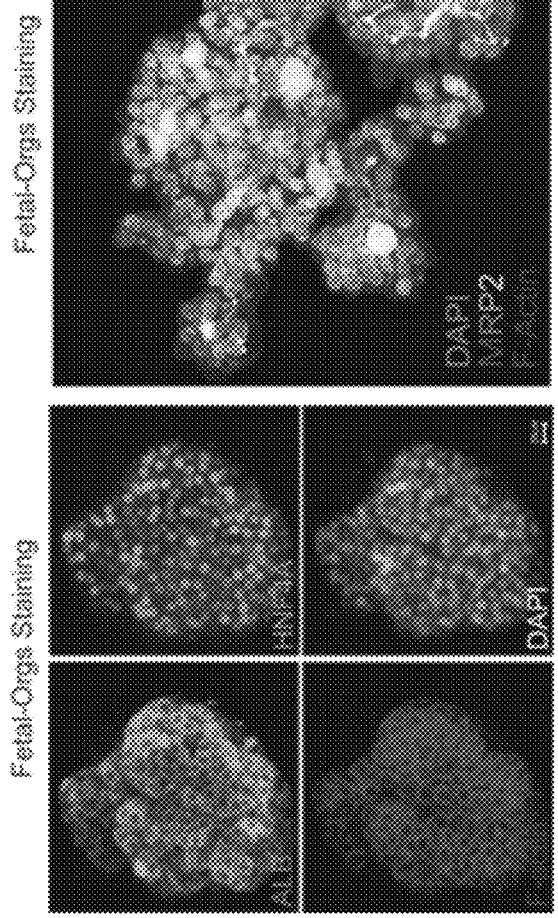
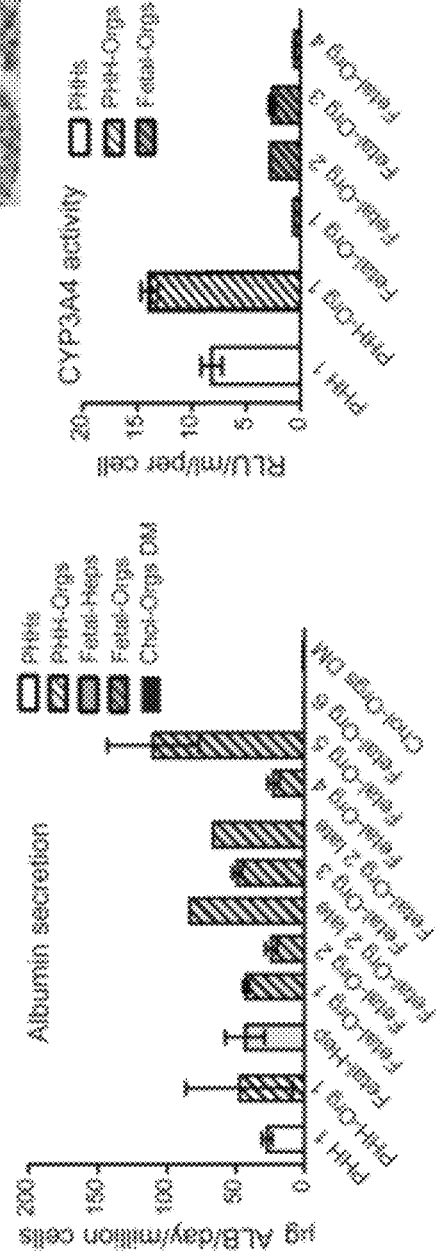

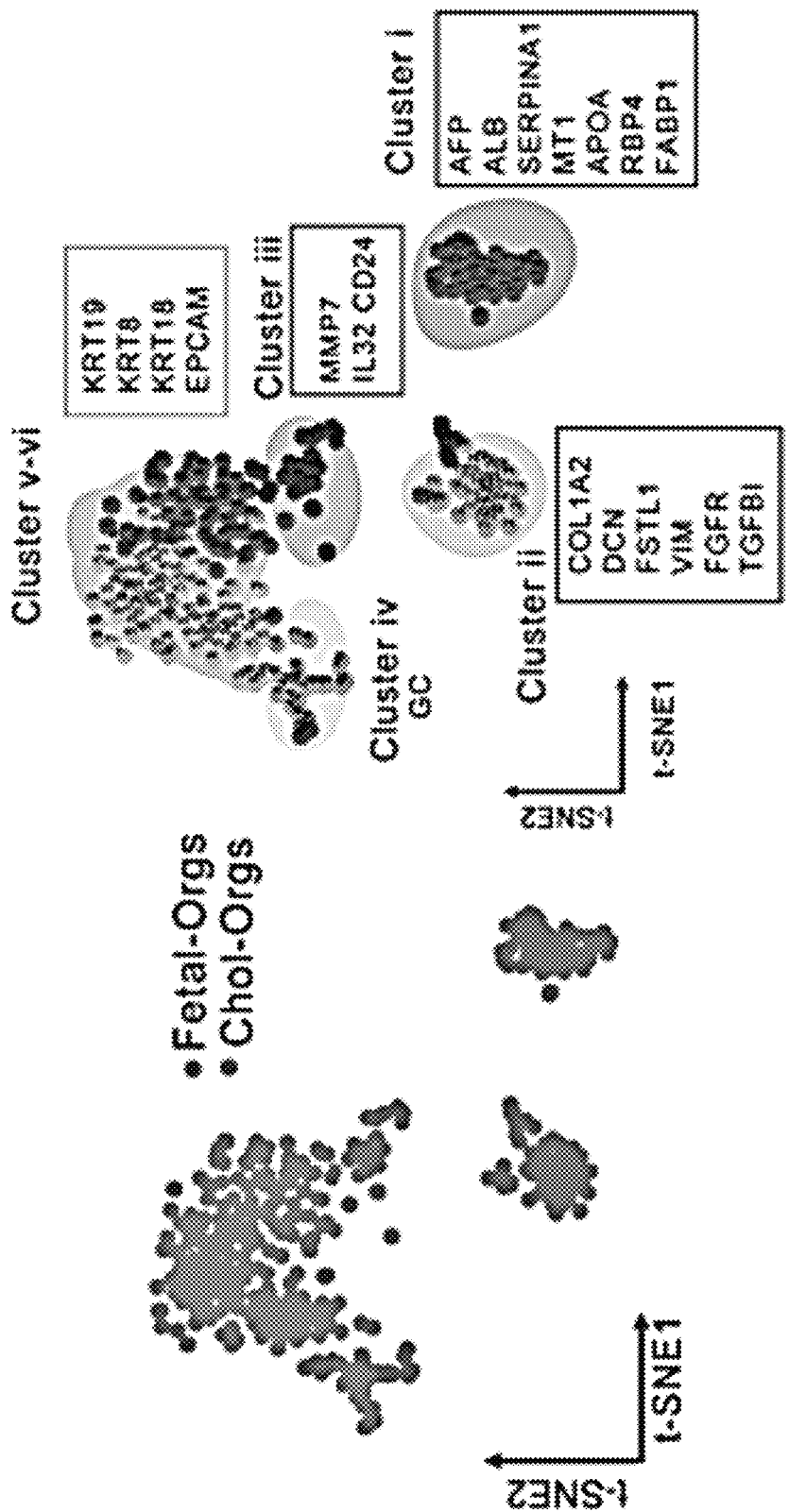

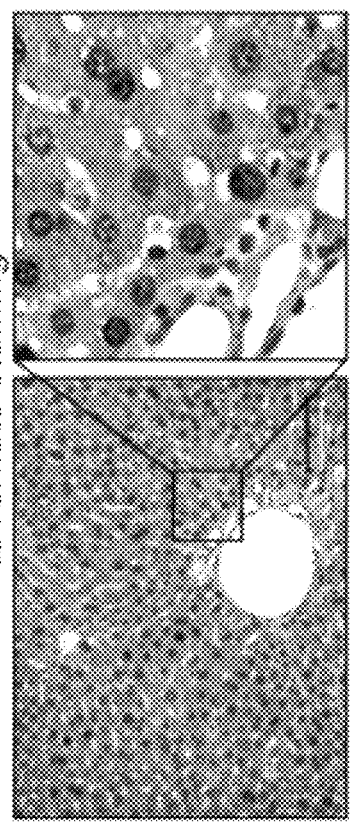
Fig. 8E
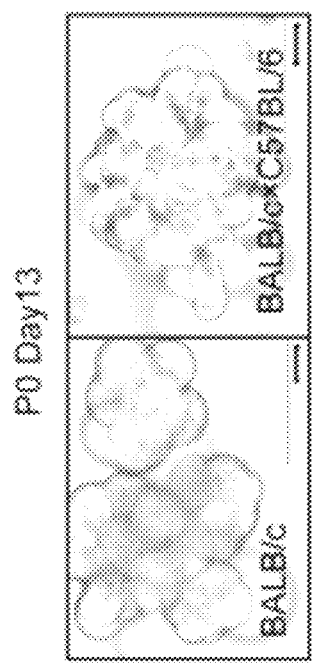
Fig. 8D
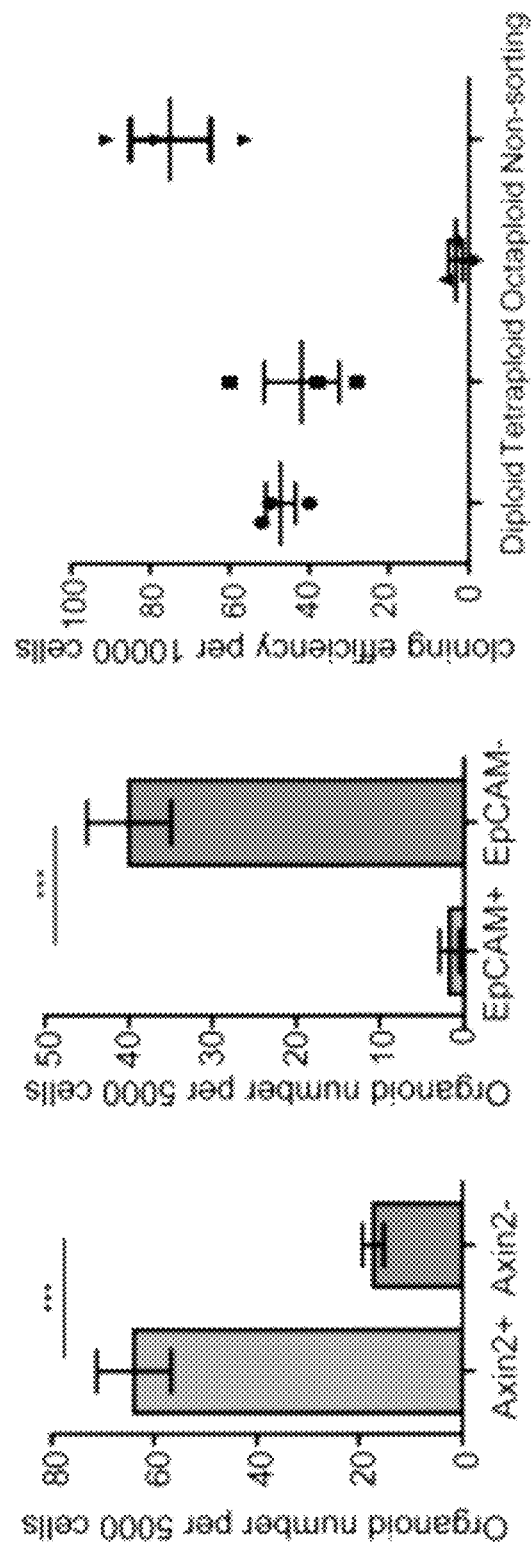
Fig. 8H
Fig. 8G
Fig. 8F

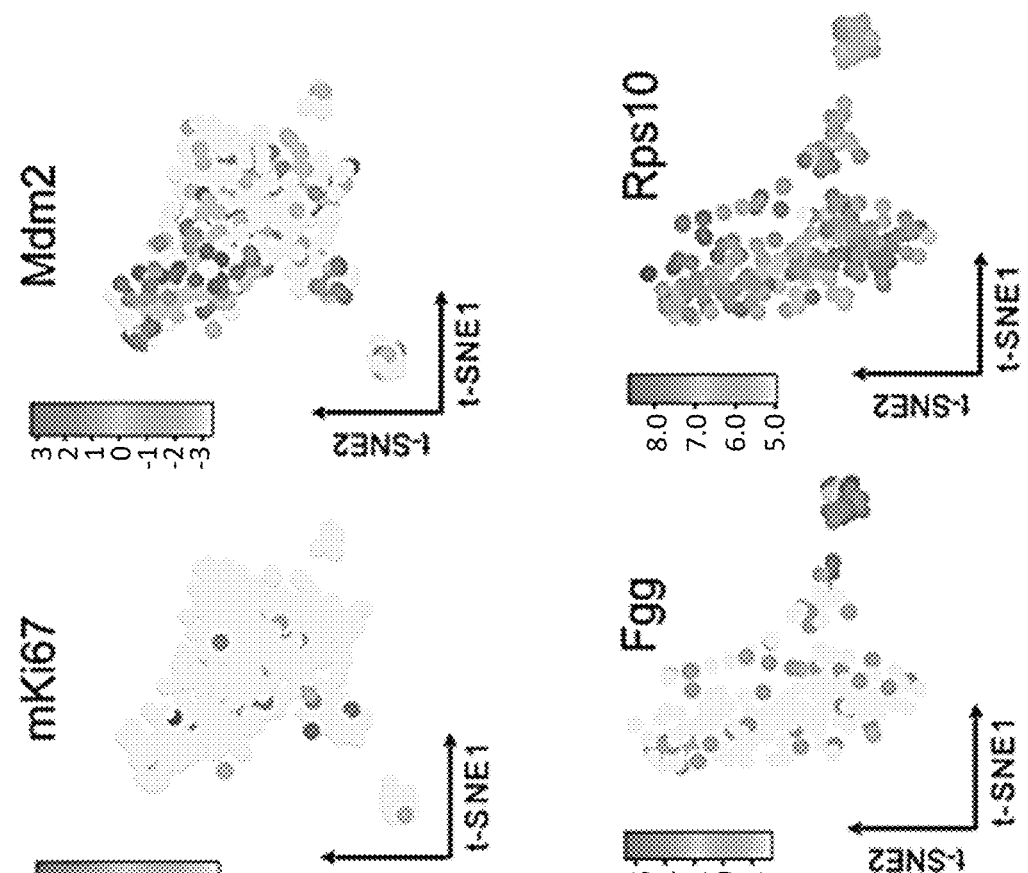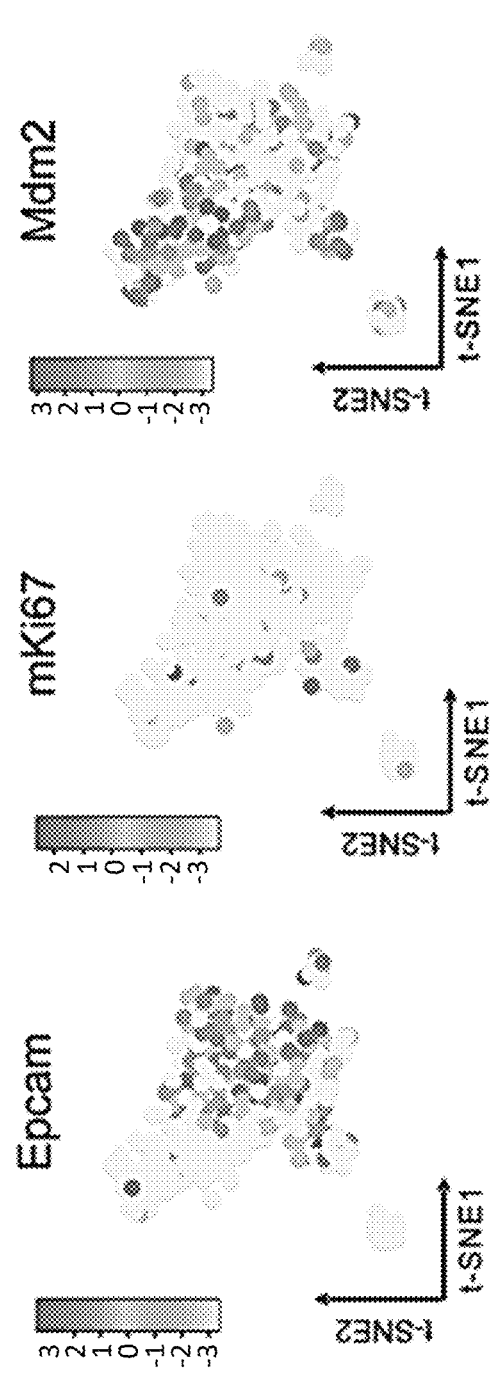
Fig. 11B  Fig. 11C  Fig. 11E
Fig. 11D

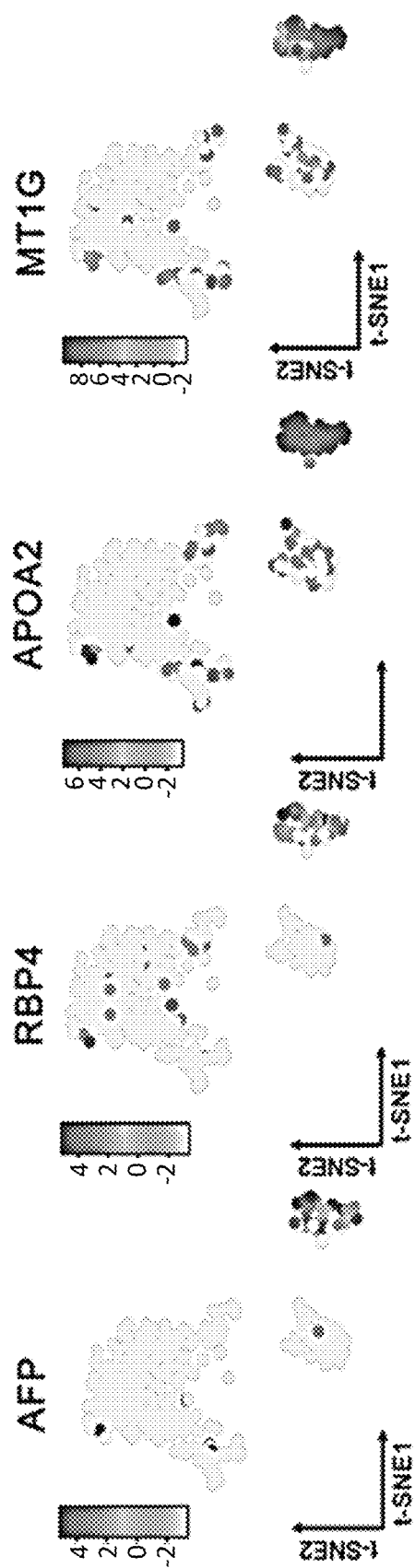
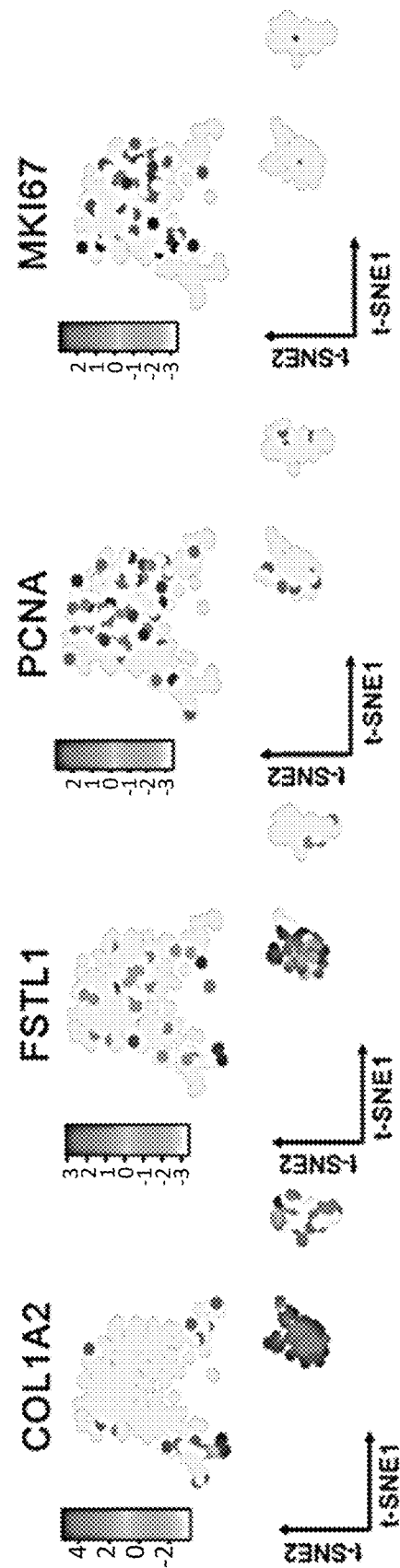
Fig. 13D
Fig. 13E
Fig. 13F

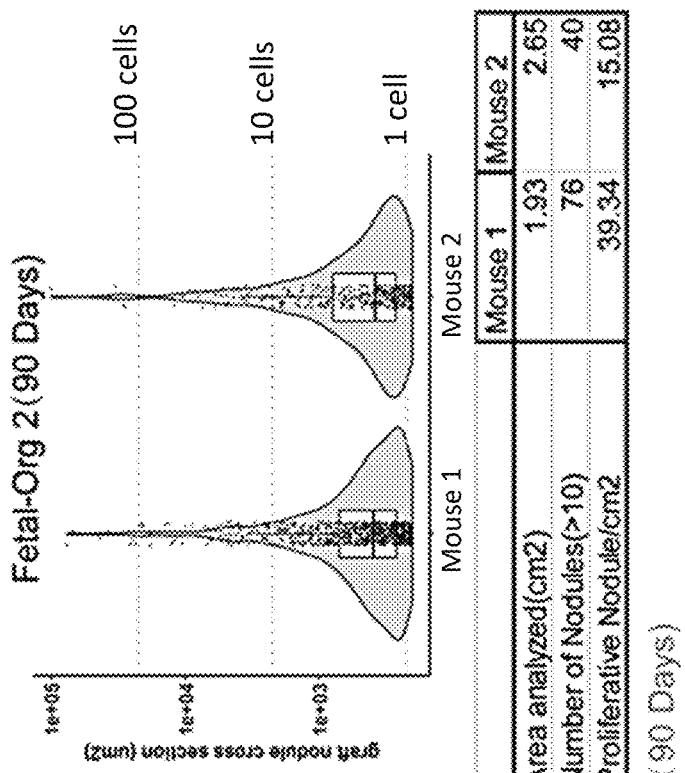
*Fig. 14A*
*Fig. 14B*
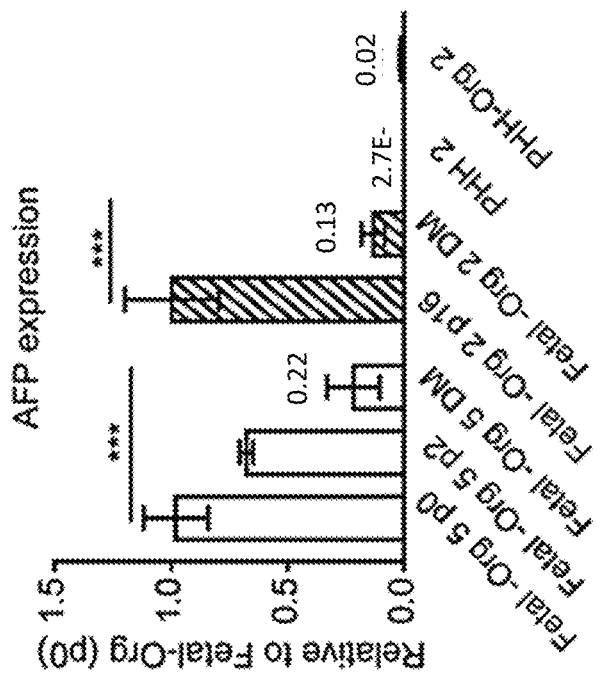
*Fig. 14C*

HEPATOCYTE EXPANSION METHODS

CROSS REFERENCE TO RELATED APPLICATIONS

This application is a national phase entry pursuant to 35 U.S.C. § 371 of International Application No. PCT/EP2019/082618, filed Nov. 26, 2019, which claims the benefit of priority of Great Britain Application No. 1819224.5, filed Nov. 26, 2018, each of which is incorporated by reference herein in its entirety for any purpose.

TECHNICAL FIELD

This invention provides, inter-alia, culture methods and media for in vitro expansion of hepatocytes, hepatocyte cultures and organoids obtainable and obtained by said methods, and uses of said hepatocyte cultures and organoids.

BACKGROUND TO THE INVENTION

The mammalian liver possesses a remarkable regenerative ability. Two modes of damage response have been described: 1) The 'oval cell' response emanates from the biliary tree when all hepatocytes are affected by chronic liver disease. 2) A massive, proliferative response of mature hepatocytes occurs upon acute liver damage such as partial hepatectomy (PHx). While the oval cell response has been captured in vitro by growing organoids from cholangiocytes, the hepatocyte proliferative response has not been recapitulated in culture.

The liver displays a remarkable regenerative capacity in terms of recovery of mass and function upon surgical removal of up to ⅔ of its size partial hepatectomy (PHx), or after liver-wide chemical or infectious injury (Stanger, 2015). The response to partial removal of the liver is particularly impressive as it involves massive cell cycle entry of remaining mature hepatocytes without an apparent de-differentiation into a progenitor/stem cell-like state (Miyajima et al., 2014). The liver will thus grow back to its original size within two weeks after damage (Michalopoulos, 2010). There is good evidence for direct, slow hepatocyte expansion under steady-state conditions in vivo (Wang et al., 2015, Font-Burgada et al., 2015). Proliferation of adult, functional hepatocytes represents the principle mechanism for replacement of lost liver tissue (Stanger, 2015).

An alternative mechanism of liver repair comes into play when noxious agents (toxins, viruses) chronically affect all hepatocytes. Under these circumstances, small cells near the bile duct tree become proliferative ('oval cells'). The prevailing school of thought states that the cholangiocyte-like oval cells represent activated liver stem cells, capable of regenerating hepatocytes as well as new cholangiocytes (Evarts et al., 1987). A long-term 3D liver expansion system of mouse and human adult biliary epithelial-derived progenitor cells that mirrors the in vivo oval cell response has been described (Huch et al., 2013; Huch et al., 2015). Under these defined 3D organoid culture conditions, up to a third of mature Epcam+ biliary cells are capable to undergo rapid dedifferentiation into bipotent progenitor cells that expand as cystic structures and can be passaged for over 6 months (Huch et al., 2015; Li et al., 2017; WO2012/014076; WO2015/173425).

Adult mature hepatocytes can also be reprogrammed into proliferative bipotent progenitor cells in response to chronic liver injury (Tanimizu et al., 2014; Tarlow et al., 2014; Yimlamai et al., 2014; Yanger et al., 2013). Indeed, mature hepatocytes have been demonstrated to display plasticity in vivo by transdifferentiating into cholangiocytes/biliary epithelial cells (Sekiya and Suzuki, 2014; Tanimizu et al., 2014; Yanger et al., 2014; Yanger et al., 2013). Lineage tracing has underscored the existence of hepatocyte-derived progenitor cells (hepPD), yet attempts to culture these in 3D culture initially failed (Malato et al., 2011; Tarlow et al., 2014). A recent study has described a cocktail of three small molecules that can convert rat and mouse hepatocytes in vitro into small, proliferative bipotent cells, termed 'chemically induced liver progenitors' (CLiPs) in 2D. In long-term culture, CLiPs do not resemble hepatocytes morphologically, yet they retain their proliferative capacity and their hepatic differentiation ability, and can repopulate a chronically injured liver (Katsuda et al., 2017).

However, it has generally remained challenging to maintain functional, mature hepatocytes in culture for >1-2 weeks, let alone to induce such hepatocytes to enter the cell cycle and to undergo long term expansion in vitro. Co-culture systems or expression of HPV genes have been described to support limited hepatocyte expansion (Khetani and Bhatia, 2008; Levy et al., 2015). Recent efforts have focused on producing hepatocytes in vitro by differentiation from pluripotent stem cells (embryonic stem cells or induced pluripotent (iPSCs) (Li et al., 2010a; Liang and Zhang, 2013; Lund et al., 2012). Alternatively, it has been proven feasible to induce trans-differentiation of fibroblasts by transfection with reprogramming genes (Huang et al., 2011; Huang et al., 2014; Swenson, 2012; Zhu et al., 2014). While encouraging results are being reported for these approaches, in vitro-produced hepatocyte-like cells do not yet resemble freshly isolated, primary hepatocytes in terms of maturation (Si-Tayeb et al., 2010).

There therefore remains a need for methods which enable expanding hepatocytes in culture for a prolonged period of time, while the expanded cells maintain the morphological, functional and biochemical characteristics of hepatocytes.

SUMMARY OF THE INVENTION

The present invention relates to novel methods for expanding hepatocytes in vitro. According to some embodiments, primary hepatocytes from fetal or adult liver may be expanded using the methods of the invention, optionally wherein the primary hepatocytes to be expanded are extracted from fetal or adult liver of a subject to be treated by cells expanded using the method.

According to some embodiments, hepatocytes expanded using the methods of the invention form hepatocyte organoids (referred to herein also as "Hep-orgs", "the hepatocyte organoids" or "the hepatocyte organoids of the invention"). The hepatocyte organoids may be expanded in culture for a prolonged period of time while maintaining key morphological, functional and gene expression features of primary hepatocytes. According to some embodiments, the hepatocyte organoids and/or cells derived therefrom (optionally single cells derived therefrom) are able to recapitulate the hepatocyte proliferative response (such as that seen following partial hepatectamy) both in vitro and upon transplantation into the liver of a subject. The hepatocyte organoids of the invention are distinct from organoids which originate from expansion of cholangiocytes (also referred to herein as "Chol-orgs") in their morphology, gene-expression, functionality and/or their ability to be engrafted and proliferate in the liver of a subject. Chol-orgs have been previously described, for example in Huch et al., 2013 and Huch et al., 2015.

According to one aspect, provided herein is a method for expanding hepatocytes in vitro (also referred to herein as "the method of the invention"), wherein the method comprises culturing hepatocytes in the hepatocyte culture medium of the invention. The methods of the invention are based in part on the discovery of the hepatocyte culture medium of the invention which enables optimally expanding primary hepatocytes while maintaining their key morphological, functional and gene expression properties. As exemplified herein below (for example in FIG. 12B), removing key components of the hepatocyte culture medium of the invention reduces its ability to enable expansion of primary hepatocytes. According to some embodiments, the method of the invention is a method for generating the hepatocyte organoids of the invention.

According to some embodiments, culturing hepatocytes in the hepatocyte culture medium of the invention is performed while primary hepatocytes, and/or hepatocytes and/or Hep-orgs expanded from them, are in contact with a three dimensional extracellular matrix (ECM), optionally wherein the primary hepatocytes and/or Hep-orgs are grown on and/or embedded in the three dimensional extracellular matrix. Thus, according to some embodiments, the method of the invention comprises culturing primary hepatocytes on and/or within a three dimensional extracellular matrix in the presence of the hepatocyte culture medium of the invention, thus expanding primary hepatocytes, optionally wherein the cells and/or Hep-orgs expanded from the primary hepatocytes are similarly cultured on and/or within a three dimensional extracellular matrix in the presence of the hepatocyte culture medium of the invention.

According to some embodiments, provided herein is the hepatocyte culture medium of the invention. According to some embodiments, the hepatocyte culture medium of the invention comprises:
i. 50 to 500 ng/ml of a Fibroblast Growth Factor (FGF), optionally selected from the group consisting of FGF7, FGF10 and a combination thereof;
ii. a Wnt agonist comprising an R-spondin and at least one glycogen synthase kinase 3 (GSK3) inhibitor;
iii. 5 to 100 ng/ml of epidermal growth factor (EGF);
iv. 5 to 100 ng/ml of hepatocyte growth factor (HGF); and
v. a transforming growth factor beta (TGF-β) inhibitor, comprising an inhibitor of activin receptor-like kinase ALK4, ALK5 and/or ALK7.

Thus, according to some embodiments there is provided herein a method for expanding hepatocytes in vitro, wherein the method comprises culturing hepatocytes in a hepatocyte culture medium, wherein the hepatocyte culture medium comprises:
i. 50 to 500 ng/ml of a Fibroblast Growth Factor (FGF), optionally selected from the group consisting of FGF7, FGF10 and a combination thereof;
ii. a Wnt agonist comprising an R-spondin and at least one glycogen synthase kinase 3 (GSK3) inhibitor;
iii. 5 to 100 ng/ml of epidermal growth factor (EGF);
iv. 5 to 100 ng/ml of hepatocyte growth factor (HGF); and
v. a transforming growth factor beta (TGF-β) inhibitor, comprising an inhibitor of activin receptor-like kinase ALK4, ALK5 and/or ALK7.

The culture medium of the invention is particularly useful for expanding primary hepatocytes. Therefore, according to some embodiments there is provided herein a method for expanding primary hepatocytes in vitro, wherein the method comprises culturing primary hepatocytes in a hepatocyte culture medium, wherein the hepatocyte culture medium comprises:
i. 50 to 500 ng/ml of a Fibroblast Growth Factor (FGF), optionally selected from the group consisting of FGF7, FGF10 and a combination thereof;
ii. a Wnt agonist comprising an R-spondin and at least one glycogen synthase kinase 3 (GSK3) inhibitor;
iii. 5 to 100 ng/ml of epidermal growth factor (EGF);
iv. 5 to 100 ng/ml of hepatocyte growth factor (HGF); and
v. a transforming growth factor beta (TGF-β) inhibitor, comprising an inhibitor of activin receptor-like kinase ALK4, ALK5 and/or ALK7.

In addition, the culture medium of the invention may be used for expanding hepatocytes obtained by the expansion methods of the invention, including hepatocyte organoids or cells derived therefrom. Therefore, according to some embodiments there is provided herein a method for expanding a hepatocyte organoid or hepatocyte cell derived therefrom in vitro, wherein the method comprises culturing the hepatocyte organoid or hepatocyte cell derived therefrom in a hepatocyte culture medium, wherein the hepatocyte culture medium comprises:
i. 50 to 500 ng/ml of a Fibroblast Growth Factor (FGF), optionally selected from the group consisting of FGF7, FGF10 and a combination thereof;
ii. a Wnt agonist comprising an R-spondin and at least one glycogen synthase kinase 3 (GSK3) inhibitor;
iii. 5 to 100 ng/ml of epidermal growth factor (EGF);
iv. 5 to 100 ng/ml of hepatocyte growth factor (HGF); and
v. a transforming growth factor beta (TGF-β) inhibitor, comprising an inhibitor of activin receptor-like kinase ALK4, ALK5 and/or ALK7.

In WO 2015/173425 the inventors demonstrated that adding an activator of the cAMP pathway (also referred to as "a cAMP pathway activator") to a culture medium allows human epithelial stem cells to be cultured for an increased number of passages compared to when the cAMP pathway activator is absent from the medium. However, according to preferred embodiments of the present invention, the hepatocyte culture medium of the invention does not comprise a cAMP pathway activator.

According to some embodiments, the R-spondin is selected from the group consisting of: R-spondin 1 (RSPO1), R-spondin 2 (RSPO2), R-spondin 3 (RSPO3), R-spondin 4 (RSPO4), an active fragment or variant thereof, and a combination thereof. According to some embodiments, the R-spondin in the R-spondin conditioned medium is R-spondin 1 (RSPO1).

According to some embodiments, the R-spondin is provided as conditioned medium and is at a concentration of 5%-50%, 5%-40%, 5%-35%, 10%-30%, 10%-20%, 12%-17%, or preferably about 15% (vol/vol) within the hepatocyte culture medium. According to some embodiments, the R-spondin conditioned medium is at a concentration of about 15% (vol/vol) within the hepatocyte culture medium. According to some embodiments, the Wnt agonist in the hepatocyte culture medium of the invention comprises of about 15% (vol/vol) of R-spondin.

According to some embodiments, the GSK3 inhibitor in the hepatocyte culture medium of the invention is at a concentration of 1 to 10 µM, 0.5 to 5 µM, 1 to 5 µM, 2 to 4 µM, or preferably about 3 µM. According to some embodiments, the GSK3 inhibitor in the hepatocyte culture medium of the invention is at a concentration of about 3 µM.

According to some embodiments, the GSK3 inhibitor in the hepatocyte culture medium of the invention is selected from the group consisting of: CHIR99021, SB216763, TWS119, 5-bromoindole, SB415286, BIO, AZD2858, AZD1080, AR-A014418, TDZD-8, LY2090314, BIO-acetoxime, 1-Azakenpaullone and a combination thereof. According to some embodiments, the GSK3 inhibitor in the hepatocyte culture medium of the invention is CHIR99021. According to some embodiments, the GSK3 inhibitor in the hepatocyte culture medium of the invention is CHIR99021 in a concentration of about 3 µM.

According to some embodiments, the hepatocyte culture medium of the invention comprises FGF7. According to some embodiments, the hepatocyte culture medium of the invention comprises FGF7 at a concentration of 50 to 400 ng/ml, 50 to 300 ng/ml, 75 to 200 ng/ml, 80 to 150 ng/ml or preferably about 100 ng/ml. According to some embodiments, the hepatocyte culture medium of the invention comprises FGF7 at a concentration of about 100 ng/ml.

According to some embodiments, the hepatocyte culture medium of the invention comprises FGF10. According to some embodiments, the hepatocyte culture medium of the invention comprises FGF10 at a concentration of 50 to 400 ng/ml, 50 to 300 ng/ml, 75 to 200 ng/ml, 80 to 150 ng/ml or preferably about 100 ng/ml. According to some embodiments, the hepatocyte culture medium of the invention comprises FGF10 at a concentration of about 100 ng/ml.

According to some embodiments, the hepatocyte culture medium of the invention comprises FGF7 and FGF10. According to some embodiments, the hepatocyte culture medium of the invention comprises FGF7 and FGF10, each at a concentration of about 100 ng/ml.

According to some embodiments, the hepatocyte culture medium of the invention comprises EGF at a concentration of 10 ng/ml to 100 ng/ml, 20 ng/ml to 100 ng/ml, 20 ng/ml to 80 ng/ml, 40 ng/ml to 80 ng/ml, or preferably about 50 ng/ml. According to some embodiments, the hepatocyte culture medium of the invention comprises EGF at a concentration of about 50 ng/ml.

According to some embodiments, the hepatocyte culture medium of the invention comprises HGF at a concentration of 10 ng/ml to 100 ng/ml, 20 ng/ml to 100 ng/ml, 20 ng/ml to 80 ng/ml, 40 ng/ml to 80 ng/ml, or preferably about 50 ng/ml. According to some embodiments, the hepatocyte culture medium of the invention comprises HGF at a concentration of about 50 ng/ml.

According to some embodiments, the hepatocyte culture medium of the invention comprises TGF-§ inhibitor at a concentration of 1 to 10 µM, 0.5 to 5 µM, 1 to 4 µM, 1 to 3 µM, or preferably about 2 µM. According to some embodiments, the hepatocyte culture medium of the invention comprises a TGF-§ inhibitor at a concentration of about 2 µM. According to some embodiments, the TGF-§ inhibitor is an inhibitor of the activin receptor-like kinase ALK4, ALK5 and/or ALK7 signalling pathway. According to some embodiments, the TGF-§ inhibitor is an inhibitor of activin receptor-like kinase ALK4, ALK5 and/or ALK7. According to some embodiments, the TGF-§ inhibitor is an inhibitor of activin receptor-like kinase ALK4, ALK5 and/or ALK7. According to some embodiments, the TGF-§ inhibitor is an inhibitor of activin receptor-like kinase ALK4, ALK5 and/or ALK7 selected from the group consisting of: A83-01, SB-431542, SB-505124, EW-7197, LY-2157299, GW6604 and a combination thereof. According to some embodiments, the TGF-§ inhibitor is A83-01, an inhibitor of activin receptor-like kinase ALK4, ALK5 and/or ALK7. According to some embodiments, the TGF-§ inhibitor of the hepatocyte culture medium of the invention is A83-01 at a concentration of about 2 µM.

According to some embodiments, the hepatocyte culture medium of the invention comprises nicotinamide. According to some embodiments, the hepatocyte culture medium of the invention comprises nicotinamide at a concentration of 1 to 100 mM, 1 to 50 mM, 1 to 30 mM, 1 to 20 mM, 5 to 20 mM, 5 to 15 mM, or preferably about 10 mM. According to some embodiments, the hepatocyte culture medium of the invention comprises nicotinamide at a concentration of about 10 mM.

According to some embodiments, the hepatocyte culture medium of the invention comprises gastrin. According to some embodiments, the hepatocyte culture medium of the invention comprises gastrin at a concentration of 1 to 100 nM, 1 to 50 nM, 1 to 30 nM, 1 to 20 nM, 5 to 20 nM, 5 to 15 nM, or preferably about 10 nM. According to some embodiments, the hepatocyte culture medium of the invention comprises gastrin at a concentration of about 10 nM.

According to some embodiments, the hepatocyte culture medium of the invention comprises further comprises transforming growth factor alpha (TGF-α) (also referred to herein as TGFa). According to some embodiments, the hepatocyte culture medium of the invention comprises TGF-α at a concentration of 1 to 50 ng/ml, 5 to 35 ng/ml, 10 to 30 ng/ml, 15 to 25 ng/ml, or preferably about 20 ng/ml. According to some embodiments, the hepatocyte culture medium of the invention comprises TGF-α at a concentration of about 20 ng/ml.

According to some embodiments, the hepatocyte culture medium of the invention comprises further comprises a Rho-associated protein kinase (ROCK) inhibitor. According to some embodiments, the ROCK inhibitor is selected from the group consisting of: Y-27632, GSK429286A, Fasudil, Thiazovivin, Rho Kinase Inhibitor IV and a combination thereof. According to some embodiments, the ROCK inhibitor is Y-27632. According to some embodiments, the hepatocyte culture medium of the invention comprises ROCK inhibitor at a concentration of 1 to 50 µM, 1 to 30 µM, 1 to 20 µM, 5 to 20 µM, 5 to 15 µM, or preferably about 10 µM. According to some embodiments, the hepatocyte culture medium of the invention comprises ROCK inhibitor is at a concentration of about 10 µM. According to some embodiments, the hepatocyte culture medium of the invention comprises Y-27632 at a concentration of about 10 µM.

According to some embodiments, the hepatocyte culture medium of the invention comprises further comprises N-acetylcysteine. According to some embodiments, the hepatocyte culture medium of the invention comprises further comprises N-acetylcysteine at a concentration of 0.5 to 5 mM, 0.5 to 4 mM, 1 to 4 mM, 1 to 2 mM, 1 to 1.5 mM, or preferably about 1.25 mM. According to some embodiments, the hepatocyte culture medium of the invention comprises N-acetylcysteine at a concentration of about 1.25 mM.

According to some embodiments, the hepatocyte culture medium of the invention further comprises the B27 supplement. According to some embodiments, the hepatocyte culture medium of the invention comprises further comprises the B27 supplement not containing vitamin A. As used herein the B27 supplement not containing vitamin A refers to 'B27 Supplement minus Vitamin A' (available from Invitrogen, Carlsbad, CA; invitrogen.com; currently catalog no. 12587010; and from PAA Laboratories GmbH, Pasching, Austria; paa.com; catalog no. F01-002; Brewer et al., J Neurosci Res., 35(5):567-76, 1993)

According to some embodiments, the hepatocyte culture medium of the invention further comprises a cell growth medium. According to some embodiments, the cell growth medium comprises antibiotics, optionally penicillin and streptomycin. According to some embodiments, the cell growth medium is AdDMEM/F12 (by Invitrogen), optionally comprising Hepes (e.g. 10 mM) and/or the Glutamax supplement (Gibco).

According to some embodiments, hepatocytes expanded according to the method of the present invention are cultured in contact with an extracellular matrix (ECM) in the presence of the hepatocyte culture medium of the invention. The extracellular matrix is preferably an exogenous extracellular matrix (meaning that it is not secreted by the cells that are being cultured). In some embodiments the extracellular matrix is a three dimensional extracellular matrix. In other embodiments the extracellular matrix is in suspension. According to some embodiments, the method of the present invention further comprises contacting the primary hepatocytes with a three dimensional extracellular matrix (ECM). According to some embodiments, contacting cells with a three dimensional extracellular matrix (ECM) comprising seeding cells on and/or within the three dimensional extracellular matrix. According to some embodiments, contacting cells with a three dimensional extracellular matrix refers to mixing the cells with a non-solid three dimensional matrix and then allowing the matrix to solidify, thus embedding the cells in and/or on the three dimensional matrix. According to some embodiments, the method of the present invention further comprises contacting the primary hepatocytes with a three dimensional extracellular matrix (ECM) prior to culturing the primary hepatocytes with the hepatocyte culture medium of the invention. According to some embodiments, the method of the invention comprises a step of embedding the primary hepatocytes in a three dimensional extracellular matrix (ECM), followed by culturing the embedded cells and three dimensional matrix in the hepatocyte culture medium of the invention. According to some embodiments, the three dimensional extracellular matrix comprises and/or is prepared using the hepatocyte culture medium of the invention. According to some embodiments, the three dimensional extracellular matrix is selected from the group consisting of: a synthetic ECM, a natural ECM and a combination thereof. According to some embodiments, the three dimensional ECM comprises Matrigel™. According to some embodiments, the three dimensional extracellular matrix comprises the hepatocyte culture medium of the invention at a medium:matrix ratio of 1:1, 1:2, or preferably 1:3. According to some embodiments, the three dimensional ECM comprises Matrigel™ and the hepatocyte culture medium of the invention, optionally in a medium:matrix ratio of 1:3.

According to some embodiments, the primary hepatocytes expanded by the method of the invention are isolated from liver tissue. According to some embodiments, the primary hepatocytes expanded by the method of the invention are isolated from liver tissue, wherein the liver tissue is an explant or a liver sample, optionally from a subject to be administered with the expanded hepatocytes. According to some embodiments, the method of the invention further comprises isolating the primary hepatocytes to be expanded from liver tissue. According to some embodiments, isolating primary hepatocytes comprises collagenase digestion.

According to some embodiments, the primary hepatocytes which are expanded by the method of the invention are mammalian hepatocytes, such as murine or human hepatocytes. Without wishing to be bound by any theory or mechanism, the expanded murine hepatocytes and/or Hep-orgs may be used in hepatocyte or liver research, or to test the potential effect of certain substances on the liver (e.g. therapeutics or toxins). Expanded human hepatocytes and/or Hep-orgs may be similarly used in research but may also be transplanted into a subject in need of liver regeneration (e.g. following partial hepatectamy) or a subject afflicted with a disease or condition which results in or is associated with liver damage.

According to some embodiments, the hepatocytes which are expanded by the method of the invention may be fetal hepatocytes, adult hepatocytes and a combination thereof. According to some embodiments, the primary hepatocytes which are expanded by the method of the invention may be fetal primary hepatocytes, adult primary hepatocytes (also referred to herein as "adult primary human hepatocytes") and a combination thereof, preferably wherein the primary hepatocytes are human ("PHHs"). According to some embodiments, the primary hepatocytes which are expanded by the method of the invention are albumin-expressing hepatocytes. According to some embodiments, the primary hepatocytes which are expanded by the method of the invention are diploid or tetraploid. According to some embodiments, the primary hepatocytes which are expanded by the method of the invention are not octaploid.

According to some embodiments, expanding hepatocytes using the method of the invention results in formation of one or more hepatocyte organoids (also referred to herein as "the hepatocyte organoids of the invention" or "Hep-orgs"). According to some embodiments, expanding hepatocytes using the method of the invention results in hepatocyte organoids and/or in hepatocytes which are not part of hepatocyte organoids. According to some embodiments, expanding fetal hepatocytes using the method of the invention results in hepatocyte organoids also referred to herein as "Fetal-organoids" or "Fetal-Orgs". According to some embodiments, expanding adult primary human hepatocytes using the method of the invention results in hepatocyte organoids also referred to as "PHH-orgs". According to some embodiments, PHH-orgs re-express alpha-fetoglobulin (Afp).

According to some embodiments, the hepatocyte organoids and/or the hepatocytes expanded by the method of the invention are capable of being further expanded in culture for at least 10, 11, 12, 13, 14, 15, 16, 17, 18, 19, 20, 25, 30, 35, 40, 45 or 50 passages. According to some embodiments, the hepatocyte organoids and/or the hepatocytes expanded by the method of the invention are capable of being further expanded in culture for at least 3, 4, 5, 6, 10, 12, 15, 18, 20 or 24 months. According to some embodiments, PHH-orgs expanded by the method of the invention are capable of being further expanded in culture for at least 1, 1.5, 2, 2.5, 3, 3.5, 4, 4.5 or 5 months. According to some embodiments, the Fetal-orgs expanded by the method of the invention are capable of being further expanded in culture for at least 10, 11, 12, 13, 14, 15, 16, 17, 18, 19, 20, 25, 30, 35, 40, 45 or 50 passages.

According to some embodiments, the hepatocyte organoids generated by the method of the invention expand exponentially, optionally wherein the expansion is at a ratio of about 1:3 every 7-10 days.

According to some embodiments, the hepatocyte organoids generated by the method of the invention have a plating efficiency of at least 0.5%, 0.6%, 0.7%, 0.8%, 0.9% or 1%.

According to another aspect, provided herein are hepatocyte organoids generated by the method of the invention. According to some embodiments, provided herein is a culture of hepatocytes, comprising hepatocyte organoids generated by the method of the invention. According to some embodiments, provided herein are single cells and/or a culture of single cells prepared from the hepatocyte organoids generated by the method of the invention.

According to some embodiments, the hepatocyte organoids generated by the method of the invention comprise a lumen. According to some embodiments, the hepatocyte organoids generated by the method of the invention comprise a small lumen and large cells, as opposed to large lumen and flat cells typical for organoids generated from cholangiocytes.

According to some embodiments, the hepatocyte organoids generated by the method of the invention comprise characteristics of whole liver and primary hepatocyte morphology and function selected from the group consisting of: glycogen accumulation, functional uptake of Low Density Lipoprotein (LDL), nuclei comprising prominent nucleoli having a fibrillar centre and de-condensed chromatin, large numbers of mitochondria with few and short cristae, bile canaliculi, tight junctions, peroxisomes, lysosomes, multivesicular bodies, autophagic vacuoles and a combination thereof.

According to some embodiments, the hepatocyte organoids generated by the method of the invention secrete at least one of albumin, alpha-1 antitrypsin (A1AT), alpha-fetoglobulin (Afp) and a combination thereof.

According to some embodiments, the hepatocyte organoids generated by the method of the invention demonstrate gene expression comparable to that of the primary hepatocytes for genes selected from the group consisting of: albumin, Apolipoprotein A2 (APOA2), Serpin family member 1 (SERPINA1) and a combination thereof.

According to some embodiments, the hepatocyte organoids generated by the method of the invention do not express marker genes typically expressed in cholangiocytes. According to some embodiments, the hepatocyte organoids generated by the method of the invention express genes which are typically not expressed in cholangiocytes. According to some embodiments, the expression of functional hepatocyte genes, such as, but not limited to, genes related to cytochrome P450 activity, glycogen/lipid metabolism and/or urea cycle, is comparable in Hep-orgs from fetal or adult origin and fetal hepatocytes or adult primary human hepatocytes, respectively. According to some embodiments, the hepatocyte organoids generated by the method of the invention demonstrate lower expression of progenitor/cholangiocyte marker genes than that seen organoids originating in cholangiocytes. Non-limiting examples of such progenitor/cholangiocyte marker genes are EPCAM, SOX9, KRT8/18 and KRT7/19.

According to another aspect, provided herein are the hepatocyte organoids generated by the method of the invention and/or single cells derived therefrom for use in medicine or diagnostics.

According to some embodiments, provided herein are the hepatocyte organoids generated by the method of the invention for use in screening the potential effect of a substance on hepatocytes in-vivo, optionally for use in screening for a therapeutic or a toxic effect. Without wishing to be bound by theory or mechanism, the hepatocyte organoids generated by the method of the invention may provide a suitable in vitro model for accurately screening and predicting the effect of substances on liver tissue in-vivo due to its high morphological and functional similarity to liver tissue According to some embodiments, provided herein are the hepatocyte organoids generated by the method of the invention for use in treating a disease or condition which is caused by and/or associated with damaged hepatocytes in the liver of a subject. Without wishing to be bound by theory or mechanism, the hepatocyte organoids generated by the method of the invention are able to become engrafted and proliferate in the liver of a subject, thus may be able to replace damaged liver tissue and treat diseases and conditions in which liver tissue is damages (and in particular hepatocytes). According to some embodiments, a disease or condition which is caused by and/or associated with damaged hepatocytes in the liver of a subject is selected from the group consisting of: Hepatocellular Carcinoma, Alagille Syndrome, Alpha-1-Antitrypsin Deficiency, Autoimmune Hepatitis, Biliary Atresia, Chronic Hepatitis, Cancer of the Liver, Cirrhosis, Liver Cysts, Fatty Liver Disease, Galactosemia Gilbert's Syndrome, Primary Biliary Cirrhosis, Hepatitis A, Hepatitis B, Hepatitis C, Primary Sclerosing Cholangitis, Reye's Syndrome, Sarcoidosis, Tyrosinemia, Type I Glycogen Storage Disease, Wilson's Disease, Neonatal Hepatitis, Non-alchoholic SteatoHepatitis, Porphyria, Hemochromatosis, Progressive familial intrahepatic cholestasis, Glycogen storage disease type III, Tyrosinemia, Deoxyguanosine kinase deficiency, Pyruvate carboxylase deficiency, Congenital dyserythropoietic anemia, Polycystic Liver Disease Polycystic Kidney Disease, Alpha-1 antitrypsine deficiency, Ureum cycle defects, Organic acidemiea, lysosomal storage diseases, Fatty Acid Oxydation Disorders, and a combination thereof.

According to some embodiments, provided herein are the hepatocyte organoids generated by the method of the invention for use in a method of repairing a liver which underwent damage and/or underwent at least partial hepatectamy (HPx), the method comprising transplanting the hepatocyte organoids and/or the single cells derived therefrom into the liver. According to some embodiments, provided herein are the hepatocyte organoids generated by the method of the invention for use in a method for regenerating liver tissue in a subject in need thereof, the method comprising transplanting the hepatocyte organoids and/or the single cells derived therefrom into the liver. According to some embodiments, transplanting the hepatocyte organoids and/or the single cells derived therefrom is via splenic injection. According to some embodiments, methods of treatment, transplantation and/or regeneration as disclosed herein are performed using single cells derived from the hepatocyte organoids of the invention. The skilled person will be able to select an appropriate method and route of administration depending on the material that is being transplanted (i.e. population of cells, single cells in cell suspension, organoids or fragments of organoids).

Without wishing to be bound by theory or mechanism, the hepatocyte organoids of the invention can engraft onto the liver of the transplanted subject and recapitulate the hepatocyte proliferative response following damage, thus enabling regeneration of damaged and/or removed liver tissue.

According to some embodiments, methods comprising transplanting Fetal-orgs or cells (e.g. single cells) derived therefrom into the liver of a subject further comprise a step of differentiating the cells. According to some embodiments, methods comprising treatment, diagnosis and/or screening using Fetal-orgs or single cells derived therefrom into the liver of a subject further comprise a step of differentiating the cells. According to preferred embodiments, differentiating the cells of Fetal-orgs or cells derived therefrom is performed prior to transplanting or the cells into a subject, using the cells to treat a subject or using the cells in vitro for screening and/or diagnosis. Without wishing to be bound by theory or mechanism, differentiating organoids derived from fetal hepatocytes prior to transplanting them into a subject may improve transplantability and engraftment of the cells into the liver of the subject, thus potentially accelerating and/or improving liver regeneration/treatment. According to some embodiments, fetal-orgs and/or single cells derived therefrom that may benefit from differentiation prior to transplantation into a subject are derived from primary hepatocytes isolated from a human fetus, optionally wherein the fetus is at about week 5-30 of gestation, optionally at about week 10-20 of gestation.

Thus, according to some embodiments, provided herein is a method for repairing a liver which underwent damage and/or underwent at least partial hepatectamy (HPx), the method comprising transplanting the hepatocyte organoid and/or the single cells derived therefrom into the liver, wherein the hepatocyte organoid was expanded from fetal primary hepatocytes and wherein the method for repairing a liver further comprises differentiating the hepatocyte organoid and/or the single cells derived therefrom, optionally wherein differentiating is prior to transplanting the hepatocyte organoid and/or the single cells derived therefrom.

According to some embodiments, differentiating the cells of Fetal-orgs and/or single cells derived therefrom is performed by culturing the cells in a differentiation medium (also referred to herein as "DM"). Thus the invention also provides a differentiation medium. According to some embodiments, the differentiation medium increases maturation of the fetal-orgs and/or cells derived therefrom. According to some embodiments, the differentiation medium comprises at least one of dexamethasone and oncostatin M. According to some embodiments, the differentiation medium comprises dexamethasone and oncostatin M. According to some embodiments, the differentiation medium comprises the hepatocyte culture medium of the invention and at least one of dexamethasone and oncostatin M. According to some embodiments, the differentiation medium comprises the hepatocyte culture medium of the invention supplemented by dexamethasone and oncostatin M. According to some embodiments, the dexamethasone is at a concentration of about 1 µM. According to some embodiments, the oncostatin M is at a concentration of about 10 ng/ml. According to some embodiments, the dexamethasone is at a concentration of about 1 µM and the oncostatin M is at a concentration of about 10 ng/ml. According to some embodiments, the dexamethasone is at a concentration of 0.5, 0.6, 0.7, 0.8, 0.9, 1, 1.2, 1.3, 1.4, 1.5, 2, 3, 4 or 5 µM. According to some embodiments, the oncostatin M is at a concentration of about 5, 6, 7, 8, 9, 10, 11, 12, 13, 14, 15, 20 ng/ml.

According to some embodiments, provided herein is a differentiation medium for maturation of fetal hepatocytes, wherein the differentiation medium comprises the hepatocyte medium of the invention and further comprises dexamethasone and oncostatin M, optionally at concentrations of about 1 µM and about 10 ng/ml, respectively. According to some embodiments, the differentiation medium of the fetal hepatocyte organoids of the invention comprises all elements indicated in Table 2 under "Human Fetal-Orgs differentiation medium (DM)". According to some embodiments, provided herein is a differentiation medium for maturation of fetal hepatocytes, wherein the differentiation medium comprises all elements indicated in Table 2 under "Human Fetal-Orgs differentiation medium (DM)".

Figure 1A:
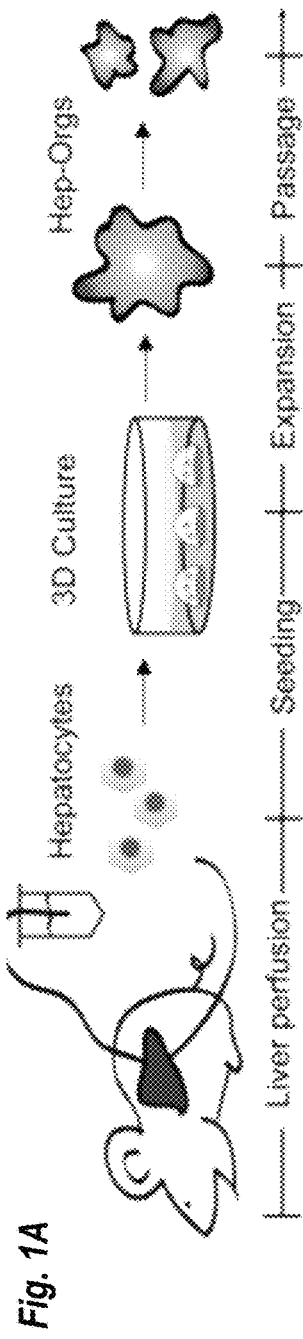
FIG. 1—Establishment of 3D culture system of murine hepatocyte organoids.

(A) Schematic depicting the isolation and seeding of primary hepatocytes, and the expansion and passage of Hep-Orgs.
(B) Differential interference contrast (DIC) images of Hep-Orgs at Passage 0 (P0) Day 20 cultured from primary hepatocytes of wildtype C57BL/6 mice. Lower magnification (Left, Black Scale Bar=50 µm), Higher magnification (Right, Black Scale Bar=12.5 µm).
(C) Numbers of organoids formed per 10,000 hepatocytes. Experiments were performed in triplicate and on independent C57BL/6 mice. Data are represented as mean±SEM.
(D) Differential interference contrast (DIC) images of Chol-Orgs at Passage 2 Day 3 (Left, Black Scale Bar=50 µm); Higher magnification (Right, Black Scale Bar=12.5 µm).
(E) Confocal image of paraffin section of a Hep-Org co-stained for proliferation marker mKi67 (Red), the adhesion junction marker β-catenin (Yellow) and DAPI (Blue). Scale Bar=25 µm.
(F) Transmission EM (TEM) of Hep-Orgs shows typical hepatocyte structures. (I) Overview of cell morphology; (II)-(V) Typical hepatocyte structures (Indicated by arrows). N=Nucleus; Mv=Microvilli; Tj=Tight junction; Bc=Bile canaliculi-like structures; Cv=Coated vesicles; Ld=Lipid droplets, Si=Sinusoid. Scale Bar=2 µm.
(G) A clonal Hep-Org grown from a single primary hepatocyte (tdTomato+) from a tamoxifen-induced Albumin-CreERT2; Rosa26-LSL-tdTomato mouse. Images were taken on different days of primary culture, as indicated. Scale Bar=25 µm.

FIG. 2—Characterization of mouse hepatocyte organoids.

(A) Confocal z-stack (left) and single plane (right) images of Hep-Orgs. Albumin (Green), E-cadherin (Red, right panel), and DAPI (Blue). Scale Bar=20 µm.
(B) Confocal z-stack (left) and single plane (right) images of mouse Chol-Orgs. Krt7 (Blue), Krt19 (Red), and DAPI (White). Scale Bar=20 µm.
(C)+(D) qRT-PCR analysis of gene expression of hepatocyte markers (C) and cholangiocyte/progenitor markers (D) in Hep-Orgs and Chol-Orgs relative to primary hepatocytes. Graph presents mean results from 4 replicates from three independent mice. Data are represented as mean±SEM.  indicates p<0.01, * indicates p<0.001.
(E) Glycogen accumulation evaluated by Periodic-Acid Schiff (PAS) staining (Dark Pink) in Hep-Orgs. Nuclei were stained with hematoxylin (Blue). Scale Bar=20 µm.
(F) Low density lipoprotein (LDL) uptake was analyzed by Dil-ac-LDL fluorescent staining (Red) in cultured Hep-Orgs. Nuclei were stained with DAPI (Blue). Scale Bar=20 µm.
(G) Albumin secretion measured after 24 h culturing of primary hepatocytes, Hep-Orgs of Passage 0 (P0) Day15 and Passage 3 (P3) and Chol-Orgs in expansion medium (EM) or differentiation medium (DM). Results are indicated as picograms of albumin per cell. Data are represented as mean SEM.
(H) Measurement of cytochrome activity (Cyp1a2) in cultured primary hepatocytes, Hep-Orgs of p0 Day15 and p3. Relative light units (RLU) per ml per million cells is indicated. Data are represented as mean SEM.
(I) Heatmap of liver gene expression determined by mRNA sequencing comparing three independent Hep-Orgs, (p1) with primary hepatocytes (n=1), and three independent Chol-Orgs (p8-p12) in expansion medium (EM) (Full gene list in FIG. 9K).

FIG. 3—Hep-Orgs recapitulate hepatocyte proliferation upon partial hepatectomy.
- (A) PCA plot showing the clustering of Hep-Orgs at different passages and their clear distinction from Chol-Orgs (Passage 1, 3, and 7 is labelled as P1, P3 and P7). Note the very small variance (5%) on PC2.
- (B) Heatmap of major hepatic markers in primary hepatocytes, Hep-Orgs and Chol-Orgs (from M1 and M2, two separate mouse donors, Passage 1, 3, and 7 is labelled as P1, P3 and P7).
- (C) Correlation plot showing Pearson's correlation coefficient between biological replicates of Chol-Orgs, Hep-Orgs at Passage 1, 3, and 7, PHx and undamaged (Hep) hepatocytes. Color intensities and the size of the circles are proportional to the correlation coefficients. Samples are ordered based on hierarchical clustering and rectangles in the graph are based on the results of the hierarchical clustering. Correlation is based on the Top 1000-highest expressed genes.
- (D) GSEA enrichment analysis of Hep-Orgs (biological replicates at Passage 1, 3, 7) vs Primary Hepatocytes as compared to the list of differentially expressed genes between mouse liver three days post-PHx compared with non-damaged liver obtained by mRNA sequencing (top) or microarray (bottom). Enrichment of up-regulated genes after 3 days of partial hepatectomy: Left panel); enrichment of down-regulated genes after 3 days of partial hepatectomy: Right panel.

FIG. 4—Single cell transcriptome analysis of Hep-Orgs
- (A) Overview of single cell sequencing experiment of Hep-Orgs and Chol-Orgs and hepatocytes isolated from Albumin-CreERT2; Rosa26-LSL-tdTomato mice ("undamaged control") or 3 days after ⅔ partial hepatectomy ("regeneration").
- (B) t-SNE maps indicating origin of individual cells: Hep-Org cells (Green), Chol-Org cells (Blue).
- (C)+(D) t-SNE plot showing the expression of Alb (C) and Krt7 (D) in single cells derived from Hep-Orgs and Chol-Orgs. Expression is given as normalized log 2 value.
- (E) t-SNE map of all cell clusters from Hep-Orgs obtained by RaceID2 algorithm.
- (F)-(H) t-SNE plot showing the expression levels of Alb (F), Pcna (G), and Krt7 (H) in Hep-Orgs. Expression is given as normalized log 2 value.
- (I) GSEA of genes in Hep-Orgs vs primary hepatocytes. Expression enrichment was compared to a gene set of differentially expressed genes generated by comparing mouse liver three days after partial hepatectomy compared with control non-damaged liver. Enrichment of up-regulated genes at 3 days post-PHx: upper panel; enrichment of down-regulated genes at 3 days of post-PHx (lower panel).
- (J) Violin plot comparing the expression of markers in undamaged hepatocytes, post-PHx hepatocytes isolated and Hep-Orgs. Expression of cell cycle-/growth-related genes is given in the top row. Markers were selected for their specific expression in regenerating liver, but unrelated to cell cycling (bottom-three rows). Transcript counts are provided on log 10 scale.

FIG. 5—Establishment of Hep-Orgs from human hepatocytes.
- (A) DIC images of Hep-Orgs from fetal liver on p0 Day21 (Fetal-Orgs, left panel), Black Scale Bar=40 μm or from primary human hepatocytes (PHHs) on p0 Day19 (PHH-Orgs, right panel), Black Scale Bar=20 μm.
- (B) Numbers of Hep-Orgs formed per 10,000 Fetal-Heps or PHHs. Experiments were performed in triplicate. Data are represented as mean±SEM.
- (C) DIC image showing p5 Chol-Orgs from human adult liver, Black Scale Bar=200 μm
- (D) Transmission EM of Fetal-Orgs (D) I Overview of cell morphology, Scale Bar=2 μm; II typical hepatocyte structures, Scale Bar=1 μm; III typical hepatocyte structures, Scale Bar=2 μm. N=Nuclear; Nu=Nucleoli, Gly=Glycogen, Mit=Mitochondria, Mv=Microvilli, Tj=Tight junction, GJ=Gap junction, RER=Rough endoplasmic reticulum, Bc=Bile canaliculi-like structures (black arrow), Av=Autophagic vacuoles (white arrow).
- (E) Transmission EM of PHH-Orgs and Chol-Orgs (right panel). PHH-Orgs show typical hepatocyte structures. Mvb=Multivesicular bodies, Po=Peroxisomes.
- (F) Confocal images of (z-stack projection) of human Fetal-Orgs. ALB (Cyan), HNF4A (Green), F-ACTIN (Red), and DAPI (White), Scale bale=20 μm.
- (G) Confocal image of whole mount staining of MRP2 and F-ACTIN (3D reconstruction) of human Fetal-Orgs (P26).
- (H) Low density lipoprotein (LDL) uptake was analyzed by Dil-ac-LDL fluorescent staining (Red) in cultured human Fetal-Orgs. Nuclei were stained with DAPI (Blue). Scalebale=20 μm.
- (I) Glycogen accumulation evaluated by PAS staining (Dark Pink) in human Fetal-Orgs. Nuclei were stained with hematoxylin (Blue). Scale bale=20 μm.
- (J) Albumin secretion by PHHs (White), PHH-Orgs derived from the same PHH batch (White striped), fetal hepatocytes (Fetal-Heps, Grey), six independent Fetal Hep-Org cultures (Grey striped) and differentiated Chol-Orgs (Black). "Late" indicates P22 cultures from one well. Results are indicated as micrograms of albumin per day per million cells. Data are represented as mean±SEM.
- (K) Measurement of cytochrome activity CYP3A4 in PHH-Orgs (Striped) compared with PHHs from which they were derived (White) and with four independent Fetal-Org cultures (same numbering as in FIG. 5J). Relative light units (RLU) per ml per million cells is given. Data are represented as mean SEM.

FIG. 6—Transcriptional characterization of human Hep-Orgs
- (A) Heatmap of top expressed hepatic genes in two independent PHH batches, PHH-Orgs, Fetal-Heps, Fetal-Orgs and two differentiated Chol-Orgs. Hep-Org lines labelled as in FIG. 5.
- (B) t-SNE map combining Fetal-Org cells (Purple) with Chol-Org cells (Grey).
- (C) t-SNE map showing the clustering results of the combined Fetal-Org/Chol-Org dataset. Six main clusters were assigned: Hepatocytes (i), Hepatic mesenchymal-like cells (ii), Progenitors (iii-iv), and Cholangiocytes (v-iv).
- (D)-(G) t-SNE plot emphasizing the expression levels of hepatocyte markers ALB, SERPINA1 (D), ASGR1 and ASGR2 (E), cholangiocyte markers EPCAM and KRT7 (F) and ribosome gene RPS10 (G). Dataset as in FIG. 6B. Expression is given as normalized log 2 value.

FIG. 7—Engraftment of Human Hep-Orgs in FNRG mouse liver (A) Human ALB and MKI67 immunofluorescent (top) and human NuMA immunohistochemical (bottom) staining of a representative liver section of an FNRG mouse transplanted withhuman Fetal-Org cells 30 days after transplantation.

(B) Human ALB, MKI67 and KRT19 immunofluorescent staining (top) and human NuMA immunohistochemical staining (bottom) of a representative liver section of a human Fetal-Org transplanted FNRG mouse 90 days after transplantation.

(C) Human ALB, MRP2, CYP2E1, MKI67 and AFP immunofluorescence staining of a representative liver section of a human Fetal Hep-Org transplanted FNRG mouse 90 days after transplantation.

(D) Left panel compares serum hALB time courses of transplanted PHHs (Primary Human Hepatocytes), transplanted PHH-Orgs (Primary Human Hepatocyte Organoids) and transplanted Fetal Hep-Orgs, with each dot value representing the average of the transplanted group. Right panel: data from the 45 day time point for all mice in each group, where eachplot represents one mouse.

FIG. 8—Hepatocyte organoids originate mainly from central vein hepatocytes (A) Numbers of Hep-Orgs per well in medium of indicated composition. Organoid numbers were counted on day 10 after seeding. Data are represented as mean SEM in triplicate wells.

(B) DIC images of Hep-Orgs growing in Hep-Medium at Passage 0 (p0) on Day 8 and Day 13 (the same field). Lipid droplet in organoids indicated with black arrow (Black Scale Bar=100 μm).

(C) Growth curve of Hep-Orgs (derived from primary mouse hepatocytes) followed from Day 0 to Day 100 after seeding. Please note leveling off during months 2-3. Data are represented as mean SEM for three adult male mice of the same age.

(D) DIC images of Hep-Orgs (derived from primary mouse hepatocytes of BALB/c mice or C57BL/6× BALB/c F1 progeny) cultured in Hep-Medium analyzed at Day 14 (Black Scale Bar=25 μm).

(E) Immunohistochemical staining for tdTomato on mouse liver tissue section of Albumin-CreERT2; Rosa26-LSL-tdTomato mouse five days after a single dose of tamoxifen induction (Black Scale Bar=50 μm).

(F) Numbers of organoids formed per 5,000 cells FACS-sorted as Axin2 positive (Axin2+) or Axin2 negative (Axin2−). Experiments were performed in triplicate. Data are represented as mean±SEM.

(G) Numbers of organoids formed per 5,000 Epcam+ cells. Experiments were performed in triplicate. Data are represented as mean±SEM.

(H) Numbers of organoids formed per 10,000 cells (diploid, tetraploid, octaploid hepatocytes, FACS-sorted using Hoechst34580 and non-sorted hepatocytes). Data are represented as mean±SEM.

FIG. 9—Comparison of murine Hep-Orgs and Chol-Orgs (A) Immunohistochemical staining of biliary epithelial cell markers of Krt7 and Krt19 in Hep-Orgs and Chol-Orgs. Scale bale=20 μm.

(B) Paraffin sections of Hep-Orgs and Chol-Orgs HE-stained (top) and stained for β-catenin (bottom). Arrows indicated binucleated cells in the Hep-Orgs (Upper panel, Scale Bar=20 μm. Bottom panel, Scale Bar=25 μm).

(C) Confocal images of Chol-Orgs (z-stack, top; single confocal section, bottom). F-actin (Blue), Epcam (Green), and DAPI (White). Scale bale=20 μm.

(D)-(J) Heatmaps comparing Hep-Orgs (n=3) with primary hepatocytes (n=1) and Chol-Orgs (n=3). Cytochrome activity (D), glycogen metabolism (E), glucose metabolism (F), lipid metabolism (G), complement activation (H), urea cycle (I), and steroid metabolism (J). Gene set was basically from figure S2 (Katsuda et al., 2017). Samples are the same as in FIG. 2I.

(K) Heatmap of expression profile of liver genes comparing Hep-Orgs (n=3), with Primary-Heps (n=1), and Chol-Orgs (n=3) with the full gene name list, used in FIG. 2I.

(L) Immunofluorescence staining of Glt1 (Green) and DAPI (Blue) of a Hep-Org section. Scale Bar=20 μm.

(M) Comparison of pericentral (PC) and periportal (PP) marker expression in Hep-Orgs compared with primary hepatocytes. Data are represented as mean±SEM.  indicates $p<0.01$, * indicates $p<0.001$.

FIG. 10—Hep-Orgs transdifferentiate into Chol-Orgs in Chol-Org medium (A) Fluorescent DIC images showing conversion of Tomato+ Hep-Orgs from Albumin-CreERT2; Rosa26-LSL-tdTomato into Chol-Orgs.

(B) DIC images showing typical change of Chol-Orgs in Hep-Medium.

(C) Heatmap of expression profile of RNA sequencing comparing Hep-Orgs with/without Chol-medium exposure and Chol-Orgs with/without Hep-Medium exposure for 10 days. Lane 1 and 3: Hep-Org 3 and Chol-Org 3 also appear in FIG. 2I.

FIG. 11—Gene expression analysis of Hep-Orgs and Chol-Orgs by single cell sequencing (A) t-SNE plot of cells color-coded for expression level of indicated Hepatic markers (Afp, Ahsg, Fgg and Gc) (B), Cholangiocyte marker (Epcam) (C), and cell cycle marker (mKi67 and Mdm2). Combined dataset of Hep-Orgs and Chol-Orgs. Expression is given as normalized log 2 value. (D-E) t-SNE plot of cells color-coded for expression level of hepatic marker (Hp and Fgg) (D), Cell cycle (Rps10) (E) in the Hep-Org dataset. Expression is given as normalized log 2 value. (F) Volcano plot showing genes differentially expressed between hepatocytes after PHx vs undamaged PHHs. Every dot represents a gene. Red dots highlight genes that show ≥2 or ≤2 fold change and a significance with p-value <0.05.

FIG. 12—Establishment, maintenance and characterization of human Hep-Orgs (A) Key components required for Hep-Org initiation from Fetal-Heps (top) or from PHHs (bottom). One of the main components (EGF, FGF, R-spondin CM, CHIR, A83-01, HGF) was withdrawn from Hep-Medium or Chol-medium was used to compare. Hepatocytes were cultured in different conditions. Data are represented as mean SEM.

(B) Key components for growth of two established Fetal-Orgs at P24, the coding corresponds to FIG. 5J. One of the main components of Hep-Medium was withdrawn from Hep-Medium or Chol-medium was compared with Hep-Medium in Hep-Org growth maintain. Data are represented as mean SEM.

(C) PAS staining and (D) β-catenin (membrane labeling) of paraffin section of Fetal-Orgs cultured from human Fetal-Heps (Scale Bar=25 μm).

(E) F-ACTIN Staining of human Chol-Orgs (single confocal plane).

(F) CYP2E1 Staining of Fetal-Orgs (single confocal plane).

(G) Representative image of uptake of rhodamine 123 dye in Chol-Orgs, but not Hep-Orgs.

(H) A1AT secretion measured in supernatant of cultured PHHs (White), PHH-Orgs (White striped), Fetal-Heps (Grey), Fetal-Org (Grey striped) and differentiated Chol-Orgs (Black). Results are indicated as micrograms of albumin per day per million cells. Data are represented as mean±SEM.

(I) AFP secretion measured in supernatant of cultured PHHs (White), PHH-Orgs (White striped), Fetal-Heps (Grey), Fetal-Org (Grey striped) and differentiated Chol-Orgs (Black). 'Late' is P22 from one well. All coding corresponds to FIG. 5J and FIG. 12H. Data are represented as mean±SEM.

FIG. 13—Transcriptional comparison of Hep-Orgs, Chol-Orgs and PHHs (A) Heatmap of key hepatic gene expression in PHHs, PHH-Orgs, Fetal-Heps, Fetal-Orgs and differentiated Chol-Orgs.

(B) Heatmap of expression of progenitor, cholangiocyte and cell cycle-related genes in PHHs, PHH-Orgs, Fetal-Heps, Fetal-Orgs and differentiated Chol-Orgs.

(C) Principal component analysis (PCA) analysis shows clustering of transcriptomic profiles of Hep-Orgs (PHH-Orgs and Fetal-Orgs) with human hepatocytes (PHHs and Fetal-Orgs).

(D)-(F) t-SNE plot of cells color coded for expression level for hepatocyte marker AFP, RBP4, APOA2 and MT1G (D), COL1A2 and FSTL1 (E), cell cycle related genes PCNA and MKI67 (F). Expression is given as normalized log 2 value.

FIG. 14—Engraftment and repopulation by human Hep-Orgs compared with PHHs (A) AFP expression was reduced in differentiated Fetal-Orgs. Comparison was made between Fetal-Orgs of different passages, before or after differentiation with PHHs and PHH-Orgs.

(B) Graft nodule cross section quantified 90 days after transplantation of human Fetal-Orgs.

(C) Human ALB, hKRT, KRT19 and DAPI immunofluorescent staining of liver section of transplanted FNRG mouse 90 days after transplantation.

(D) Comparison of grafts 30 days after transplantation of PHHs, PHH-Orgs derived from the same donor, Fetal-Heps, and Fetal-Orgs (followed for 30 and 90 days) from the same donor.

DETAILED DESCRIPTION OF THE INVENTION

The Method of the Invention

According to some embodiments, provided herein is a method for expanding primary hepatocytes in vitro (also referred to herein as "the method of the invention"), wherein the method comprises culturing primary hepatocytes in the hepatocyte culture medium of the invention. As will be apparent to the skilled person, the method of the invention for expanding primary hepatocytes may be further used to expand cells and/or hepatocyte organoids generated by the method of the invention, mutatis mutandis.

According to some embodiments, the method of the invention is a method for expanding primary hepatocytes in vitro, wherein the method comprises culturing primary hepatocytes in a hepatocyte culture medium of the invention.

According to some embodiments, the method of the invention is a method for expanding primary hepatocytes in vitro, wherein the method comprises culturing primary hepatocytes in a hepatocyte culture medium, wherein the hepatocyte culture medium comprises:

i. 50 to 500 ng/ml of a Fibroblast Growth Factor (FGF), optionally selected from the group consisting of FGF7, FGF10 and a combination thereof;

ii. a Wnt agonist comprising an R-spondin and at least one glycogen synthase kinase 3 (GSK3) inhibitor;

iii. 5 to 100 ng/ml of epidermal growth factor (EGF);

iv. 5 to 100 ng/ml of hepatocyte growth factor (HGF); and v. a transforming growth factor beta (TGF-β) inhibitor, comprising an inhibitor of activin receptor-like kinase ALK4, ALK5 and/or ALK7 signalling.

According to some embodiments, the method of the invention further comprises a step of isolating the primary hepatocytes from a liver, prior to the step of culturing primary hepatocytes in a hepatocyte culture medium, for example, using any isolation method described herein. Other isolation methods are also known in the art. According to other embodiments, no isolation step is required, and a tissue explant from a fetal or adult liver comprising primary hepatocytes is cultured in a hepatocyte culture medium.

According to some embodiments, the method of the invention further comprises a step of contacting the primary hepatocytes or isolated primary hepatocytes with an extracellular matrix, as defined herein.

According to some embodiments, the method of the invention is a three-dimensional culture method for expanding primary hepatocytes.

The Hepatocyte Culture Medium (Hep-Medium) of the Invention

According to some embodiments, the hepatocyte culture medium of the invention comprises:

i. an FGF or an analog, fragment or variant thereof;

ii. a Wnt agonist comprising an Rspondin or an analog, fragment or variant thereof, and a glycogen synthase kinase 3 (GSK3) inhibitor;

iii. epidermal growth factor (EGF) or an analog, fragment or variant thereof;

iv. hepatocyte growth factor (HGF) or an analog, fragment or variant thereof; and v. a transforming growth factor beta (TGF-β) inhibitor, comprising an inhibitor of ALK4, ALK5 and/or ALK7 signalling.

According to some embodiments, the hepatocyte culture medium of the invention comprises:

i. 50 to 500 ng/ml of an FGF, preferably selected from FGF7 and FGF10;

ii. a Wnt agonist comprising 5-50% (vol/vol) R-spondin conditioned medium and at least one glycogen synthase kinase 3 (GSK3) inhibitor, optionally CHIR99021;

iii. 5 to 100 ng/ml of epidermal growth factor (EGF);

iv. 5 to 100 ng/ml of hepatocyte growth factor (HGF); and v. a transforming growth factor beta (TGF-β) inhibitor, comprising an inhibitor of ALK4, ALK5 and/or ALK7 signalling, optionally A83-01.

In some embodiments, the hepatocyte culture medium further comprises TGFa. This is particularly advantageous for human hepatocyte culture.

In some embodiments, the hepatocyte culture medium further comprises one or more or all of gastrin, nicotinamide, a ROCK inhibitor, B27 (optionally without vitamin A) and N-acetylcysteine.

In some embodiments, the hepatocyte culture medium further comprises further comprises a cell growth medium, such as, but not limited to, AdDMEM/F12 (by Invitrogen), optionally further comprising Hepes (e.g. 10 mM) and/or the Glutamax supplement (Gibco), optionally comprising antibiotics such as penicillin and streptomycin.

According to some embodiments, the hepatocyte culture medium of the invention comprises: about 100 ng/ml FGF7;
about 100 ng/ml FGF10;
about 20 ng/ml TGFa;
about 50 ng/ml EGF;
about 50 ng/ml HGF;
B27 (not comprising vitamin A);
about 2 µM A83-01;
about 10 µM Y-27632;
about 3 µm CHIR99021;
about 10 mM Nicotinamide;
about 10 nM gastrin;
about 1.25 mM N-acetylcysteine; and
about 15% R-spondin conditioned medium, optionally wherein the hepatocyte culture medium further comprises a cell growth medium, such as, but not limited to, AdDMEM/F12 (by Invitrogen), optionally further comprising Hepes (e.g. 10 mM) and/or the Glutamax supplement (Gibco), optionally comprising antibiotics such as penicillin and streptomycin.

According to some embodiments, the concentrations of components in the hepatocyte culture medium of the invention are such that they enable expansion of primary hepatocytes according to the method of the present invention, optionally further enabling maintenance of key morphological, functional and gene expression properties of primary hepatocytes in the expanded cells.

According to some embodiments, the hepatocyte culture medium of the invention comprises the Hep-medium described in Table 2, wherein the Hep-medium (Human) medium is suitable for expanding human adult or fetal hepatocytes, whereas the Hep-medium (Mouse) medium is suitable for expanding murine hepatocytes.

TABLE 2

Hepatocyte culture media for mice/human hepatocytes and differentiation medium for human fetal hepatocytes according to some embodiments of the present invention, as compared to corresponding media for expansion/differentiation of cholangiocytes (and Chol-orgs)

| Components | Hep-Medium (Mouse) | Hep-Medium (Human) | Human Fetal-Orgs differentiation medium (DM) | Chol-Medium (Mouse)/ Chol-Org expansion medium (EM) (R) | Mouse Chol-Orgs differentiation medium (DM) (R) | Chol-Medium (Human)/ Chol-Org expansion medium (EM) (R) | Human Chol-Org isolation medium (R) | Mouse Chol-Orgs differentiation medium (DM) (R) |
|---|---|---|---|---|---|---|---|---|
| Advanced DMEM/F-12 | + | + | + | + | + | + | + | + |
| 1% penicillin/ streptomycin | + | + | + | + | + | + | + | + |
| 1% GlutaMAX | + | + | + | + | + | + | + | + |
| 10 mM HEPES | + | + | + | + | + | + | + | + |
| B27 supplement (1:50) | (without vitamin A) | (without vitamin A) | (without vitamin A) | Either | Either | Either | Either | with vitamin A |
| N2 supplement (1:100) | — | — | — | — | — | + | + | + |
| R-spodin1-conditioned medium | 15% | 15% | 15% | 5% | — | 10% | 10% | — |
| Noggin-conditioned medium | — | — | — | — | — | — | 5% | — |
| Wnt3a-conditioned medium | — | — | — | — | — | — | 30% | — |
| ChIR99021 | 3 µm | 3 µm | 3 µm | — | — | — | — | — |
| N-acetylcysteine | 1.25 mM | 1.25 mM | 1.25 mM | 1 mM | 1 mM | 1 mM | 1 mM | 1 mM |
| nicotinamide | 10 mM | 10 mM | 10 mM | 10 mM | — | 10 mM | 10 mM | — |
| (recombinant) gastrin | 10 nM | 10 nM | 10 nM | 10 nM | 10 nM | 10 nM | 10 nM | 10 nM |
| (recombinant) EGF | 50 ng/ml | 50 ng/ml | 50 ng/ml | 50 ng/ml | 50 ng/ml | 50 ng/ml | 50 ng/ml | 50 ng/ml |
| (recombinant) TGFa | — | 20 ng/ml | 20 ng/ml | — | — | — | — | — |
| (recombinant) human FGF7 | 50 ng/ml | 50 ng/ml | 50 ng/ml | — | — | — | — | — |
| (recombinant) human FGF10 | 50 ng/ml | 50 ng/ml | 50 ng/ml | 100 ng/ml | 100 ng/ml | 100 ng/ml | 100 ng/ml | — |
| (recombinant) human FGF19 | — | — | — | — | — | — | — | 100 ng/ml |
| (recombinant) human HGF | 25 ng/ml | 25 ng/ml | 25 ng/ml | 50 ng/ml | — | 25 ng/ml | 25 ng/ml | 25 ng/ml |

TABLE 2-continued

Hepatocyte culture media for mice/human hepatocytes and differentiation medium for human fetal hepatocytes according to some embodiments of the present invention, as compared to corresponding media for expansion/differentiation of cholangiocytes (and Chol-orgs)

| Components | Hep-Medium (Mouse) | Hep-Medium (Human) | Human Fetal-Orgs differentiation medium (DM) | Chol-Medium (Mouse)/Chol-Org expansion medium (EM) (R) | Mouse Chol-Orgs differentiation medium (DM) (R) | Chol-Medium (Human)/Chol-Org expansion medium (EM) (R) | Human Chol-Org isolation medium (R) | Mouse Chol-Orgs differentiation medium (DM) (R) |
|---|---|---|---|---|---|---|---|---|
| Forskolin | — | — | — | — | — | 10 μM | 10 μM | — |
| A83-01 | 1 μM | 2 μM | 2 μM | — | 50 nM | 5 μM | 5 μM | 0.5 μM |
| DAPT | — | — | — | — | 10 μM | — | — | 10 μM |
| dexamethasone | — | — | 1 μM | — | 3 μM (from day 13 to 15) | — | — | 3 μM |
| Oncostatin M | — | — | 10 ng/ml | — | — | — | — | — |
| BMP7 | — | — | — | — | — | — | — | 25 ng/ml |
| ROCK inhibitor (Y-27632) | 10 μM | 10 μM | 10 μM | — | — | — | 10 μM | — |

A cell culture medium that is used in a method of the invention comprises any suitable basal medium, subject to the limitations provided herein. Basal media for cell culture typically contain a large number of ingredients, which are necessary to support maintenance of the cultured cells. Suitable combinations of ingredients can readily be formulated by the skilled person, taking into account the following disclosure. A basal medium for use in the invention will generally comprises a nutrient solution comprising standard cell culture ingredients, such as amino acids, vitamins, lipid supplements, inorganic salts, a carbon energy source, and a buffer, as described in more detail in the literature and below. In some embodiments, the culture medium is further supplemented with one or more standard cell culture ingredient, for example selected from amino acids, vitamins, lipid supplements, inorganic salts, a carbon energy source, and a buffer.

The skilled person will understand from common general knowledge the types of culture media that might be used as the basal medium in the cell culture mediums of the invention. Potentially suitable cell culture media are available commercially, and include, but are not limited to, Dulbecco's Modified Eagle Media (DMEM), Minimal Essential Medium (MEM), Knockout-DMEM (KO-DMEM), Glasgow Minimal Essential Medium (G-MEM), Basal Medium Eagle (BME), DMEM/Ham's F12, Advanced DMEM/Ham's F12, Iscove's Modified Dulbecco's Media and Minimal Essential Media (MEM), Ham's F-10, Ham's F-12, Medium 199, and RPMI 1640 Media. Preferably, the basal medium is advanced-DMEM/F12.

The basal medium may be supplemented with penicillin/streptomycin (e.g. 1%), GlutaMAX (e.g. 1%), HEPES (e.g. 10 mM), B27 supplement (1:50, preferably without vitamin A in the Hep-medium), and optionally with N2 supplement (1:100). Preferably, N2 supplement is excluded from the Hep-medium.

It is furthermore preferred that said cell culture medium is supplemented with a purified, natural, semi-synthetic and/or synthetic growth factor and does not comprise an undefined component such as fetal bovine serum or fetal calf serum. Various different serum replacement formulations are commercially available and are known to the skilled person. Where a serum replacement is used, it may be used at between about 1% and about 30% by volume of the medium, according to conventional techniques.

As will be apparent to the skilled reader, the preferred culture methods of the invention are advantageous because feeder cells are not required. Feeder cell layers are often used to support the culture of stem cells, and to inhibit their differentiation. A feeder cell layer is generally a monolayer of cells that is co-cultured with, and which provides a surface suitable for growth of, the cells of interest. The feeder cell layer provides an environment in which the cells of interest can grow. Feeder cells are often mitotically inactivated (e.g. by irradiation or treatment with mitomycin C) to prevent their proliferation. The use of feeder cells is undesirable, because it complicates passaging of the cells (the cells must be separated from the feeder cells at each passage, and new feeder cells are required at each passage). The use of feeder cells can also lead to contamination of the desired cells with the feeder cells. This is clearly problematic for any medical applications, and even in a research context, complicates analysis of the results of any experiments performed on the cells. As noted elsewhere herein, the culture media of the invention are particularly advantageous because they can be used to culture cells without feeder cell contact, i.e. the methods of the invention do not require a layer of feeder cells to support the cells whose growth is being sponsored.

Accordingly, the compositions of the invention may be feeder cell-free compositions. A composition is conventionally considered to be feeder cell-free if the cells in the composition have been cultured for at least one passage in the absence of a feeder cell layer. A feeder cell-free composition of the invention will normally contain less than about 5%, less than about 4%, less than about 3%, less than about 2%, less than about 1% feeder cells (expressed as a % of the total number of cells in the composition) or preferably no feeder cells at all.

The culture media used in the invention may comprise serum, or may be serum-free and/or serum-replacement free, as described elsewhere herein. Culture media and cell preparations are preferably GMP processes in line with standards required by the FDA for biologics products and to ensure product consistency.

A culture medium of the invention will normally be formulated in deionized, distilled water. A culture medium of the invention will typically be sterilized prior to use to prevent contamination, e.g. by ultraviolet light, heating, irradiation or filtration. The culture medium may be frozen (e.g. at −20° C. or −80° C.) for storage or transport. The medium may contain one or more antibiotics to prevent contamination. The medium may have an endotoxin content of less than 0.1 endotoxin units per ml, or may have an endotoxin content less than 0.05 endotoxin units per ml. Methods for determining the endotoxin content of culture media are known in the art.

A preferred cell culture medium is a defined synthetic medium that is buffered at a pH of 7.4 (preferably with a pH 7.2-7.6 or at least 7.2 and not higher than 7.6) with a carbonate-based buffer, while the cells are cultured in an atmosphere comprising between 5% and 10% $CO_2$, or at least 5% and not more than 10% $CO_2$, preferably 5% $CO_2$.

The invention also provides a composition or cell culture vessel comprising cells and/or organoids according to any one of the aspects of the invention described above, and a culture medium according to any one of the aspects of the invention described above. For example, such a composition or cell culture vessel may comprise any number of cells or organoids cultured according to a method of the invention, in a culture medium as described above.

According to a still further aspect of the invention, there is provided a hermetically-sealed vessel containing a culture medium of the invention. In some embodiments, the culture medium is an expansion medium. In some embodiments, the culture medium is a differentiation medium. Hermetically-sealed vessels may be preferred for transport or storage of the culture media, to prevent contamination. The vessel may be any suitable vessel, such as a flask, a plate, a bottle, a jar, a vial or a bag.

The Hepatocyte Organoids of the Invention

According to some embodiments, Hep-orgs are generated from human fetal hepatocytes or adult primary human hepatocytes (PHHs). According to some embodiments, the fetal hepatocytes are from human liver of between 5-30 weeks of gestation, optionally of between 8-25 weeks of gestation, preferably of between 11-20 weeks of gestation.

According to some embodiments, Hep-orgs expanded according to the method of the invention can be expanded for at least 10, 11, 12, 13, 14, 15, 16, 17, 18, 19, 20, 25, 30, 35, 40, 45, 50 passages. According to some embodiments, Hep-orgs expanded according to the method of the invention can be expanded for at least 16 passages. According to some embodiments, Hep-orgs expanded according to the method of the invention can be expanded for at least 6, 12, 18, 24 months in culture.

According to some embodiments, Hep-orgs originating from fetal liver cells expanded according to the method of the invention can be expanded for at least 10, 11, 12, 13, 14, 15, 16, 17, 18, 19, 20, 25, 30, 35, 40, 45, 50 passages. According to some embodiments, Hep-orgs expanded fetal liver cells according to the method of the invention can be expanded for at least 16 passages. According to some embodiments, Hep-orgs expanded from fetal liver cells according to the method of the invention can be expanded for at least 6, 12, 18, 24 months in culture. According to some embodiments, Hep-orgs expanded from adult primary human hepatocytes according to the method of the invention can be expanded for at least 2, 2.5, 3, 4, 5, 6, 12, 18, 24 months in culture.

According to some embodiments, Hep-orgs comprise a lumina and large cells of hepatocyte morphology. According to some embodiments, Hep-orgs have a larger cell diameter than Chol-orgs. According to some embodiments, cells of human Hep-Orgs have a larger cell diameter than those of Chol-Orgs, and a lower nucleus/cytoplasm ratio. According to some embodiments, the cell diameter/nucleus diameter ratio is 30.08±8.17 μm/14.07±1.59 μm for Hep-Orgs from fetal liver cells, 7.54±6.50 μm/11.69±1.64 μm for Hep-Orgs from PPHs and 10.42±2.78/7.22±1.55 μm for cells of Chol-Orgs. In some embodiments, the Hep-Orgs have a cell diameter of at least 15 μm, at least 20 μm or at least 25 μm. In some embodiments, the Hep-Orgs have a nucleus diameter of at least 5 μm, at least 10 μm or at least 15 μm.

According to some embodiments, human Hep-orgs originating from fetal liver cells (also referred to herein as fetal-orgs) express Alb and HNF4A. According to some embodiments, human Hep-orgs originating from fetal liver cells express Alb, HNF4A and CYP2E1.

According to some embodiments, Hep-orgs comprise bile canaliculi. According to some embodiments, Hep-orgs actively demonstrate functional uptake of Low Density Lipoprotein. According to some embodiments, Hep-orgs demonstrate glycogen accumulation. According to some embodiments, fetal-orgs comprise bile canaliculi. According to some embodiments, fetal-orgs actively demonstrate functional uptake of Low Density Lipoprotein. According to some embodiments, fetal-orgs demonstrate glycogen accumulation.

According to some embodiments, Hep-orgs secrete albumin. According to some embodiments, Hep-orgs secrete albumin in a comparable amount to primary human hepatocytes.

According to some embodiments, Hep-orgs secrete A1AT. According to some embodiments, Hep-orgs secrete A1AT at 25%-50% of the level produced by primary human hepatocytes.

According to some embodiments, Hep-orgs secrete Afp. According to some embodiments, Afp secretion by Hep-orgs decreases over time. According to some embodiments, PHH-orgs re-express Afp.

According to some embodiments, fetal-orgs demonstrate CYP3A4 activity 2-8 lower than that of primary human hepatocytes. According to other embodiments, Hep-orgs derived from primary human hepatocytes demonstrate CYP3A4 activity higher than that of primary human hepatocytes.

According to some embodiments, expression of at genes selected from the following group is comparable in primary human hepatocytes and in Hep-orgs (both from fetal and adult origin): Alb, APOA2, SERPINA1 or a combination thereof.

According to some embodiments, the expression of functional hepatocyte genes, such as, but not limited to, genes related to cytochrome P450 activity, glycogen/lipid metabolism and/or urea cycle, is comparable in Hep-orgs from fetal or adult origin and fetal hepatocytes or adult primary human hepatocytes, respectively.

According to some embodiments, fetal-orgs and/or PHH-orgs comprise at least one of the following cell types:
hepatocytes demonstrating high expression of albumin, SERPINA1 and ASGR1, possibly further expressing AFP, MT1, APOA, RBP4 and FABP1;
cells expressing mesenchymal markers such as COL1A2 and FSTL1, possibly further expressing DCN, VIM, FGFR and TGFBI;
cells expressing liver progenitor markers such as CD24, IL32 and MMP7, optionally rich in mitochondrial gene mRNA;
or a combination thereof.

According to some embodiments, Hep-orgs are able to engraft and repopulate damaged liver tissue. According to some embodiments, Hep-orgs demonstrate significant graft expansion after transplantation.

According to some embodiments, Hep-orgs express fetal hepatocyte marker genes Afp, Alb, Hnf4a, Cyp1a2 and Cyp3a11. According to some embodiments, Hep-orgs express fetal hepatocyte marker Cyp3a11 at a significantly higher level than primary hepatocytes (as seen for example in FIG. 2C). According to some embodiments, Hep-orgs express fetal hepatocyte markers Cyp1a2 and Alb at a significantly lower level than primary hepatocytes (as seen for example in FIG. 2C). According to some embodiments, cytochrome Cyp1a2 activity in Hep-orgs is lower up to three-fold than in primary hepatocytes (as seen for example FIG. 2H).

According to some embodiments, Hep-orgs do not demonstrate cholangiocyte function. For example, Hep-orgs are unable to actively transport a substrate of the cholangiocyte surface glycoprotein MDR1 (multidrug resistance protein 1) into their lumen.

According to some embodiments, the hepatocyte organoids of the invention are distinct from Chol-orgs by at least one feature as disclosed in Table 1, optionally by 2, 3, 4, 5, 6, 7, 8 or all the features disclosed in Table 1.

TABLE 1

Differences between the Hep-orgs of the invention and Chol-orgs according to some embodiments

| | | Hep-Orgs | Chol-Orgs |
|---|---|---|---|
| Establis | Isolation | Two-step collagenase perfusion (IV) with 3-5 minutes digestion to keep fragile hepatocytes alive, low speed Centrifugation. | Digestion takes >45 minutes with Collagenase XI + Dispase. Human biopsy: collagenase-accutase digestion for 30 minutes. |
| | Cell Origin | Alb+ murine hepatocytes. Fresh or cryoperserved fetal-Hepatocytes or cryopreserved PHHs. | Human or murine Epcam+ duct cells |
| | Clonogenicity | Around 1% | 28.4% ± 3.2% |
| Basic Characterization | Morphology | Dense, bunch-of-grape-like organoids. Typical Hepatocyte morphology and structure (Transmission EM). | Cystic organoids with large lumen and lined by flat cells. Cholangiocyte morphology and structure (Transmission EM). |
| | Growth speed | Fetal-Orgs have a doubling time around 5-7 days, with passaging 1:3 per 7-10 days. PHH-Orgs are kept 50-75 days with 1-2 passages. | Doubling time around 60 hours, with passage ratio of 1:5-7 per week. |
| | Expression | High expression of hepatic markers such as ALB, A1AT, and HNF4A similar with hepatocytes | High expression of cholangiocyte markers EPCAM, KRT19 and KRT7 |
| Function | In vitro Assay | Gene expression profile similar to hepatocytes during normal culture expansion. Almost each cell in Hep-Orgs shows LDL uptake, Glycogen storage, lipid droplet secretion, Albumin Secretion, Cytochrome 450 metabolism etc. | Without hepatocyte differentiation, Chol-Orgs show hardly any glycogen storage or LDL-uptake capacity and have high uptake of rhodamine 123 indicating biliary function. |
| | Transplantation | Engraftment and significant graft expansion of Fetal-Orgs from fetal hepatocytes in chronic liver damage model with 400 ug/ml hAlb in circulation after 3 months. PHH-Orgs proliferate at the same speed as PHHs 60 days after transplantation. | Low level engraftment in acute liver damage model. |

Hepatocyte Organoids (Hep-Orgs) Vs. Cholangiocyte Organoids (Chol-Orgs)

According to some embodiments, the hepatocyte organoids of the invention are distinct from organoids which originate from cholangiocytes (also referred to herein as "Chol-orgs") by at least one of the following features: Hep-orgs do not express marker genes typically expressed in cholangiocytes, Hep-orgs express genes which are typically not expressed in cholangiocytes, the compact cell clump (or "bunch of grapes") morphology of Hep-orgs is distinct from the large lumen structure of Chol-orgs, the cells of Hep-orgs demonstrate a hepatocyte like morphology as compared to the cholangiocyte morphology of cells of Chol-orgs, expanding Chol-orgs secrete albumin significantly less than Hep-orgs (about 1000 fold less), Hep-org cells have a larger cell diameter than Chol-org cells, Hep-org cells have a lower nucleus/cytoplasm ration that Chol-org cells, or a combination thereof.

Compositions of the Invention

According to some embodiments, there is provided a composition comprising a culture medium of the invention and a liver tissue explant. According to some embodiments, there is provided a composition comprising a culture medium of the invention and one or more primary hepatocyte. According to some embodiments, there is provided a composition comprising a culture medium of the invention and one or more expanded hepatocyte. According to some embodiments, there is provided a composition comprising a culture medium of the invention and a hepatocyte organoid. Any of the compositions of the invention may further comprise an extracellular matrix as described herein.

There is also provided a composition comprising a culture medium of the invention and an extracellular matrix as described herein.

The invention also provides a culture medium supplement that can be used to produce a culture medium as disclosed herein. A 'culture medium supplement' is a mixture of ingredients that cannot itself support stem cells, but which enables or improves stem cell culture when combined with other cell culture ingredients. The supplement can therefore be used to produce a functional cell culture medium of the invention by combining it with other cell culture ingredients to produce an appropriate medium formulation. The use of culture medium supplements is well known in the art.

Pharmaceutical Compositions of the Invention

According to some embodiments, the invention provides a pharmaceutical composition comprising the components of any culture medium as described herein and a pharmaceutically acceptable diluent and/or excipient.

According to some embodiments, the invention provides a pharmaceutical composition comprising one or more expanded hepatocyte obtained by a method of the invention. According to some embodiments, the invention provides a pharmaceutical composition comprising one or more hepatocyte organoid obtained by a method of the invention. According to some embodiments, the invention provides a pharmaceutical composition comprising one or more hepatocyte from an organoid obtained by a method of the invention. The pharmaceutical composition may be formulated so that it is suitable for administration to a patient in need thereof. The pharmaceutical composition may further comprise a scaffold. Examples of suitable scaffolds for cellular transplantation therapy are well known in the art. A scaffold provides a two-dimensional or three dimensional network. Suitable synthetic materials for such a scaffold comprise polymers selected from porous solids, nanofibers, and hydrogels such as, for example, peptides including self-assembling peptides, hydrogels composed of polyethylene glycol phosphate, polyethylene glycol fumarate, polyacrylamide, polyhydroxyethyl methacrylate, polycellulose acetate, and/or co-polymers thereof (see, for example, Saha et al., 2007. Curr Opin Chem Biol. 11(4): 381-387; Saha et al., 2008. Biophysical Journal 95: 4426-4438; Little et al., 2008. Chem. Rev 108, 1787-1796).

Extracellular Matrix (ECM)

According to some embodiments, the method of the present invention further comprises contacting the primary hepatocytes and/or the hepatocyte organoids to be expanded with an extracellular matrix (also referred to herein as "ECM"). The ECM is preferably an exogenous ECM. In some embodiments the extracellular matrix is three-dimensional ("3D ECM"). In other embodiments, it is contemplated that the extracellular matrix is in suspension with the culture medium. According to some embodiments, the method of the invention provides a method of expanding primary hepatocytes and/or hepatocyte organoids in culture, the method comprising culturing the primary hepatocytes and/or hepatocyte organoids in contact with an ECM in the presence of the hepatocyte culture medium of the invention.

According to some embodiments, the primary hepatocytes and/or hepatocyte organoids to be expanded by the method of the invention are contacted with the ECM prior to incubation with the culture medium of the invention. According to some embodiments, the ECM comprises the hepatocyte culture medium of the invention.

"In contact" means a physical or mechanical or chemical contact, which means that for separating said resulting organoid or population of cells from said extracellular matrix a force needs to be used. According to some embodiments, contacting refers to seeding the cells on top of and/or embedding the cells in the 3D ECM. According to preferable embodiments, the primary hepatocytes and/or hepatocyte organoids to be expanded by the method of the invention are embedded within a non-solid 3D ECM, followed by culturing the cells and the 3D ECM in the hepatocyte culture medium of the invention. According to preferable embodiments, the primary hepatocytes and/or hepatocyte organoids are embedded in the 3D ECM. The hepatocyte culture medium of the invention may be diffused into an extracellular matrix (ECM).

Any suitable extracellular matrix may be used with the method of the invention. According to some embodiments, the ECM used in accordance with the invention may be naturally occurring ECM, a commercial ECM mimicking naturally occurring ECM and/or synthetic ECM. Naturally occurring ECM is secreted by connective tissue cells and may be composed of a variety of polysaccharides, water, elastin, and glycoproteins, wherein the glycoproteins may comprise, for example, collagen, entactin (nidogen), fibronectin, and laminin. Different types of naturally occurring ECM are known, comprising different compositions including different types of glycoproteins and/or different combination of glycoproteins. Said ECM can be provided, for example, by culturing ECM-producing cells. Alternatively, ECM mimicking naturally occurring ECM may be commercially provided. Examples of commercially available extracellular matrices are extracellular matrix proteins (Invitrogen), basement membrane preparations from Engelbreth-Holm-Swarm (EHS) mouse sarcoma cells (e.g. Matrigel™ (BD Biosciences)) and Basement Membrane Extract (e.g. Cultrex BME™, R&D systems). Alternatively, a synthetic extracellular matrix material, such as ProNectin (Sigma Z378666) may be used.

An example of an ECM for use in a method of the invention comprises at least one glycoprotein, such as laminin. An optional ECM for use in a method of the invention comprises at least two distinct glycoproteins, such as two different types of collagen or a collagen and laminin. A further optional ECM comprises laminin, entactin, and collagen IV. A further preferred ECM is provided by Matrigel™ (BD Biosciences), which comprises laminin, entactin, and collagen IV. In some embodiments the extracellular matrix is a laminin-containing extracellular matrix such as Matrigel™ (BD Biosciences).

In some embodiments, the hepatocyte culture medium is placed on top of the ECM. The culture medium can then be removed and replenished as and when required. In some embodiments, the culture medium is replenished every 1, 2, 3, 4, 5, 6 or 7 days. If components are "added" or "removed" from the media, then this can in some embodiments mean that the media itself is removed from the ECM and then a new media containing the "added" component or with the "removed" component excluded is placed on the ECM. In some embodiments the hepatocyte culture medium of the invention is in contact with an extracellular matrix.

The method of the invention may further comprise passaging the organoids obtained using the culture method. In some embodiments, one week to 10 day old organoids are removed from the extracellular matrix and mechanically dissociated into small fragments before being transferred to fresh extracellular matrix. The skilled person would know how to split the organoids in order to passage them so that they can multiply without exceeding the concentration limit for their container. In some embodiments, passaging is performed for at least 2 months, for example for 2, 3, 4, 5, 6, 7, 8, 9, 10, 12, 15, 18, 20, 24 or more months. In some embodiments, passaging is performed in 1:4 to 1:8 split ratios once per week for at least 2 months, for example for 2, 3, 4, 5, 6, 7, 8, 9, 10, 12, 15, 18, 20, 24 or more months. In some embodiments, the method comprises passaging the organoids more than 6 times, e.g. more than 7, 8, 9, 10, 12, 15, 18, 20, 25, 30 times. The passaging interval can be adapted as necessary. Suitable examples are twice per week, once per week, once every 10 days, once every two weeks, for example once every 7-10 days. The split of the culture medium can be adapted as necessary. Suitable examples are 1:3-1:10 dilutions, e.g. 1:3-1:9, 1:4-1:8, 1:4-1:6 dilutions. According to some embodiments, the hepatocyte culture medium of the invention induces or promotes the survival and/or proliferation of cells during at least 42, 50, 75, 100, 125, 150, 175, 200, 250, 300, 365 days of culture. Proliferation can be assessed using techniques known in the art such as BrdU staining, Edu staining, Ki67 staining and the use of growth curves assay can be done.

Isolation of Primary Hepatocytes

According to some embodiments, the method of the invention comprises isolating the primary hepatocytes to be expanded. The primary hepatocytes cells may be obtained by any suitable method. According to some embodiments, the primary hepatocytes are isolated from a biopsy or from a tissue fragment.

In some embodiments, primary hepatocytes are isolated by collagenase digestion, for example, as described in the examples and in Dorell et al., 2008 (Hepatology. 2008 October; 48(4):1282-91. Surface markers for the murine oval cell response. Dorrell C, Erker L, Lanxon-Cookson K M, Abraham S L, Victoroff T, Ro S, Canaday P S, Streeter P R, Grompe M). In some embodiments, collagenase digestion is performed on a tissue biopsy. In some embodiments, collagenase and accutase digestion are used to obtain the epithelial stem cells for use in the invention.

In some embodiments, the starting primary hepatocyte to be expanded is a single cell. A single cell suspension comprising primary hepatocytes can be mechanically generated by mechanical disruption. Alternatively, a population of primary hepatocytes may be used as the starting point. Any one of a number of physical methods of separation known in the art may be used to select the cells of the invention and distinguish these from other cell types. Such physical methods may involve FACS and various immunoaffinity methods based upon makers specifically expressed by the cells of the invention.

In a further embodiment, there is provided a method for obtaining a hepatocyte organoid comprising expanding primary hepatocytes in the hepatocyte culture medium of the invention as described herein. Following culturing, the method may further comprise obtaining and/or isolating one or more hepatocyte organoid or cells derived therefrom.

Additional Definitions

Cells taken directly from live tissue, i.e. freshly isolated cells, are also referred to as primary cells. Accordingly, the term "primary hepatocytes", as used herein, refers to hepatocytes which have been isolated from liver tissue, including, but not limited to, hepatocytes from human adult liver, hepatocytes from a human fetus or hepatocytes from a murine liver. According to some embodiments, primary hepatocytes isolated from human fetus to be used with the method of the invention, is isolated from a fetus at weeks 5-30, optionally 10-20 of gestation.

Primary hepatocytes to be expanded by the method of the present invention may be isolated by any suitable method known in the art. In some embodiments, the primary hepatocytes for use in the methods of invention are isolated from a liver biopsy. In some embodiments, primary hepatocytes are isolated by collagenase digestion, for example, as described in the examples and in Dorell et al., 2008 (Hepatology. 2008 October; 48(4):1282-91. Surface markers for the murine oval cell response. Dorrell C, Erker L, Lanxon-Cookson K M, Abraham S L, Victoroff T, Ro S, Canaday P S, Streeter P R, Grompe M). In some embodiments, collagenase digestion is performed on a liver biopsy. In some embodiments, collagenase and accutase digestion are used to obtain the primary hepatocytes for use in the invention. According to some embodiments, the primary hepatocytes for use in the methods of the invention are isolated using a two-step collagenase perfusion, as described in the examples herein below.

As used herein, the term "expanding" as it relates to primary hepatocytes and the hepatocyte organoids of the invention refers to proliferation of the cells. According to some embodiments, while the method of the invention provides expansion of primary hepatocytes and/or the resulting hepatocyte organoids in vitro, the hepatocyte organoids of the invention are capable of further expanding when transplanted to a liver of a subject in vivo.

As used herein, the terms "culturing" and "in culture" refers to the maintenance of cells in an in vitro culture. As known to the skilled person, maintenance of cells in culture may include periodically changing growth medium (such as the hepatocyte culture medium of the invention) and/or transfer to a different growth plate/flask/matrix.

The terms "Epidermal growth factor" and "EGF" as used herein are used interchangeably and refer to any suitable EGF, for example, EGF (Peprotech). EGF may also comprise active analogs, fragments and variants of EGF. By "active" it is meant it activates the EGF receptor with comparable or improved activity relative to EGF.

The terms "transforming growth factor alpha", "TGF-alpha" and TGFa" are used herein interchangeably, and may also comprise active analogs, fragments and variants of TGFa. By "active" it is meant it activates the EGF receptor with comparable or improved activity relative to TGFa. TGFa is a member of the EGFR ligand family and binds EGFR like EGF, but produces a quantitatively and qualitatively distinct cellular response compared to EGF. The present inventors have shown that it is advantageous to include both EGF and TGFa in the hepatocyte medium of the invention.

The terms "Fibroblast growth factor" and "FGF" as used herein are used interchangeably and refer to any suitable FGF, for example, FGF7 (e.g. Peprotech) or FGF10 (e.g. Peptrotech). FGF may also comprise active analogs, fragments and variants of FGF. By "active" it is meant it activates the FGF receptor with comparable or improved activity relative to FGF. FGF7 and FG10 bind to the FGFR2 receptor and, more specifically, to the IIIb isoform. Other FGFs that binds to this receptor and which could therefore be used as alternatives to FGF7 and/or FGF10 include FGF1, FGF3, and FGF22. Therefore in some embodiments, the FGF is selected from one or more of FGF7, FGF10, FGF1, FGF3 and FGF22, and active analogs, fragments or variants thereof.

The terms "hepatocyte growth factor" and "HGF" as used herein are used interchangeably and refer to any suitable HGF, for example, HGF (Peprotech). HGF may also comprise active analogs, fragments and variants of HGF. By "active" it is meant it activates the HGF receptor (the protein product of the c-Met oncogene) with comparable or improved activity relative to HGF.

The Wnt signalling pathway is defined by a series of events that occur when the cell-surface Wnt receptor complex, comprising a Frizzled receptor, LRP and LGR, is activated, usually by an extracellular signalling molecule, such as a member of the Wnt family. This results in the activation of Disheveled family proteins which inhibit a complex of proteins that includes axin, GSK-3, and the protein APC to degrade intracellular β-catenin. The resulting enriched nuclear β-catenin enhances transcription by TCF/LEF family transcription factors. As used herein, the term "Wnt agonist" refers to an agent that activates transcription mediated by the TCF/LEF family of transcription factors in a cell. Wnt agonists are therefore selected from true Wnt agonists that bind and activate the Wnt receptor complex (including any and all of the Wnt family proteins), an inhibitor of intracellular β-catenin degradation, a GSK-3 inhibitor (such as CHIR99021) and activators of TCF/LEF. According to some embodiments, the GSK3 inhibitor is "CHIR99021". "CHIR99021" refers to 6-[[2-[[4-(2,4-Dichlorophenyl)-5-(5-methyl-1H-imidazol-2-yl)-2-pyrimidinyl]amino]ethyl]amino]-3-pyridinecarbonitrile, CT9902; CAS Number 252917-06-9; PubChem Substance ID 329825639.

"Rspondin" binds to Lgr5 and enhances Wnt signalling. Rspondin is therefore an Lgr5 agonist and a Wnt agonist. Any suitable Rspondin may be used in the hepatocyte culture medium of the invention. According to some embodiments the Rspondin may be selected from one or more of Rspondin 1, Rspondin 2, Rspondin 3 and Rspondin 4 or active analogs, fragments or variants thereof. By "active" it is meant it enhances Wnt signalling via Lgr5 with comparable or improved activity relative to Rspondin 1. According to a preferred embodiment, the Rspondin is Rspondin 1, Rspondin 2, Rspondin 3 or Rspondin 4. In one particular embodiment, the Rspondin is Rspondin 1. Rspondin may be provided in the form of Rspondin conditioned media. For example, about 5% to about 50%, about 10% to about 30% or about 15%. In some embodiments, Rspondin analogs, fragments or variants, or Lgr5 antibodies may be used instead of Rspondin. Examples are known in the art by the skilled person in the field.

As used herein, a "TGF-beta inhibitor" (also referred to herein as an "inhibitor of TGF-beta signalling" of "a transforming growth factor beta (TGF-β) inhibitor") is an inhibitor that reduces the activity of the TGF-beta pathway. The TGF-beta superfamily ligands comprise bone morphogenic proteins (BMPs), growth and differentiation factors (GDFs), anti-mnllerian hormone (AMH), activin, nodal and TGF-betas. In general, Smad2 and Smad3 are phosphorylated by the ALK4, 5 and 7 receptors in the TGF-beta/activin pathway. By contrast, Smad1, Smad5 and Smad8 are phosphorylated as part of the bone morphogenetic protein (BMP) pathway. The TGF-beta inhibitor according to the invention reduces the activity of the TGF-beta signalling pathway, preferably the signalling pathway that acts via Smad2 and/or Smad3, more preferably the signalling pathway that acts via activin receptor like kinases 4, 5 and/or 7 (ALK4, ALK5 and/or ALK7). According to some embodiments, no more than one TGF beta inhibitor is present in the hepatocyte culture medium, wherein the one inhibitor is an inhibitor of activin receptor like kinases 4, 5 and/or 7 (ALK4, ALK5 and/or ALK7). In other embodiments, more than one TGF beta inhibitor is present in the hepatocyte culture medium, e.g. 2, 3, 4 or more. According to some embodiments, the TGF-beta inhibitor within the hepatocyte culture medium of the invention comprises a small molecule inhibitor selected from the group consisting of the following inhibitors which are defined in Table 3: A83-01, SB-431542, SB-505124, SB-525334, LY 364947, SD-208, SJN 2511 and a combination thereof. According to a preferable embodiment, the TGF-beta inhibitor within the hepatocyte culture medium of the invention comprises A83-01, optionally at a concentration of about 2 μM.

TABLE 3

Small-molecule TGF-beta inhibitors according to some embodiments

| Inhibitor | Targets | IC50 (nM) | Mol Wt | Name | Formula |
|---|---|---|---|---|---|
| A83-01 | ALK5 (TGF-βR1) | 12 | 421.52 | 3-(6-Methyl-2-pyridinyl)-N-phenyl-4-(4-quinolinyl)-1H-pyrazole-1-carbothioamide | C25H19N5S |
|  | ALK4 | 45 |  |  |  |
|  | ALK7 | 7.5 |  |  |  |
| SB-431542 | ALK5 | 94 | 384.39 | 4-[4-(1,3-benzodioxol-5-yl)-5-(2-pyridinyl)-1H-imidazol-2-yl]benzamide | C22H16N4O3 |
|  | ALK4 |  |  |  |  |
|  | ALK7 |  |  |  |  |
| SB-505124 | ALK5 | 47 | 335.4 | 2-(5-benzo[1,3]dioxol-5-yl-2-tert-butyl-3Himidazol-4-yl)-6-methylpyridine hydrochloride hydrate | C20H21N3O2 |
|  | ALK4 | 129 |  |  |  |
| SB-525334 | ALK5 | 14.3 | 343.42 | 6-[2-(1,1-Dimethylethyl)-5-(6-methyl-2-pyridinyl)-1H-imidazol-4-yl]quinoxaline | C21H21N5 |
| SD-208 | ALK5 | 49 | 352.75 | 2-(5-Chloro-2-fluorophenyl)-4-[(4-pyridyl)amino]pteridine | C17H10C1FN6 |
| LY-36494 | TGR-βRI | 59 | 272.31 | 4-[3-(2-Pyridinyl)-1H-pyrazol-4-yl]-quinoline | C17H12N4 |
|  | TGF-βRII | 400 |  |  |  |
|  | MLK-7K | 1400 |  |  |  |
| SJN-2511 | ALK5 | 23 | 287.32 | 2-(3-(6-Methylpyridine-2-yl)-1H-pyrazol-4-yl)-1,5-naphthyridine | C17H13N5 |

According to some embodiments, the method of the invention comprises a hepatocyte medium further comprising N-acetylcysteine. "N-acetylcysteine" refers to $HSCH_2CH(NHCOCH_3)CO_2H$ (PubChem CID 12035), and is available commercially as a culture medium supplement (e.g. from Sigma A9165; PubChem Substance ID 24891402).

According to some embodiments, the method of the invention does not comprise a cAMP pathway activator. A cAMP pathway activator is any suitable activator which increases the levels of cAMP in a cell, including, for example, an adenylyl cyclase activator, such as forskolin or cholera toxin. Other examples include cAMP analogs, for example 8-bromo-cAMP. A further example of a cAMP pathway activator is NKH477 (e.g. catalogue no. Tocris 1603).

As used herein, the terms "Alpha-fetoprotein", "Afp", "α-fetoprotein", "alpha-1-fetoprotein", "alpha-fetoglobulin" or "alpha fetal protein" are used interchangeably and refer to the gene or protein product thereof, according to context. As known to the skilled person, Afp is typically expressed at a high degree in fetal liver during development.

As used herein, "hepatic marker" includes but is not necessarily limited to Alb, Hnf4a, Hpx, Hp, Fgg Afp, Ahsg and Gc.

As used herein, the terms "partial hepatectamy" and "PHx" are used interchangeably and refer to removal of a part of a liver.

General

The practice of the present invention will employ, unless otherwise indicated, conventional methods of chemistry, biochemistry, molecular biology, immunology and pharmacology, within the skill of the art.

The term "comprising" encompasses "including" as well as "consisting" e.g. a composition "comprising" X may consist exclusively of X or may include something additional e.g. X+Y.

The term "about" in relation to a numerical value x is optional and means, for example, x±10%.

The word "substantially" does not exclude "completely" e.g. a composition which is "substantially free" from Y may be completely free from Y. Where necessary, the word "substantially" may be omitted from the definition of the invention.

Unless specifically stated, a process or method comprising numerous steps may comprise additional steps at the beginning or end of the method, or may comprise additional intervening steps. Also, steps may be combined, omitted or performed in an alternative order, if appropriate.

Various embodiments of the invention are described herein. It will be appreciated that the features specified in each embodiment may be combined with other specified features, to provide further embodiments. In particular, embodiments highlighted herein as being suitable, typical or preferred may be combined with each other (except when they are mutually exclusive).

EXAMPLES

Example 1—Methods

The following methods are used throughout the examples provided herein.

Mice

All animal experiments were performed after institutional review by the Animal Ethics Committee of the Royal Netherlands Academy of Arts and Sciences (KNAW) with project license of AVD8010020151 and research protocol HI16.10.05 and HI16.1002. Albumin-CreERT2 and Axin2-CreERT2 mice were described before (Schuler et al., 2004; van Amerongen et al., 2012). Rosa26-LSL-tdTomato mice were crossed with Albumin-CreERT2 or Axin2-CreERT2 mice and their offspring were used for lineage tracing. Generation and genotyping methods have been previously described (Schuler et al., 2004; van Amerongen et al., 2012). Mice carrying Cre and Rosa alleles aged 8-24 weeks were subjected to a single intraperitoneal injection of 0.2 mg per 25 g of body weight tamoxifen (Sigma, T548). Mice were collected after 5-7 days after induction. Both male and female mice were used. For PHx, surgery was performed as described (Greene and Puder, 2003). Mice were sacrificed 2.5-3 days post PHx (Greene and Puder, 2003; Yokoyama et al., 1953). For human cell transplantations, Fah−/− NOD Rag1−/− Il2rgnull (FNRG) female mice were used at the Rockefeller University under IACUC protocol 15814.

Cell Lines

293t-HA-Rspon1-Fc cells were used as previously described to generate conditional medium of R-spondin1. Cells were cultured in a humidified 5%-CO2 atmosphere. Commercial human primary hepatocytes were obtained from Thermo Scientific (HMCS10).

Patients and Clinical Specimens

Human fetal livers were obtained from Susana M. Chuva de Sousa Lopes in Leiden University Medical Center. Human liver biopsies were obtained from patients undergoing surgery at University Medical Centre Utrecht Hospital and Rotterdam and University Medical Center. Human cryopreserved fetal and primary human hepatocytes were from Rockefeller University and Lonza Company. The use of samples for research was approved by ethical committees and informed consent were obtained from donors when appropriate.

Isolation of Primary Mouse Hepatocytes

Hepatocytes were isolated from mice by two-step collagenase perfusion (Li et al., 2010b). Briefly, after placing catheter into the portal vein, the inferior vena cava was cut and the liver was perfused at 5-7 ml/min with pre-warmed Perfusion Medium for 10 minutes. Then, perfusion was performed with pre-warmed Digestion Medium including Type IV collagenase and Ca2+ at 5 ml/min for 3-5 minutes. After dissociation, cells were filtered through a 70 µm filter. Hepatocytes were further separated and purified by centrifugation at low speed (50 g, 1-3 min) and Percoll gradient centrifugation was optimally performed as described before (Broutier et al., 2016; Huch et al., 2013).

Organoid Culture of Hepatocytes

Isolated hepatocytes were filtered by 70 µm filter, washed twice with cold AdDMEM/F12, counted and mixed with MatrigelR in suspension plates (Greiner). 20,000-50,000 cells were used per well of a 24 well plate. After MatrigelR was solidified, Hep-Medium was added. Hep-Medium consists of AdDMEM/F12 (Thermo Scientific, with Hepes, GlutaMax and Penicillin-Streptomycin) plus 15% RSPO1 conditioned medium (home-made), B27 (minus vitamin A), 50 ng/ml EGF (Peprotech), 1.25 mM N-acetylcysteine (Sigma), 10 nM gastrin (Sigma), 3 µM CHIR99021 (Sigma), 25 ng/ml HGF (Peprotech), 50 ng/ml FGF7 (Peprotech), 50 ng/ml FGF10 (Peprotech), IpM A83-01 (Tocris), 10 mM Nicotinamide (Sigma), and 10 µM Rho Inhibitor Y-27632 (Calbiochem). 14 days after seeding, organoids were mechanically fragmented and re-seeded into new MatrigelR. During culturing, medium was refreshed at most every three days. Organoids are usually passaged with a split ratio of 1:3 every 7-10 days.

Human Hep-Org Culture

Fetal hepatocytes were isolated from human fetal tissue by the two-step collagenase perfusion method and isolated by 5 min centrifugation at 100 g. Red blood cells were removed. Hepatocytes were isolated from human adult liver by two steps of collagenase digestion and cells were filtered through a 70 µm filter and collected by 5 min centrifugation at 100 g. Different fractions were washed with Advanced DMEM/F12. 10,000 cryopreserved fetal (11-20 weeks), pediatric (age=0.6 years) and adult hepatocytes or freshly isolated cells were mixed with human Hep-Medium and MatrigelR (with a ratio of 1:3) and seeded per 24 wells. After solidification, medium was added. Human Hep-Medium: AdDMEM/F12 (Thermo Scientific, with Hepes, GlutaMax and Penicillin-Streptomycin) plus 15% RSPO1 conditioned medium (home-made), B27 (minus vitamin A), 50 ng/ml EGF (Peprotech), 1.25 mM N-acetylcysteine (Sigma), 10 nM gastrin (Sigma), 3 μM CHIR99021 (Sigma), 50 ng/ml HGF (Peprotech), 100 ng/ml FGF7 (Peprotech), 100 ng/ml FGF10 (Peprotech), 2 μM A83-01 (Tocris), 10 mM Nicotinamide (Sigma), 10 μM Rho Inhibitor Y-27632 (Calbiochem) and 20 ng/ml TGFa. For Fetal-Org differentiation, Human Hep-Medium was supplemented with 10 ng/ml Oncostatin M and 1 μM Dexamethasone (Differentiation Medium, DM). During culturing, medium was refreshed every 2-3 days. Organoids are usually passaged with a split ratio of 1:3 every 7-8 days until P10-15 and 1:3 every 14 days from P15 onwards. Chol-Orgs were cultured and passaged as previously described (Broutier et al., 2016). Cell number of organoids growth was calculated by CellTiter-Glo® 3D Cell Viability Assay with a standard curve made from known numbers of primary hepatocytes.

RNA Isolation and qRT-PCR

RNA isolation of organoids, tissues, and primary cells were performed with RNeasy Mini Kit (Qiagen) following the manufacturer's instructions. Samples with low amount of RNA were lysed in TRIzol (Invitrogen). RNA was reverse transcribed with M-MLV Reverse Transcriptase, RNase H Minus (Promega). qPCR analysis was performed with SYBR Green Mixture (Bio-rad Laboratories) in 96 or 384 q-PCR machine (Bio-rad Laboratories). Primers for qPCR were designed using NCBI Primer-BLAST.

mRNA Sequencing and Analysis

RNA-sequencing libraries were prepared based on the DESeq2 method (Hashimshony et al., 2016; Love et al., 2014). Briefly, total mRNA was isolated by TRIzol or RNeasy Mini Kit (Qiagen) and reverse transcribed with Ambion kit. In vitro transcription was performed using 1-5 ng cDNA as template and RNA was reverse transcribed into sequencing library. Samples were sequenced on an Illumina HiSeq 2000 instrument. Sequencing data analysis was performed using the DESeq2 package (CIT) in R environment. Paired reads were then quantified and normalized. Sample variability was visualized by Principal Component Analysis (PCA). Differential gene expression analysis was performed by DeSeq2 package and visualized by heatmap. Correlation analysis and visualization was performed with Corrplot package. All data analysis and visualization were performed suing R studio.

Single Cell Sequencing and Analysis

Organoids were trypsinized and tissue was perfused with collagenase into single cells. DAPI was used for live/dead cell discrimination. Single, live cells were sorted in 384-well plates using an Aria II cell sorter (BD bioscience). Sequencing library were prepared accordingly to CEL-seq2 methods (Hashimshony et al., 2016). Briefly, after sorting into 384 plates, cells were lysed at 65° C. for 5 minutes and then RNAs were reverse transcribed and pooled before in vitro transcription. Illumina sequencing libraries were prepared using the TruSeq small RNA primers (Illumina) and sequenced paired-end at 75 bp read length on Illumina NextSeq500. All data analysis was performed using RaceID2 algorithm. All RNA sequencing data is accessible through GEO series number GSE111301 in the NCBI Gene Expression Omnibus Immunohistochemistry, Immunofluorescence, Whole Mount Staining and Microscopy For section immunofluorescence, organoids were isolated from MatrigelR, fixed in 2% paraformaldehyde in 4° C. overnight, washed, and embedded into paraffin blocks. Sections were cut and hydrated before staining. Sections were boiled with citrate (pH=6.0), permeablilized in PBS supplemented with 0.2% triton X-100 (PBST) and blocked with 2% normal donkey serum (Jackson ImmunoResearch) or Power Block™ Universal Blocking Reagent (BioGenex) for 1 h at RT. Primary antibodies were then incubated at 4° C. overnight. Subsequently, after wash with PBS, sections were incubated with secondary antibodies, stained with DAPI and then embedded using Vertashield (Vector labs). Images were captured on Sp8 confocal microscope (Leica) and processed using Photoshop CS4 or Image J software. Cell size of liver organoids were measured on organoid sections co-stained with member-labelling and DAPI by Image J software.

For Immunohistochemistry, after sections were made and hydrated, they were incubated with blocking buffer with $H_2O_2$ for 15 min and boiled with citrate (pH=6.0). After cooling down, sections were treated with pre-blocking buffer and incubated with primary antibodies at 4° C. overnight. Sections were incubated with secondary antibodies and DAB stained. Sections were enclosed with Pertex and images were taken on a DM4000 microscope (Leica).

For whole mount staining, organoids were harvested using cell recovery solution (Corning) and fixed in 4% paraformaldehyde at 4° C. for 30 min. Organoids were then washed with PBT (PBS, 0.1% Tween), permeabilized in 0.5% PBST, blocked with 2% normal donkey serum in PBS or Power Block™ Universal Blocking Reagent (BioGenex) for 1 h at RT and incubated overnight with primary antibodies. The next day, organoids were washed with PBT and incubated overnight at 4° C. with secondary antibodies, Alexa-fluor-647 Phalloidin (both from Thermo Fischer Scientific) and DAPI (Invitrogen). Organoids were optically cleared in a glycerol-based clearing solution for 10 min prior to imaging. Organoid imaging was performed on Sp8 confocal microscope (Leica) or a Zeiss LSM 880 using a 25× oil immersion objective. Images were processed using Photoshop CS4 or Image J software and Imaris imaging software was used for 3D rendering of images.

Microarray

Total RNA was isolated from liver 3 days after ⅔ PHx and from undamaged liver. RNA was amplified, labelled and pooled for microarray analysis at the University of Hong Kong facility.

Universal mouse reference RNA (Agilent) was differentially labelled and hybridized to the tissue. The data for the microarray analysis is deposited at Gene Expression Omnibus under the accession number GSE110292.

Flow Cytometry (FACS)

For Albumin+ hepatocyte or Axin2+ hepatocyte sorting, hepatocytes were isolated by the two step collagenase perfusion method and stained with DAPI. Single live Tomato+ cells were sorted and collected into 15 ml tubes or 384 wells plates for culture, mRNA or single cell sequencing. For ploidy sorting of hepatocytes, cells were stained with Hoechst 34580 (Invitrogen) at 37° C. for 15 minutes and 2n, 4n, or 8n cells were separately collected as described before (Duncan et al., 2010).

Transmission EM

For Transmission EM, organoids were grown in MatrigelR on 3 mm diameter and 200 microm depth standard flat carriers for high pressure freezing and immediately cryoimmobilized using a Leica EM high-pressure freezer (equivalent to the HPM10), and stored in liquid nitrogen until further use. They were freeze-substituted over 3 days at −90° C. in anhydrous acetone containing 2% osmium tetroxide and 0.10% uranyl acetate at −90° C. for 72 hours and warmed to room temperature, 5° per hour (EM AFS-2, Leica, Vienna, Austria). The samples were kept for 2 h at 4° C. and 2 h more at room temperature. After several acetone rinses (4×15 min), samples were infiltrated with Epon resin for 2 days (3:1-3 h; 2:2-3 h; 3:1-overnight; pure resin-6 h+overnight+6 h+overnight+3 h). Alternatively, chemical fixation with 1.6% glutaraldehyde was performed. The fixation was followed by dehydration in acetone and then embedding in Epon resin as explained. Ultrathin sections were observed in a Tecnai Spirit T12 Electron Microscope equipped with an Eagle CCD camera (Thermo Fisher Scientific, The Netherlands).

Functional Analysis of Hep-Orgs and Chol-Orgs

Hep-orgs of late passages were used for functional analysis. To access glycogen storage, we used periodic acid-Schiff (PAS, Sigma) staining. LDL uptake was detected with DiI-Ac-LDL (Biomedical Technologies). MDR1-mediated transport of rhodamine 123 was detected over a 10-15 minutes incubation. Mouse and Human albumin secretion was detected with Bethyl Elisa Kit and P450 activity was tested by Promega Kit. Human a1-Antitrypsin and human alpha-Fetoprotein (AFP) were detected by Elisa kit from Assaypro and R&D. All experiments were followed manufacturers' instructions.

Transplantation

Human Fetal-Orgs were used after differentiation in DM for 5-7 days on 2D collagen coated plates. Before transplantation, organoids were harvested and digested with trypsin digestion to produce single cells, filtered through at 70 μm cell strainer (BD Bioscience), washed and viable cell numbers were calculated by trypan blue exclusion. Hep-Orgs (Fetal-Orgs and PHH-Orgs) cells after digestion were maintained at 4° C. in cold Hep-Medium until transplantation. 100,000 to 300,000 per mouse were injected intrasplenically into female FNRG mice preconditioned with one 70 mg/kg dose of retrorsine, OSM, and 1×109 genomic equivalents of an adenoviral vector expressing human HGF (Agilent). ALB and AFP levels were quantified by ELISA in blood serum obtained every 1-2 weeks after transplantation. Mice were sacrificed at various times (around 30 days and 90 days) after transplantation and liver sections were stained for human markers (hALB and NuMA).

Statistical Analysis

Data was compared between two groups of samples using the unpaired, two-tailed Student's t-test. Error bar presented as mean±/−standard deviation or SEM and p value were calculated.

GSEA Analysis

Gene Set Enrichment Analysis (GSEA, Broad Institute) was used to classify different gene sets. Genes were ranked according to the expression level (up-regulated or down-regulated at least 5 folds) after partial hepatectomy. Then the bulk mRNA sequencing data of Hep-Orgs and Primary-Heps was submitted to GSEA list to pre-ranked modes.

Figure 1B:
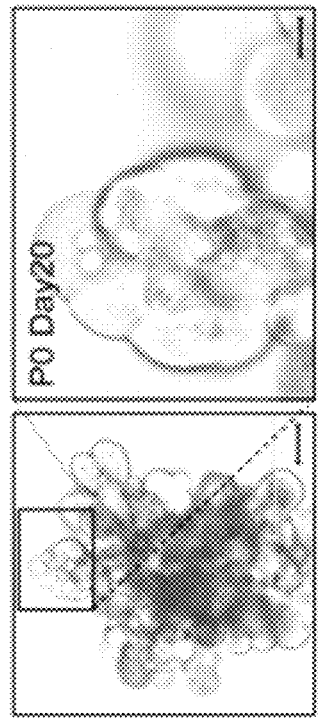
Figure 1C:
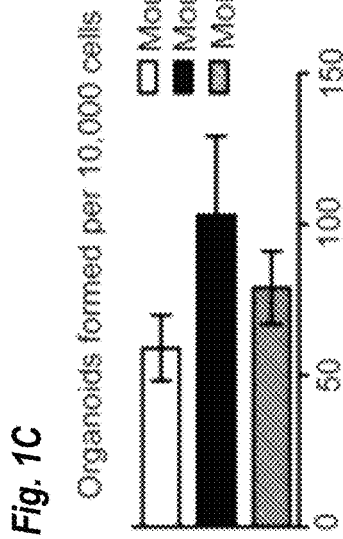
Figure 8B:
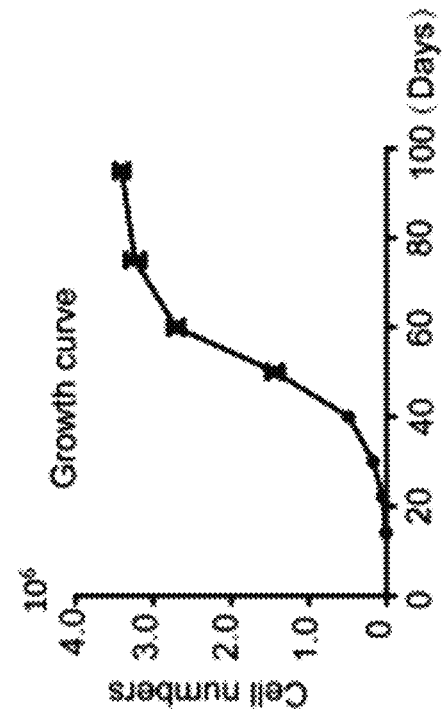
Figure 8C:
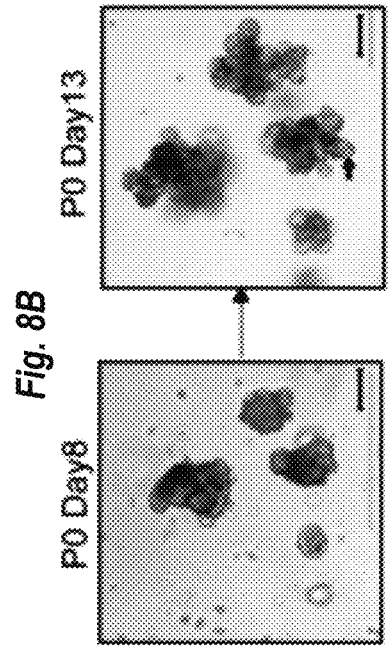
Figure 8A:
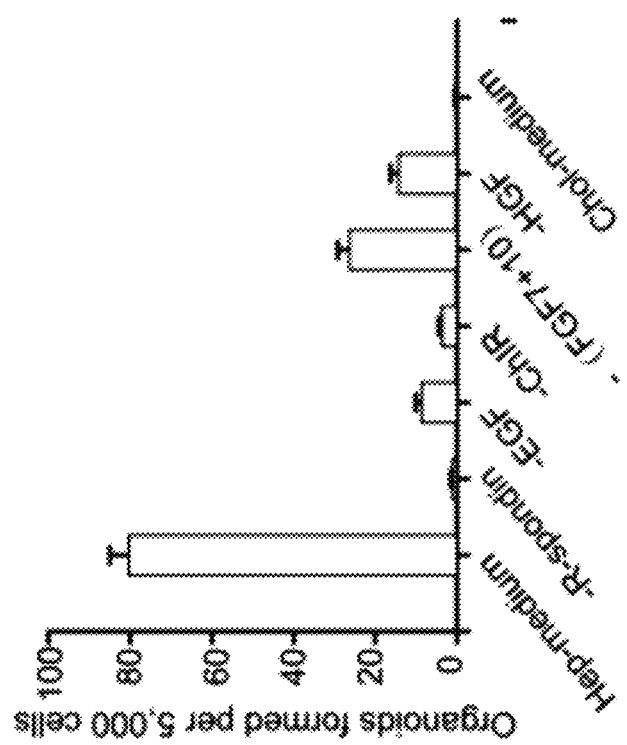

Example 2—Murine Hepatocyte Organoids (Hep-Orgs) Generated from Single Mature Hepatocytes Primary hepatocytes have been isolated from wildtype adult C57BL/6 mouse liver by two-step collagenase perfusion and the cells were suspended in MatrigelR (FIG. 1A). A variety of small molecules and biologicals were tested for the ability to support growth, including Wnt agonists such as R-spondin1 and CHIR99021, EGF, FGF7 and FGF10, HGF and the TGF-β inhibitor A83-01 (FIG. 8A). During the first week of culture, small organoids emerged from Matrigel-embedded hepatocytes in some of the culture conditions. This allowed refining the conditions, eventually resulting in robust organoid growth (FIGS. 8A and 8B) in the optimized Hep-Medium (Table 2). Unlike Chol-Orgs, Hep-Orgs were compact with a typical 'bunch-of-grapes appearance (FIG. 1B in comparison to FIG. 1D: Table 1 gives an overview of all comparisons). Plating efficiency was about 0.5%-1.0% of mature hepatocytes (FIG. 1C). This contrasted with the high plating efficiency of biliary epithelial cells (up to 30% of purified cholangiocytes) (Huch et al., 2015; Li et al., 2017), but was similar to that of organoids derived from stomach, colon, or prostate (Bartfeld et al., 2015; Drost et al., 2016; Sato et al., 2011). The organoids expanded to a diameter of ~400 μm within 15-20 days and could be passaged by mechanical disruption at a ratio of 1:3 every 7-10 days. Growth speed tended to slow down after 2-3 months (FIG. 8C). Organoids could also be obtained from BALB/c and C57BL/6×BALB/c mice (FIG. 8D).

Figure 1E:
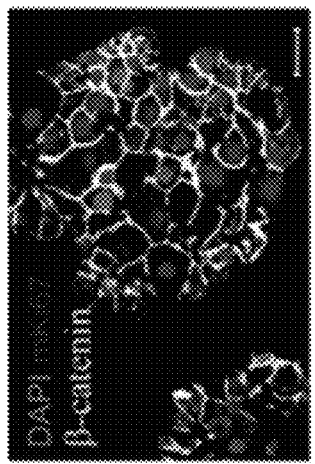
Figure 1D:
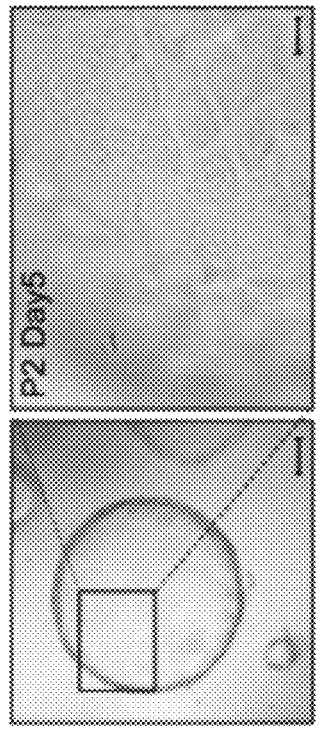
Figure 1F:
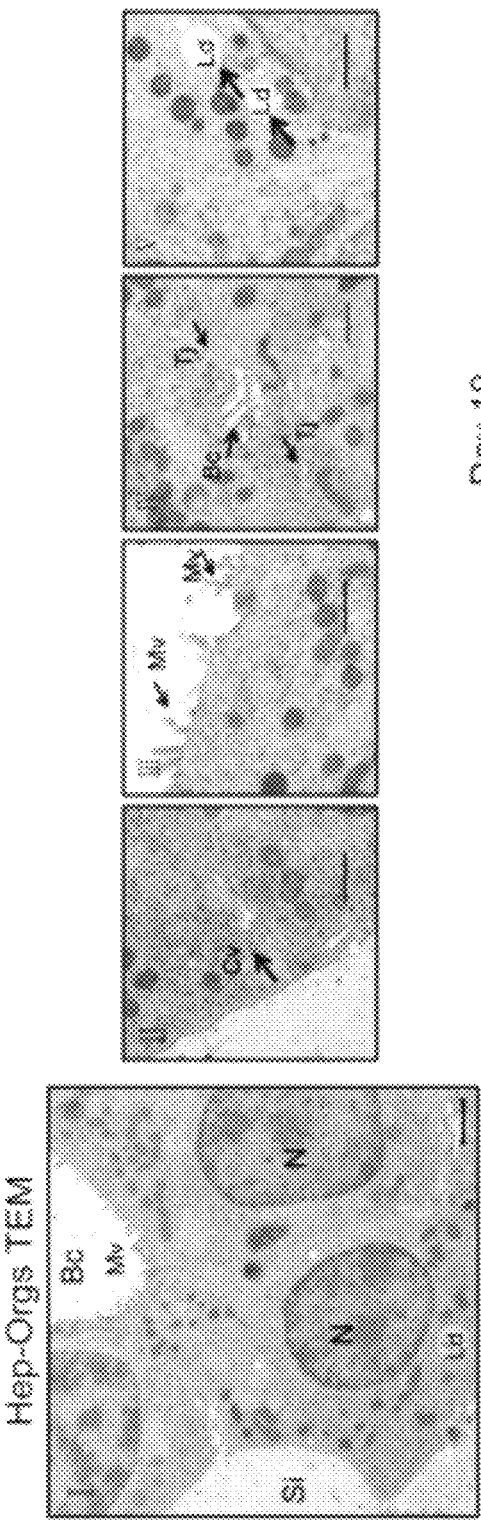
Figure 2A:
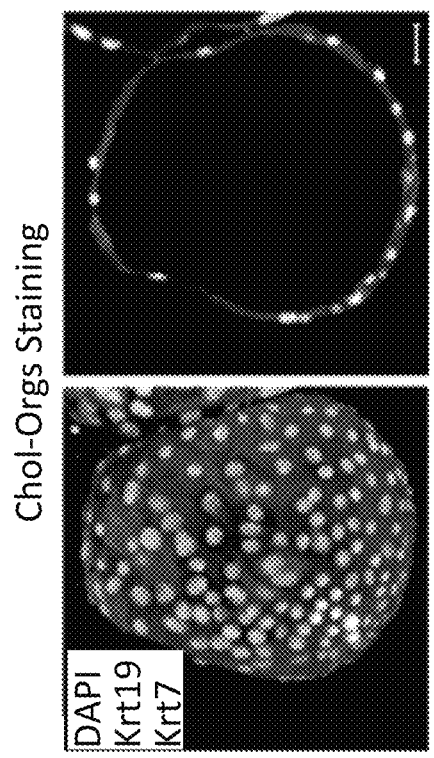
Figure 2B:
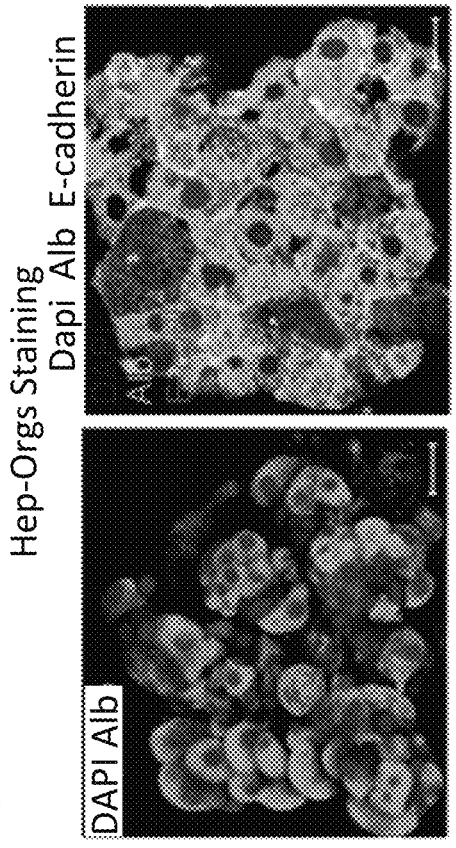

FIG. 1E gives a confocal image section stained for the adhesion junction marker β-catenin (yellow) and the proliferation marker mKi67 (red), revealing the absence of the large lumen seen in murine Chol-Orgs (Huch et al., 2013 and FIG. 2B). Typical hepatocyte morphology was revealed by transmission EM (FIG. 1F).

Figure 1G:
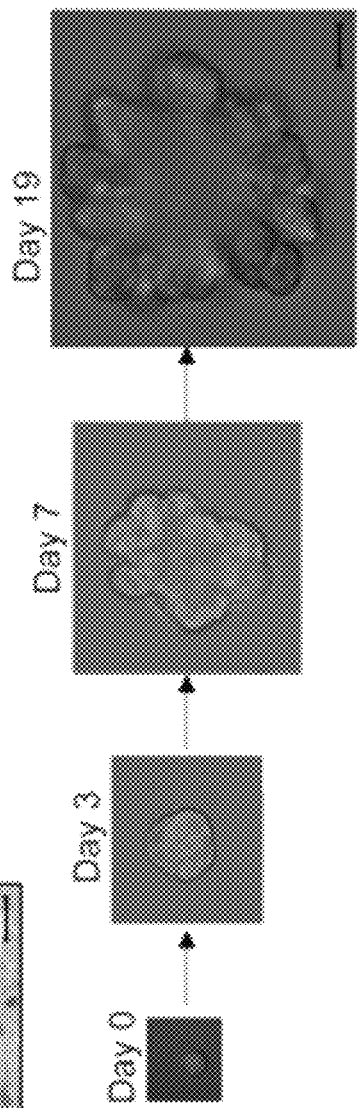

To probe the cell-of-origin, we isolated hepatocytes from Albumin-CreERT2; Rosa26-LSL-tdTomato mice. After tamoxifen induction, ~99% of albumin-secreting hepatocytes were labelled, whereas no cells of the biliary epithelium showed recombination (FIG. 8E). Single, sorted tomato-labelled hepatocytes generated fully labelled organoids, implying that the Hep-Orgs arise from single mature, albumin-expressing hepatocytes (FIG. 1G).

Hepatocytes in liver lobules differentially express zonation markers along the pericentral (PC)-to-periportal vein (PP) axis (Bahar Halpern et al., 2017; Burke et al., 2009; Grun et al., 2015). During homeostasis, expression of the Wnt target gene Axin2 marks hepatocytes adjacent to the PC that are the main source of homeostatic self-renewal (Wang et al., 2015). To investigate the zonal origin of Hep-Orgs, we isolated mature hepatocytes from mice carrying Axin2-CreERT2 and Rosa26-LSL-tdTomato alleles one week after Tamoxifen induction by FACS. Axin2+ hepatocytes displayed much higher plating efficiencies than Axin2− hepatocytes (FIG. 8F). Control Epcam+ cholangiocytes generated essentially no Hep-Orgs in Hep-Medium (FIG. 8G). Additionally, we sorted hepatocytes of different ploidy states (2n, 4n and 8n) as described (Duncan et al., 2010). Tetraploid hepatocytes, common in adult mouse liver, surprisingly yielded a comparable plating efficiency to diploid cells, while octaploid cells did not grow out (FIG. 8H).

Figure 2C:
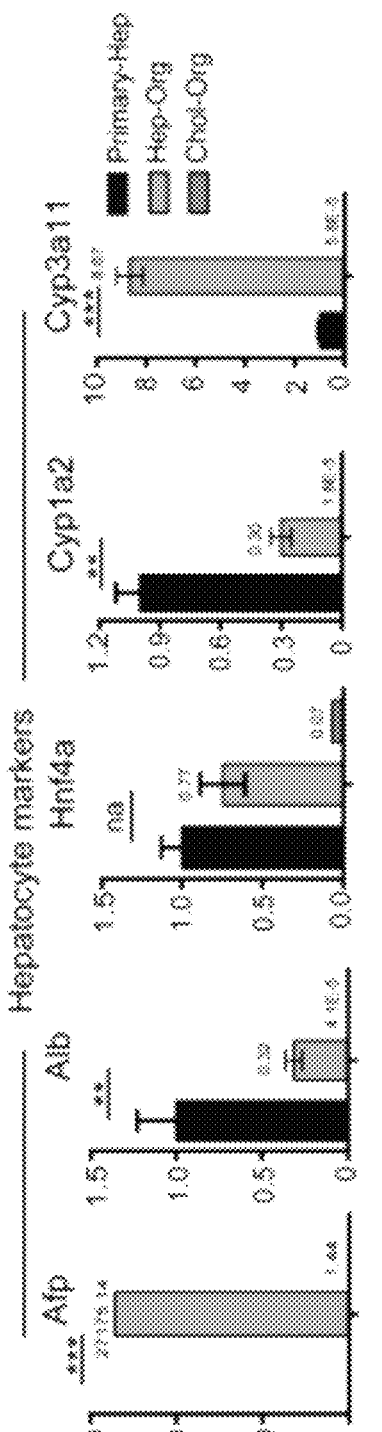
Figure 9A:
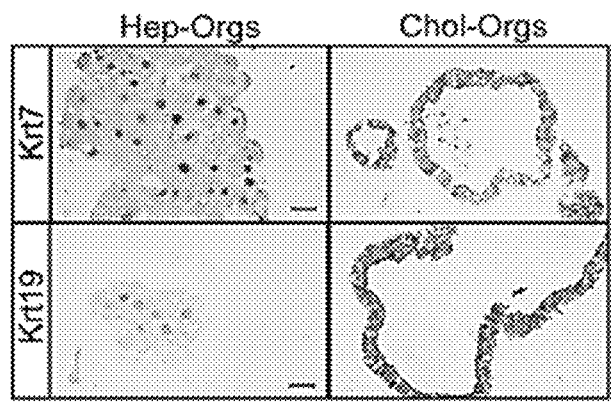
Figure 9B:
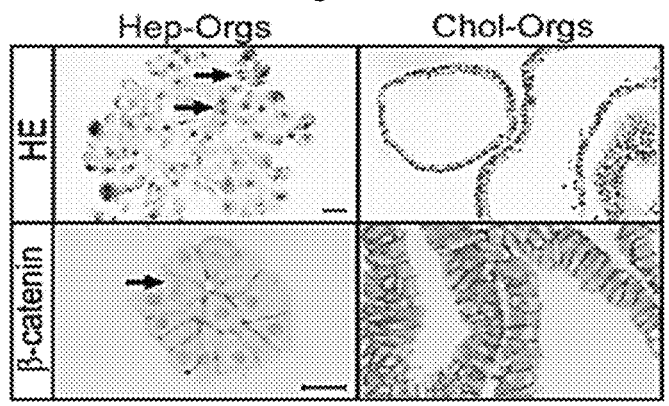
Figure 9C:
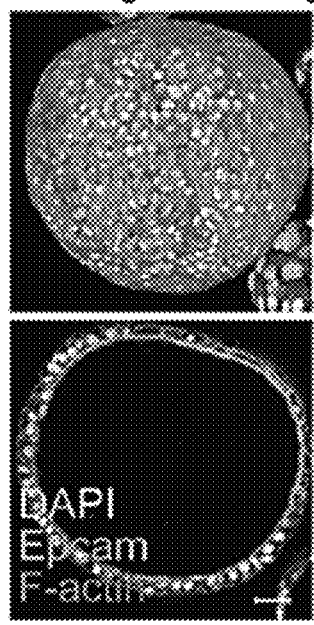
Figure 9E:
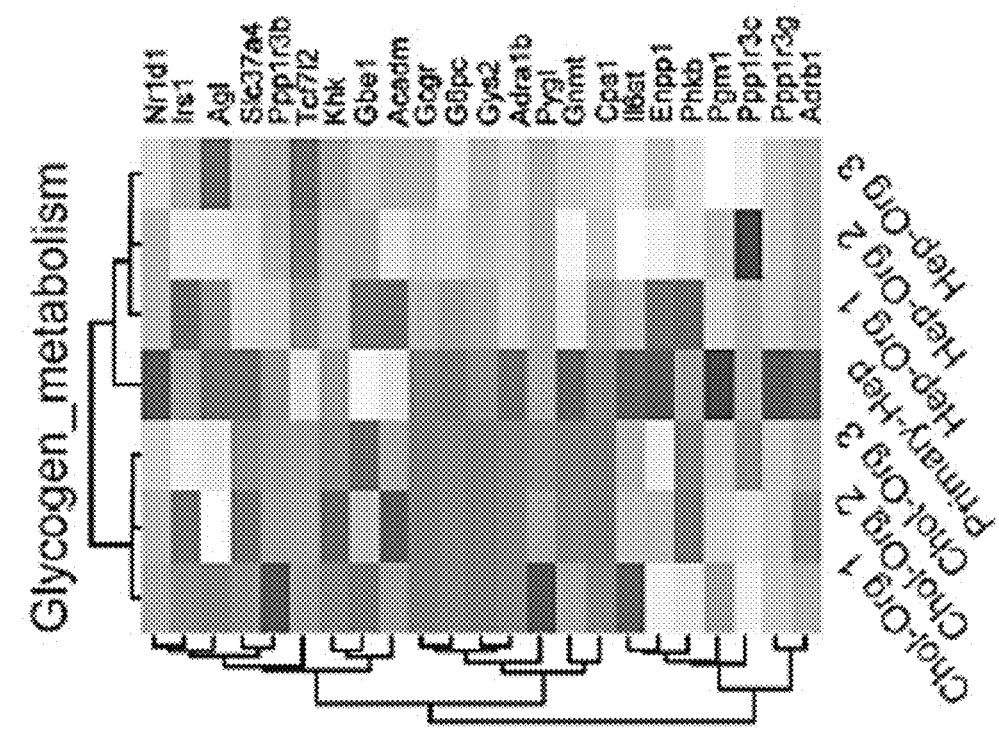
Figure 9D:
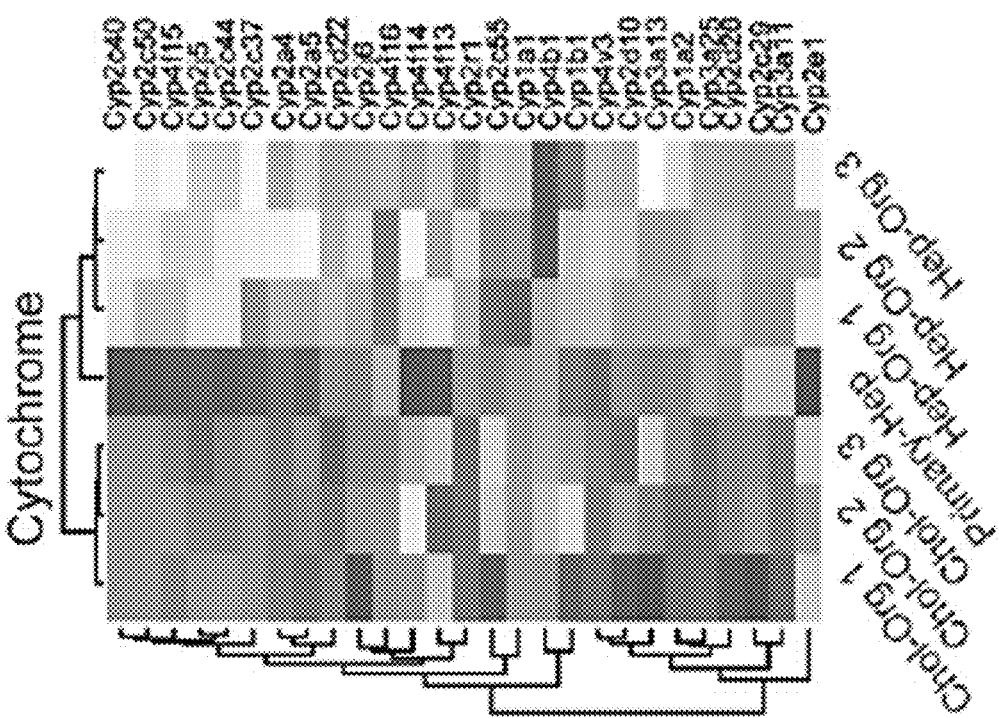
Figures 9F, 9G:
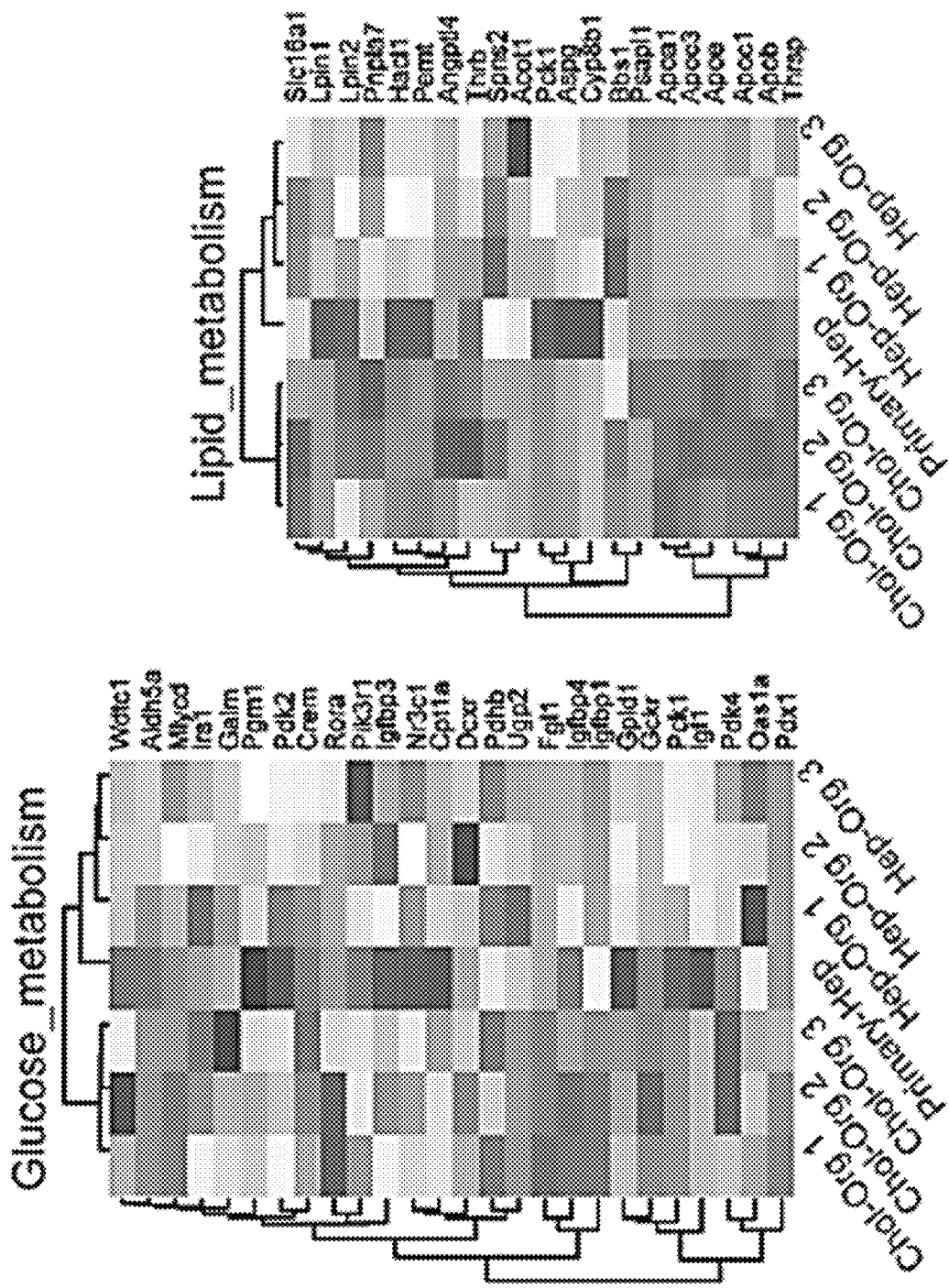
Figure 9H:
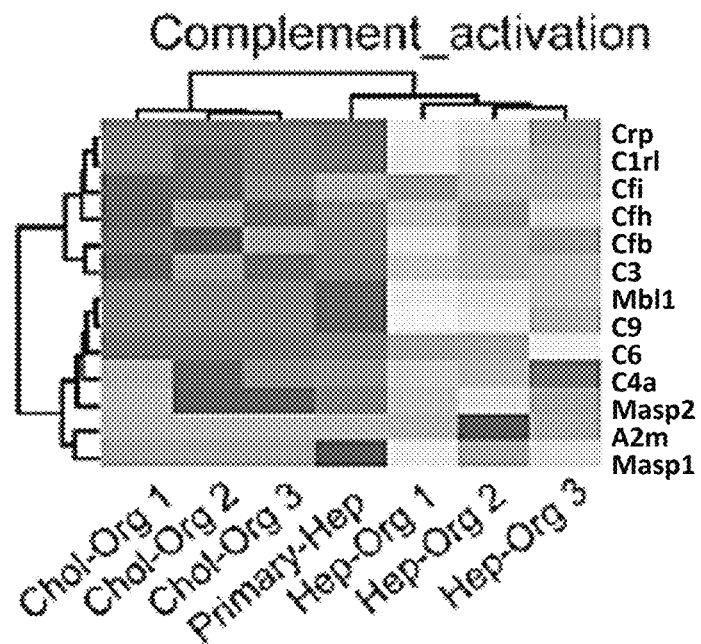
Figure 9I:
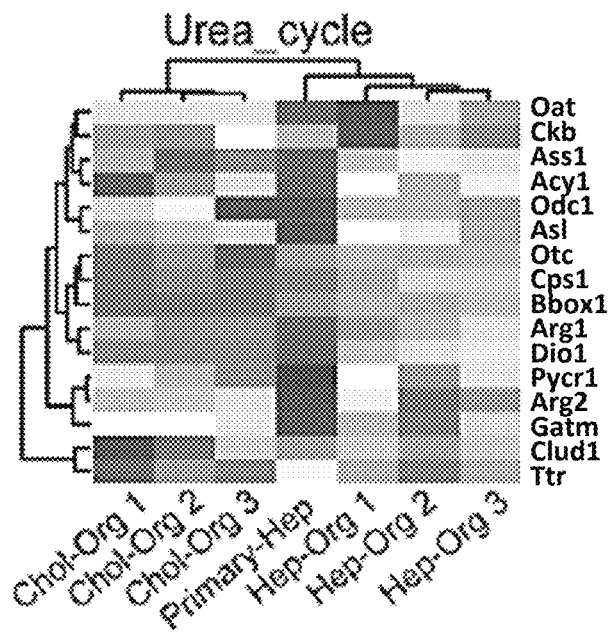
Figure 9J:
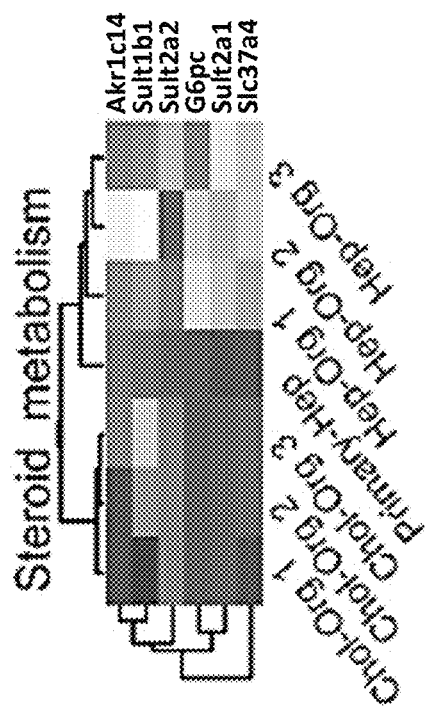
Figure 9K:
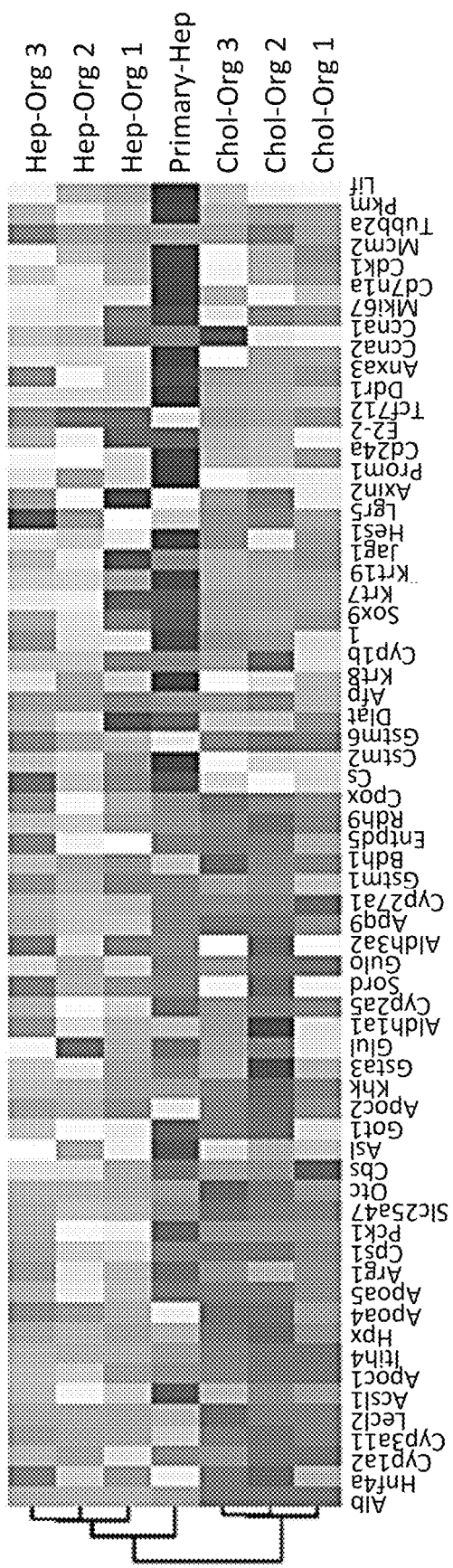

Example 3—Hepatocyte Organoids (Hep-Orgs) Retain Key Functions and Gene Expression Profiles of Hepatocytes Hep-Orgs as generated in Example 2 were then analyzed by immunofluorescence and immunohistochemical staining. Hep-Orgs showed strong albumin expression, yet were negative for the bile duct markers Krt19 or Krt7 (FIGS. 2A and 2B, FIGS. 9A and 9C). H&E, E-cadherin and β-catenin staining of paraffin sections revealed a characteristic organization of the Hep-Orgs (FIG. 2A and FIG. 9B). Hep-Org cells were larger in size (FIGS. 2A and 9B). Quantitative PCR (qPCR) was performed for the hepatocyte markers Alb, Hnf4a, Cyp1a2, and Cyp3a11, the fetal hepatocyte marker Afp, cholangiocytes/progenitor marker Krt19, and progenitor markers Tbx3 and Sox9 (FIG. 2C and FIG. 2D). Expression of these markers in Hep-Orgs closely resembled that of primary mouse hepatocytes (Primary-Hep). Yet, the former re-expressed the fetal hepatocyte gene Afp, a feature of hemi-hepatectomy (Engelhardt et al., 1976; Sell et al., 1974).

Hep-Orgs showed strong periodic acid-Schiff (PAS) staining indicative of glycogen accumulation (FIG. 2E). Low-density lipoprotein uptake (LDL) was readily visualized by fluorescent probes (FIG. 2F). Albumin secretion of Hep-Orgs (Passage 1 (P1) and P3) was only 2-4 fold lower compared to primary hepatocytes. Of note, expanding Chol-Orgs secrete at least 1000 fold less Albumin, and differentiated Chol-Orgs at least 10 fold less (Huch et al., 2013) (FIG. 2G). Cytochrome activity (Cyp1a2) was also only 2-3 fold lower compared with primary hepatocytes (FIG. 2H).

Figure 9L:
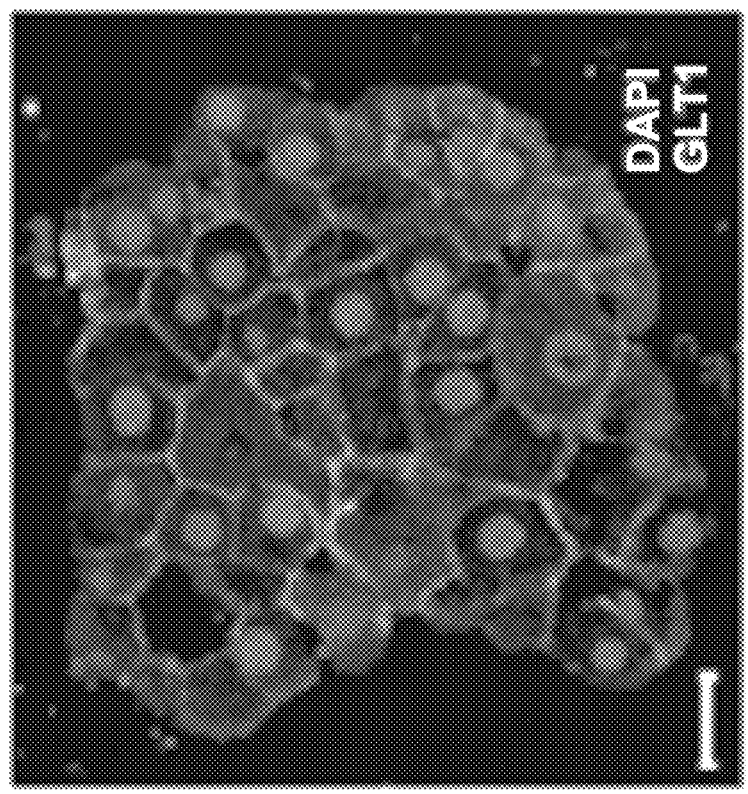
Figure 9M:
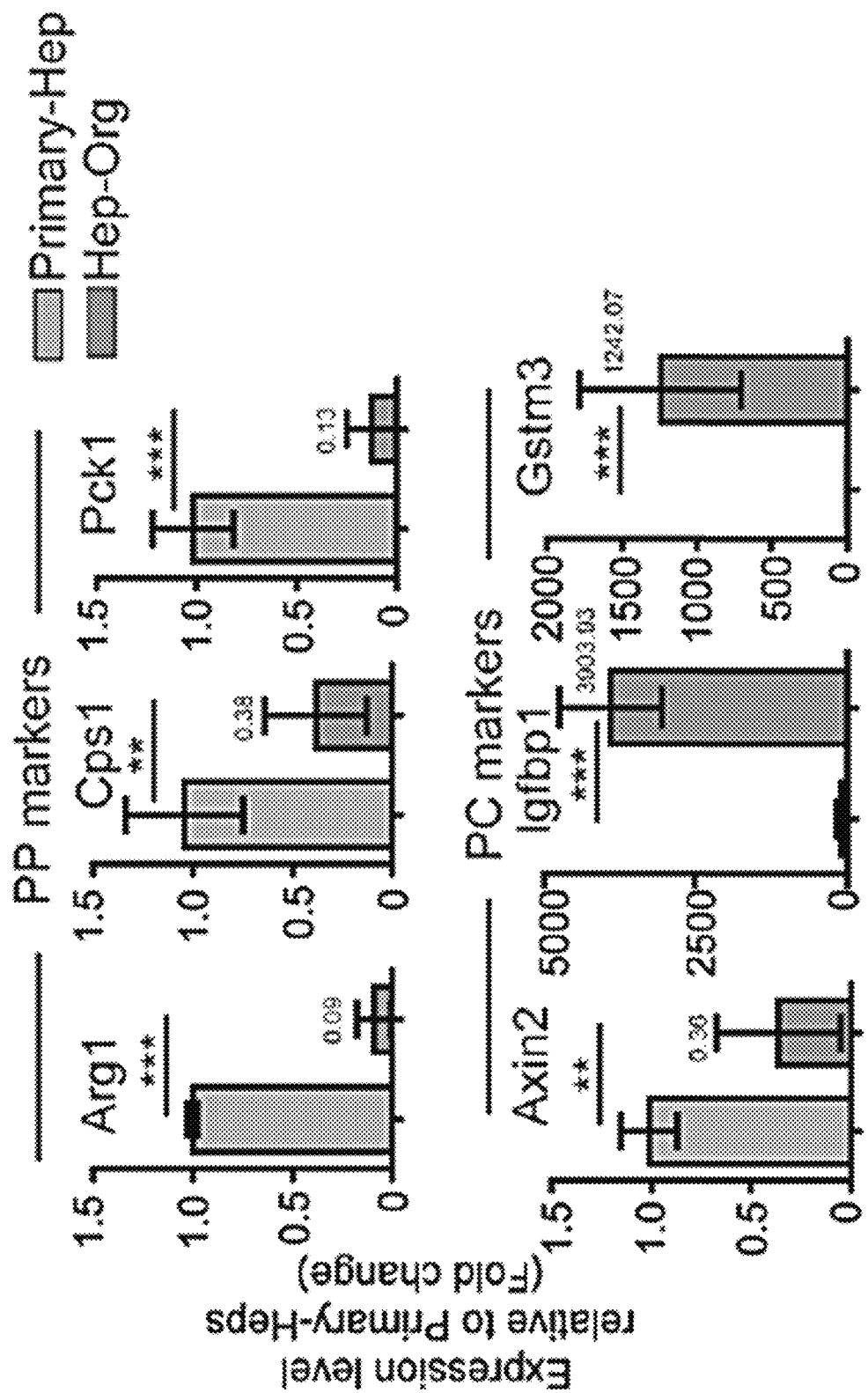

Bulk mRNA sequencing was performed for Hep-Orgs and Chol-Orgs from isolates of three different mice and compared to primary hepatocyte RNA. FIG. 2I represents a heat-map of the expression for ~40 hepatocyte genes, 10 cholangiocyte/progenitor genes and a number of proliferation markers (Full gene list given in FIG. 9K). Markers of hemi-hepatectomy response (Afp, cell cycle genes) were high in Hep-Orgs, but not in primary hepatocytes. Notably, genes involved in hepatocyte functions such as Cytochrome P450 activity, glycogen metabolism, lipid metabolism, steroid metabolism, urea cycle and complement activation all displayed similar expression profiles between Hep-Orgs and primary hepatocytes (FIG. 9D-9J). Hep-Orgs expressed PC marker to a higher extent than PP markers (FIGS. 9L and 9M).

These data demonstrate that Hep-Orgs display crucial functional aspects of primary hepatocytes. The hepatocyte organoids of the invention have distinct gene expression profiles compared to transdifferentiated cholangiocytes.

Example 4—Hepatocyte Organoids (Hep-Orgs) Recapitulate Hepatocyte Proliferation Upon Partial Hepatectamy (PHx)

Figure 3A:
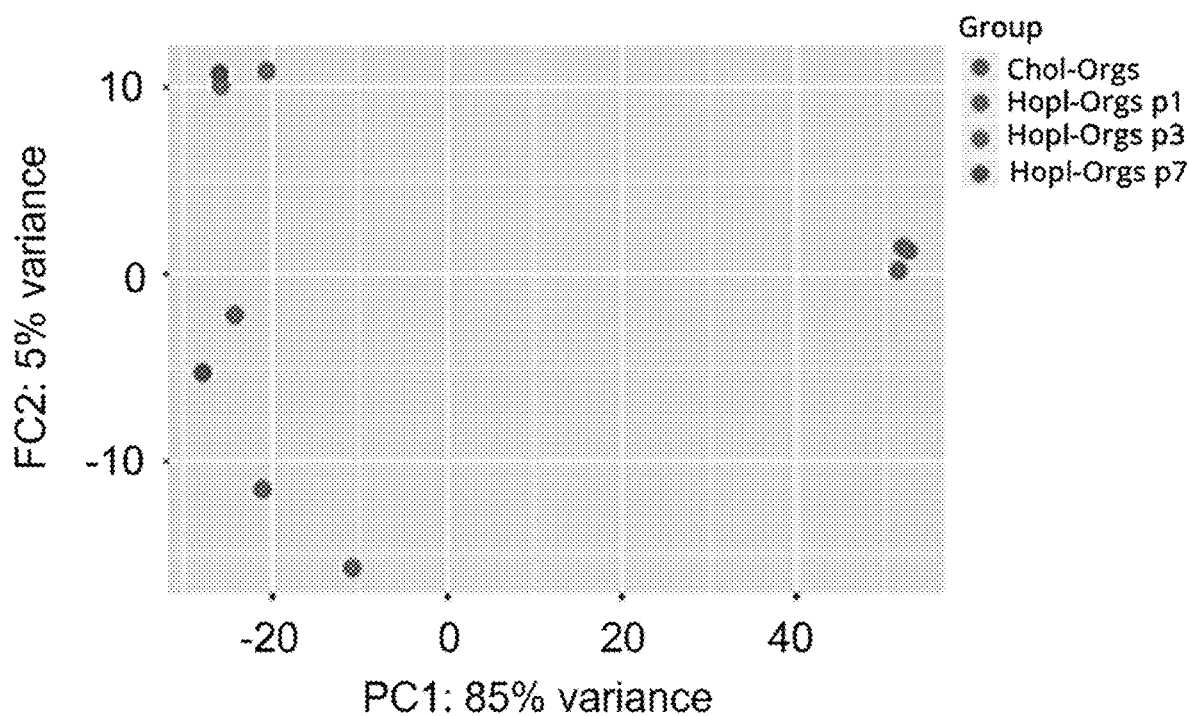

Gene expression patterns over time were assessed by mRNA sequencing for two murine Hep-Org cultures (M1 and M2). These remained remarkably similar over time as visualized by PCA plot and assessed at P1, P3 and P7 (FIG. 3A). The heat-map of main hepatic markers such as Alb, Hnf4a, Hpx indicated their stable expression during Hep-Orgs passaging, while Krt7 and Epcam were not re-expressed (FIG. 3B).

Figure 3B:
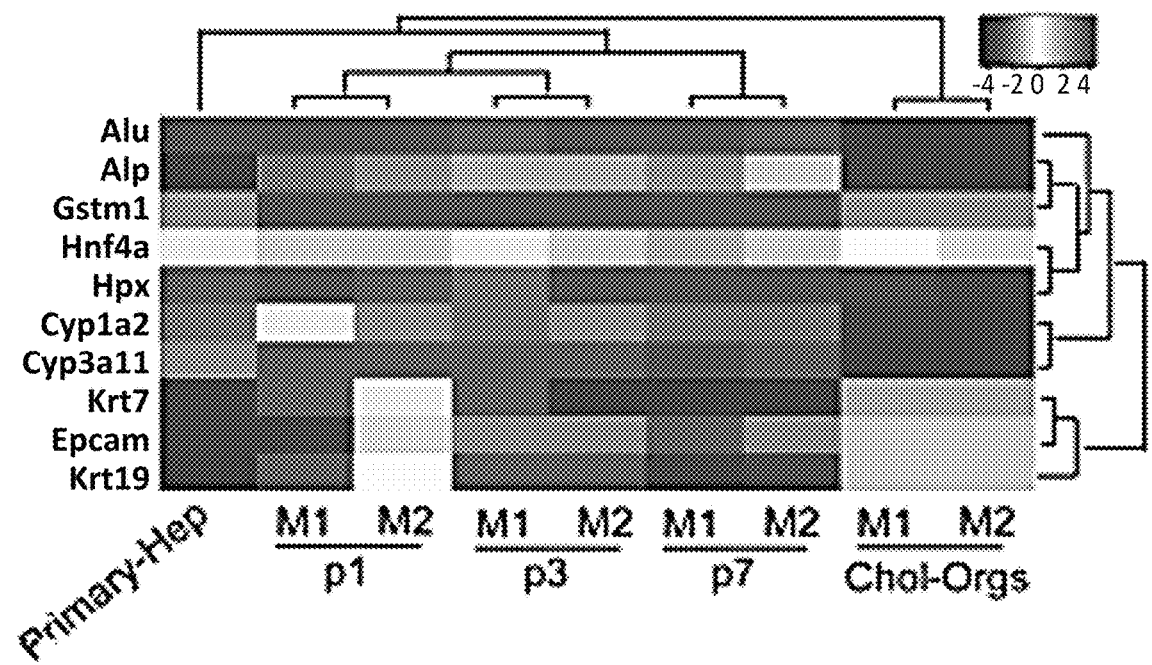
Figure 3C:
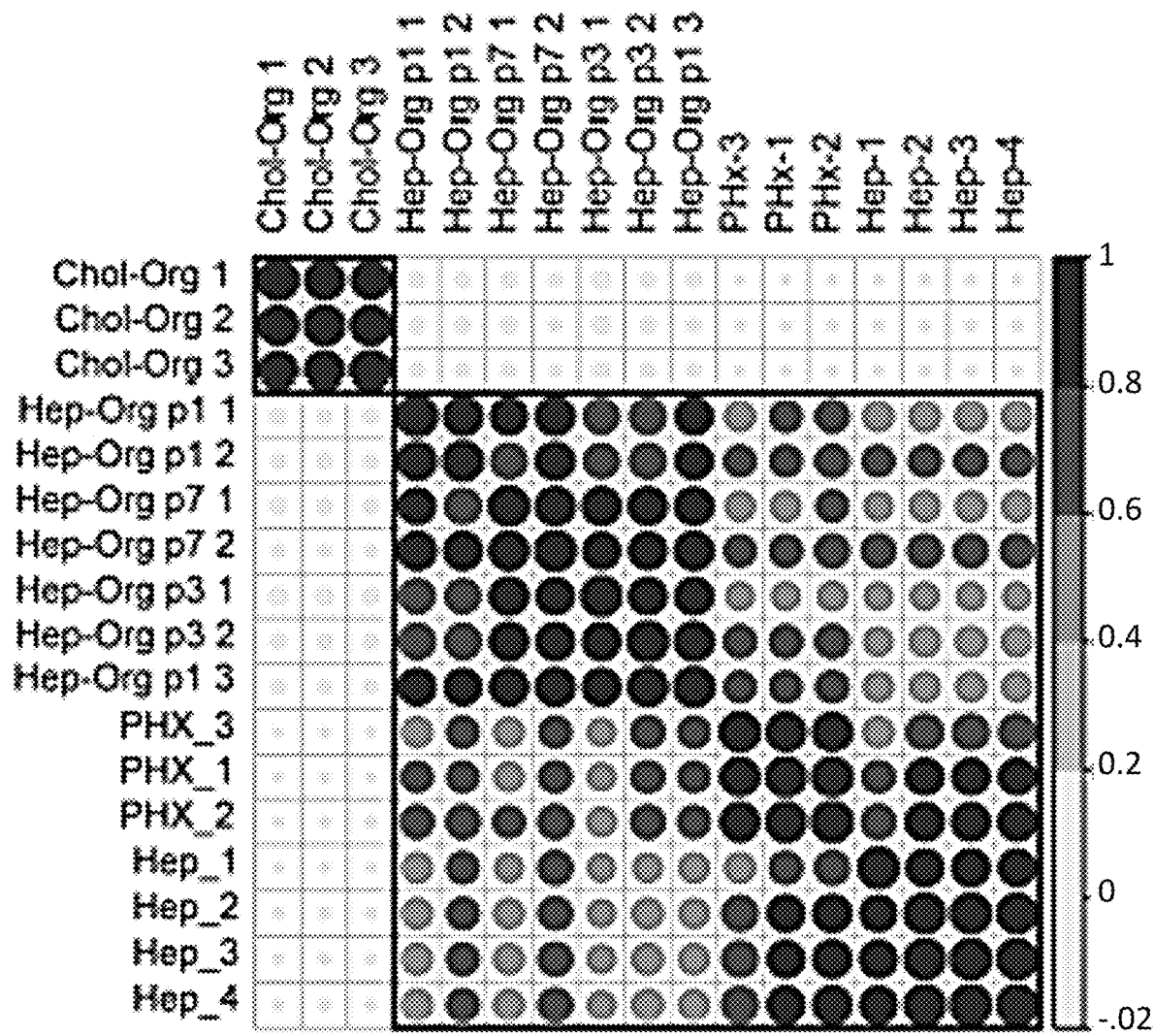
Figure 3D:
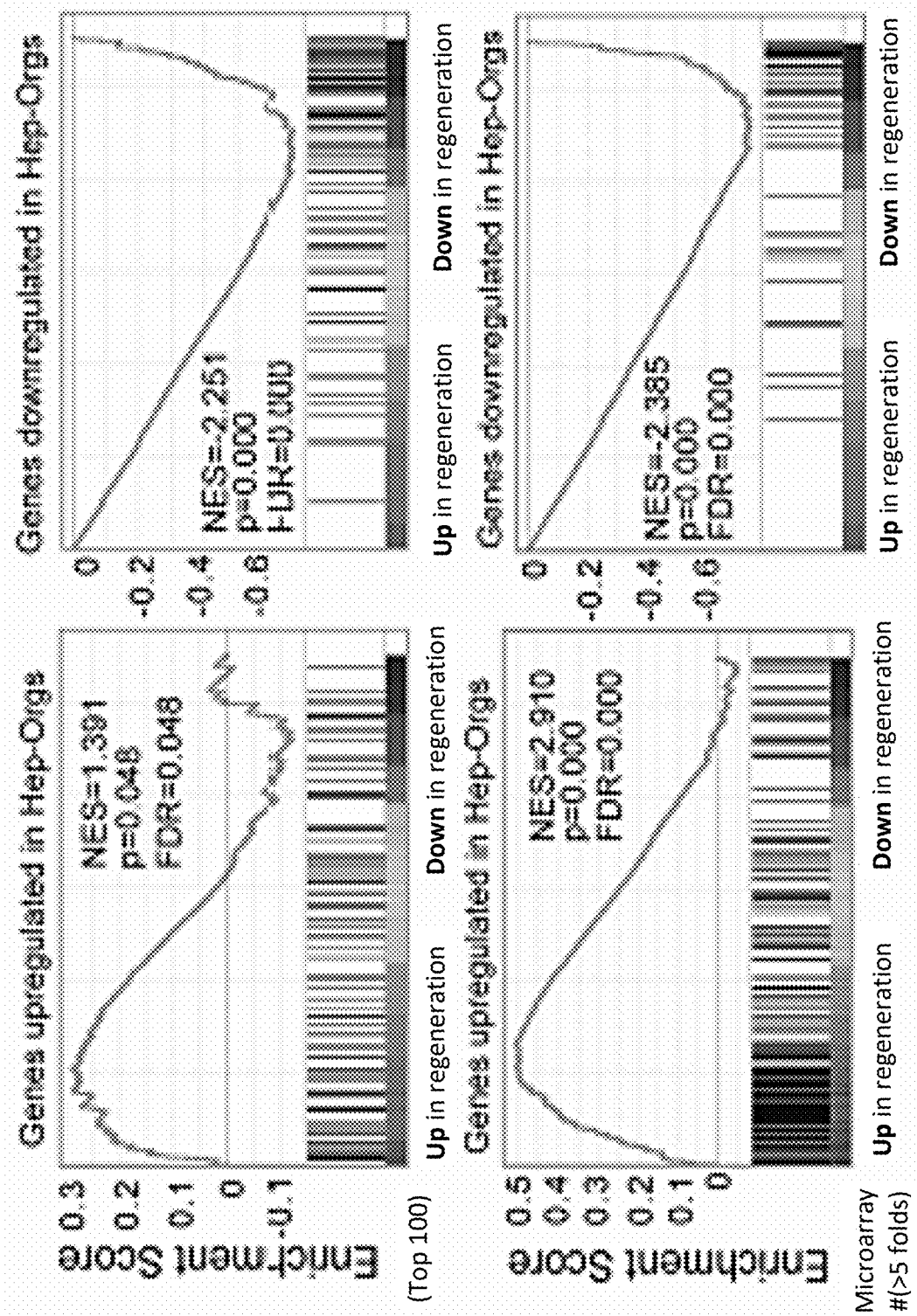

While Hep-Orgs display crucial functional aspects of primary hepatocytes, they obviously differ from these hepatocytes by being in cycle and by expressing fetal markers such as Afp and Alb (FIG. 3B). PHx drives hepatocytes into proliferation, peaking at the third day after damage (Michalopoulos, 2010). To compare gene expression profiles of Hep-Orgs to the in vivo transcriptional state of proliferating hepatocytes, we isolated hepatocytes by collagenase digestion at Day 3 post PHx as well as control undamaged hepatocytes and performed mRNA sequencing. Hep-Orgs clustered more closely with PHx hepatocytes than with undamaged hepatocytes or Chol-Orgs (FIG. 3C). A gene set of the top-100 genes differentially expressed between PHx samples and control undamaged hepatocytes was compared to Hep-Orgs by gene set enrichment analysis (GSEA). Multiple genes were up-regulated in proliferating hepatocytes after partial-hepatectomy that were also activated in the Hep-Orgs; gene enrichment was found in Hep-Orgs of P1, P3 and P7 (FIG. 3D). In addition, we independently determined differential gene expression between PHx and control undamaged liver by microarray analysis and from this analysis we generated a gene set list including genes that changed at least 5-fold. Significant enrichment was again observed by GSEA. Genes that were down-regulated in proliferating post-PHx hepatocytes were repressed in mouse Hep-Orgs. Conversely, upregulated genes in PHx samples were enriched in Hep-Orgs (FIG. 3D).

These data indicate that Hep-Orgs have similar gene expression profiles to proliferating hepatocytes.

Figure 10A:
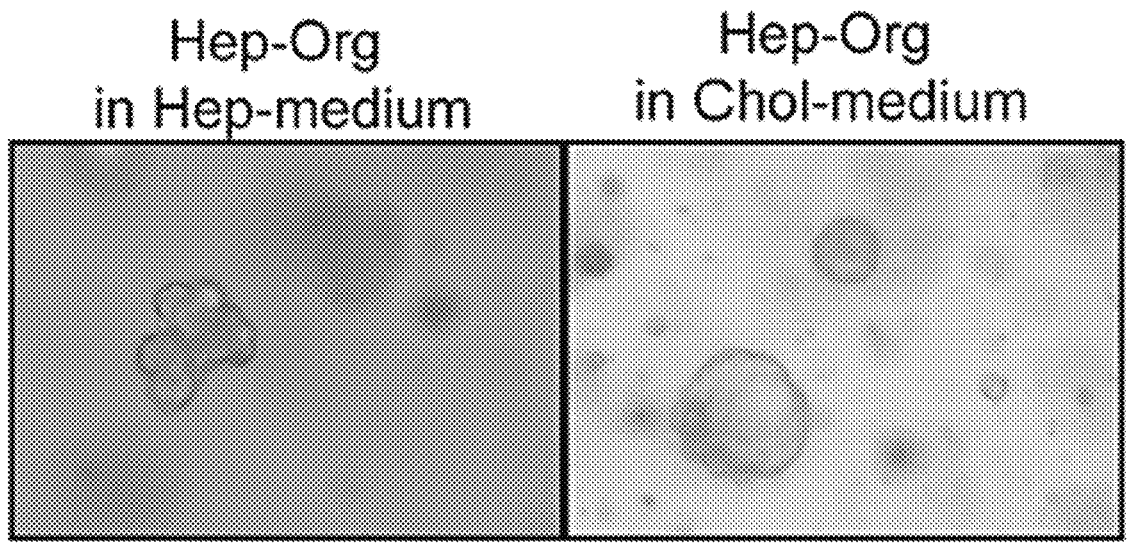
Figure 10B:
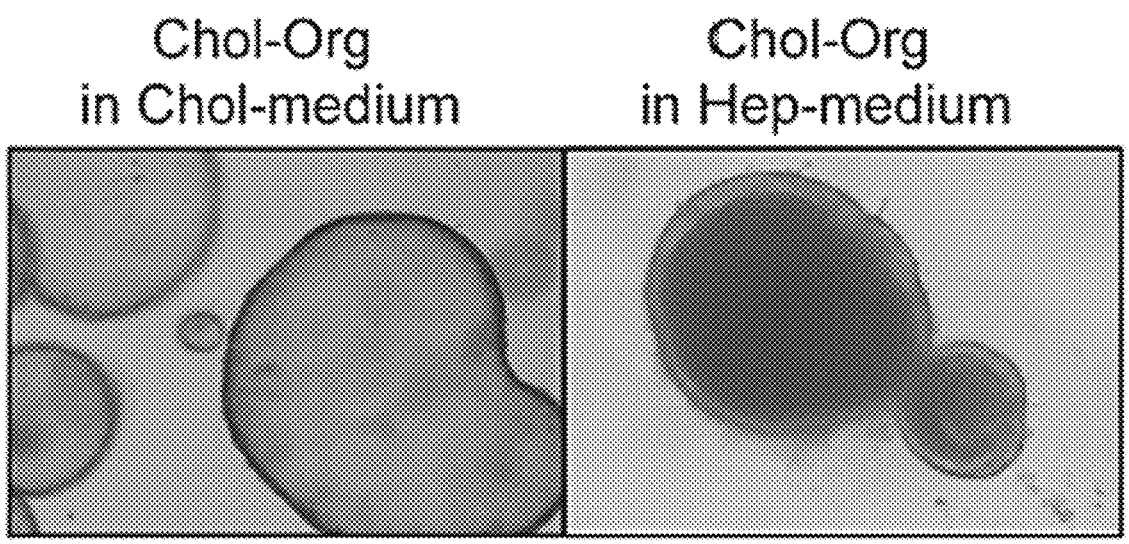
Figure 10C:
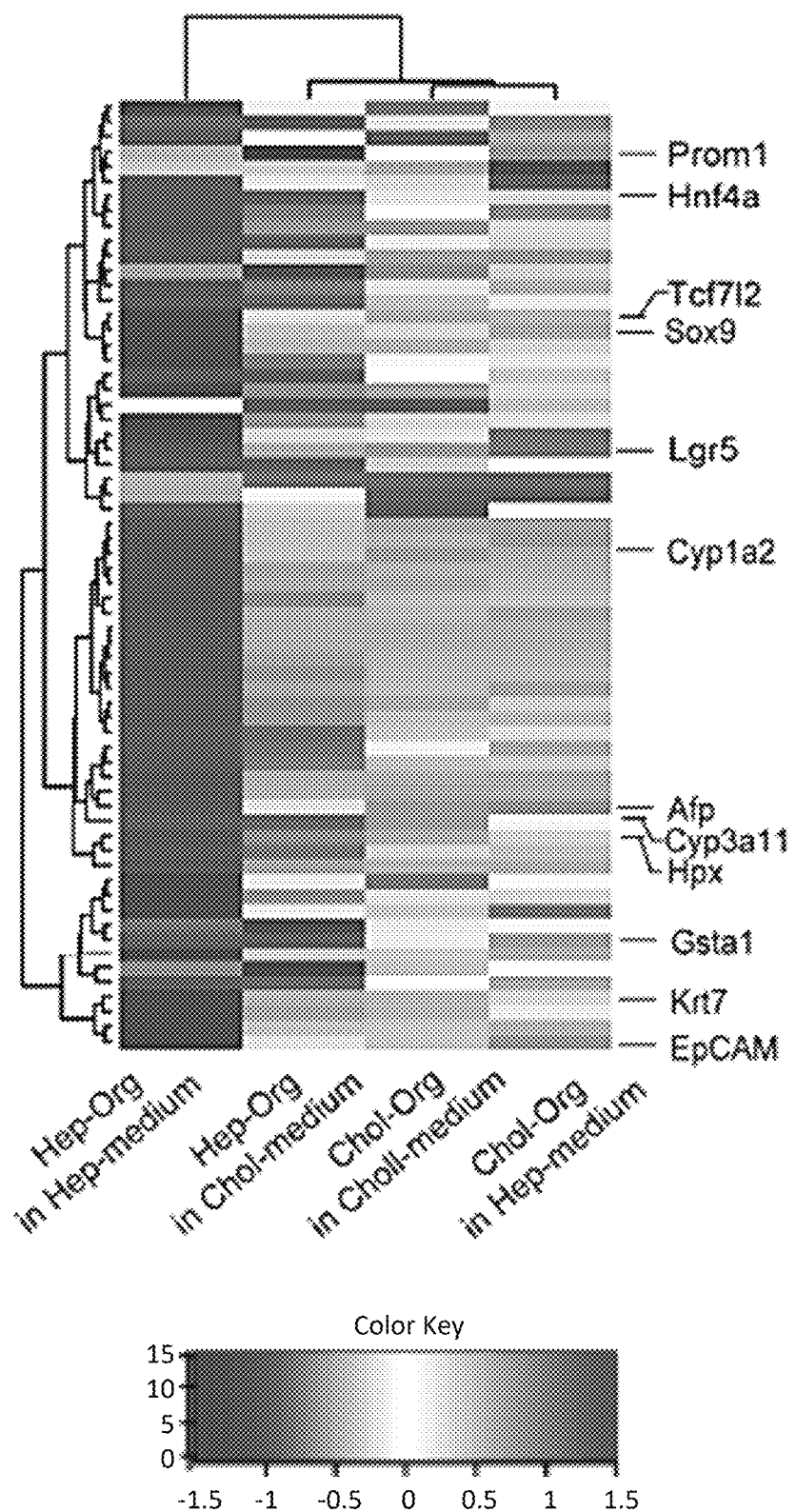

Example 5—Hepatocyte Organoids (Hep-Orgs) can Undergo Transdifferentiation into Cholangiocytes It was observed that some progenitor markers like Krt8/18 and Spp1 were upregulated during liver regeneration post-PHx. An in vivo study has described hepatocyte-to-biliary epithelial cell conversion after injury (Yanger et al., 2013). Similarly, cholangiocarcinomas can be derived from hepatocytes upon Notch and AKT activation (Fan et al., 2012; Sekiya and Suzuki, 2014). When culturing primary hepatocytes from Albumin-CreERT2; Rosa26-LSL-tdTomato mice, cystic organoids occasionally formed when CHIR was removed. Indeed, when Tomato-positive organoids were cultured in Chol-medium for more than 10 days, Krt7/19 were strongly induced while Alb and Hnf4a expression were gradually reduced (FIGS. 10A and 10C). Inversely, transferring Chol-Orgs into Hep-Medium did reduce the Krt7/19 expression but did not induce expression of hepatocyte-lineage markers. (FIGS. 10B and 10C).

Example 6—Single Cell mRNA Analysis of Hepatocyte Organoids

Figure 4A:
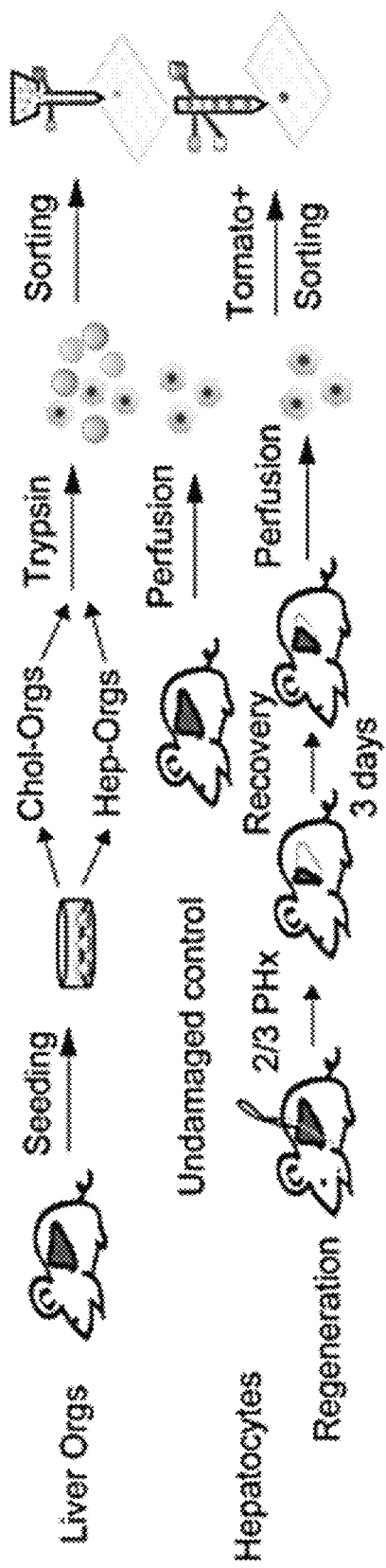
Figure 4B:
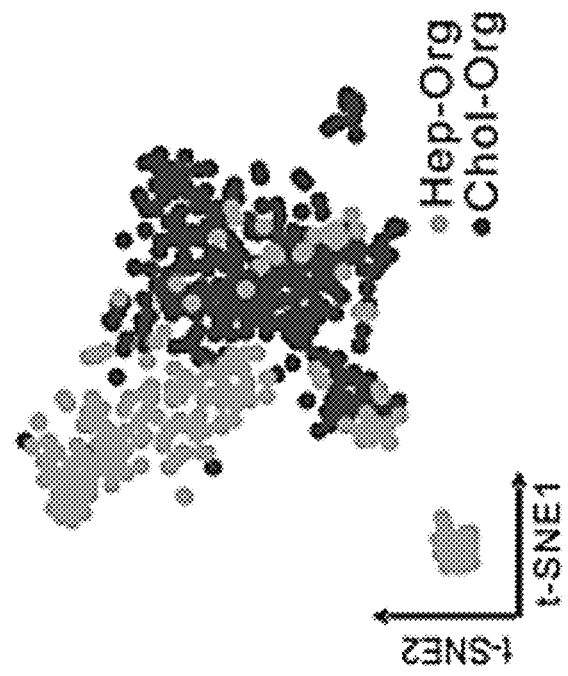
Figure 11A:
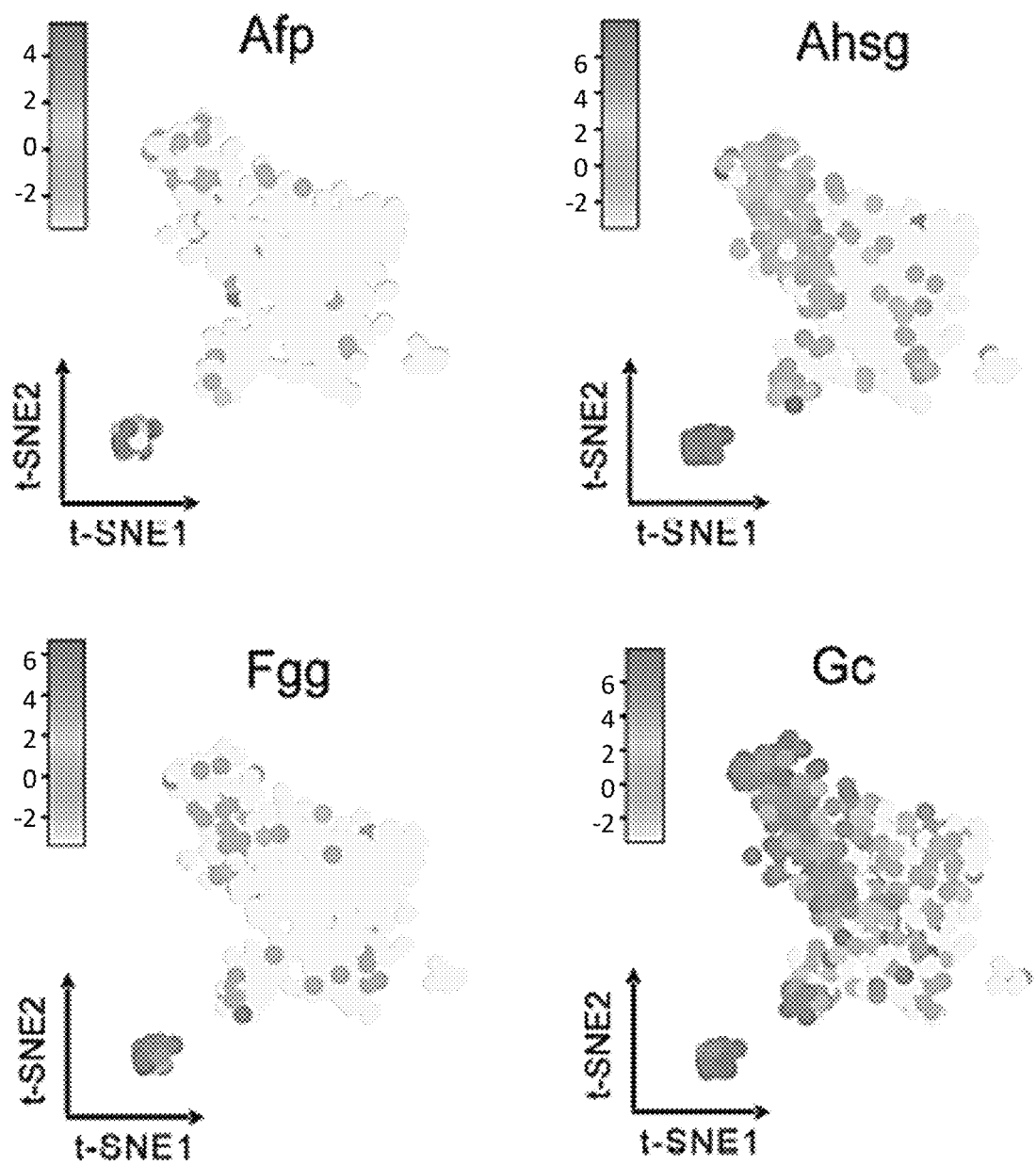

A single cell mRNA sequencing has been performed on Hep-Orgs and Chol-Orgs (FIG. 4A). 384 cells were sequenced from each and the results were analyzed by RaceID2 (Grun et al., 2015). After filtering for cells with >4000 transcripts, a total of 186 cells from Hep-Orgs and 253 cells from Chol-Orgs were retained for analysis. Analysis of combined datasets from Hep-Orgs and Chol-Orgs was performed and gene expression was visualized by t-SNE (FIG. 4B). Consistently, Alb, Ahsg, Afp, Fgg and Gc were only highly expressed in Hep-Orgs population while Epcam and Krt7 were highly expressed in Chol-Orgs (FIGS. 4C-4D, and FIGS. 11A and 11B). Both organoid types contained proliferating cells (FIG. 11).

Figure 4E:
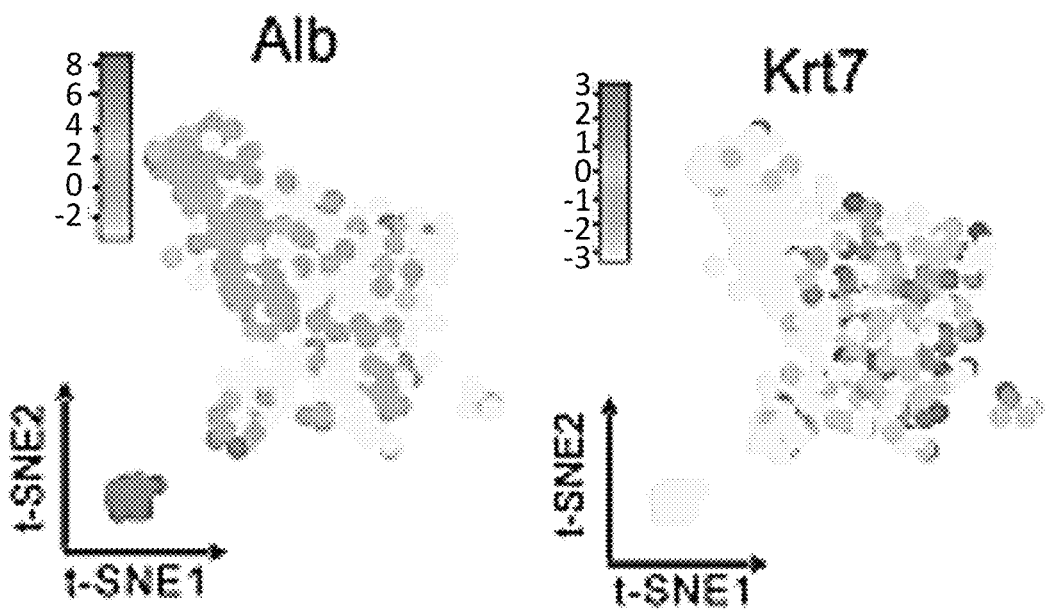
Figure 4E:
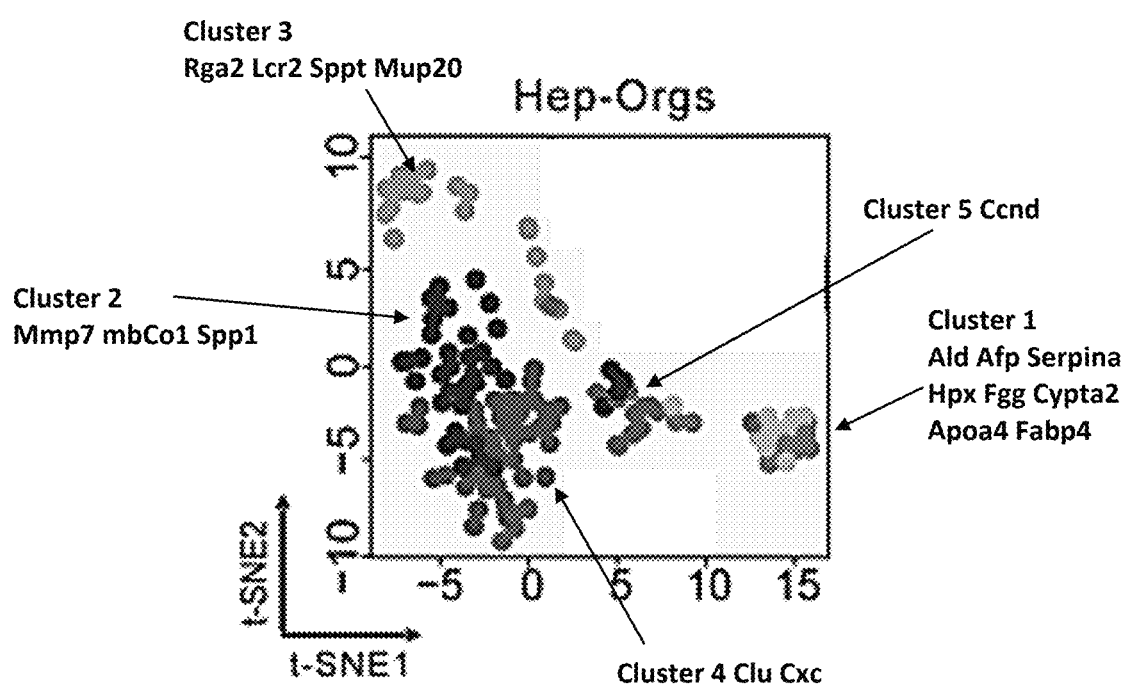
Figures 4F, 4G:
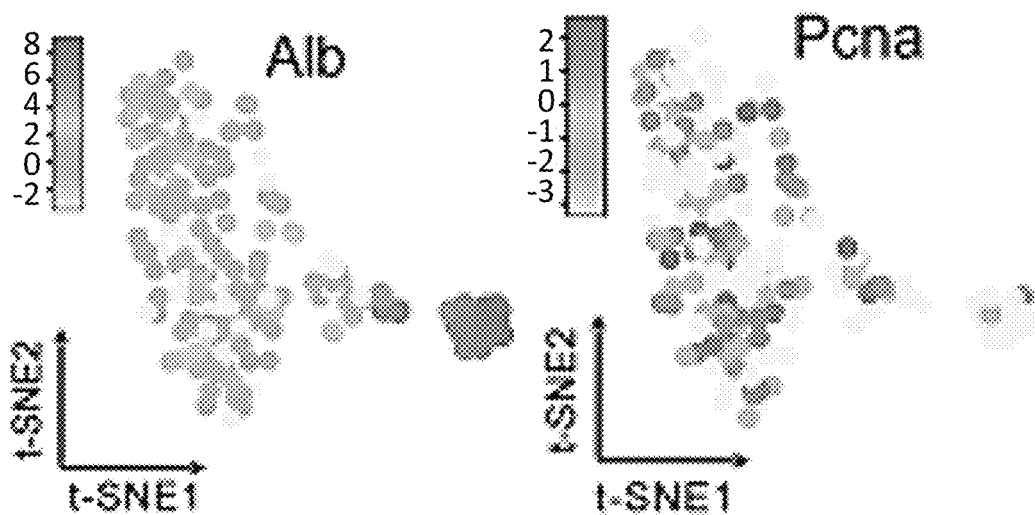
Figure 4H:
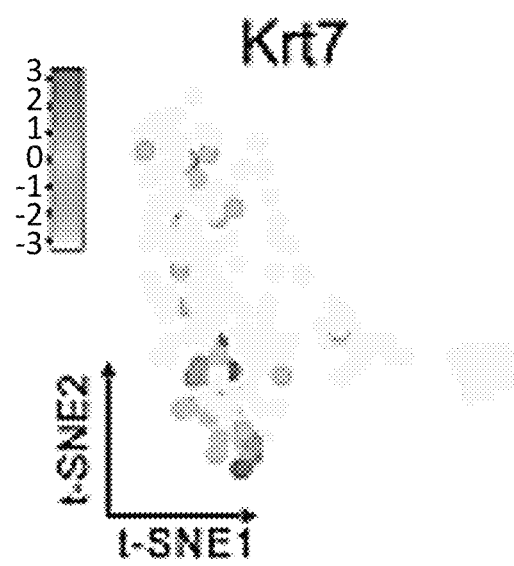

Clustering analysis was then performed on cells derived only from the Hep-Orgs, to address their cellular composition (FIG. 4E). Five different clusters were identified. Cluster 1 represented non-cycling mature hepatocytes (FIGS. 4F and 11D shows high albumin and hepatic marker expression). Clusters 2 and 3 expressed lower levels of albumin, high levels of hepatocyte progenitor markers such as Spp1 (Liu et al., 2015) and represented cycling hepatocyte progenitor cells (FIG. 4G and FIG. 11E). Cluster 4 expressed high levels of cycling markers and lacked mature markers, identifying it as a yet more primitive cycling cell population. In some cells of Cluster 5, we noted expression of cholangiocyte-lineage markers such as Krt7 (FIG. 4H), suggestive of a trans-differentiation event.

Figure 4I:
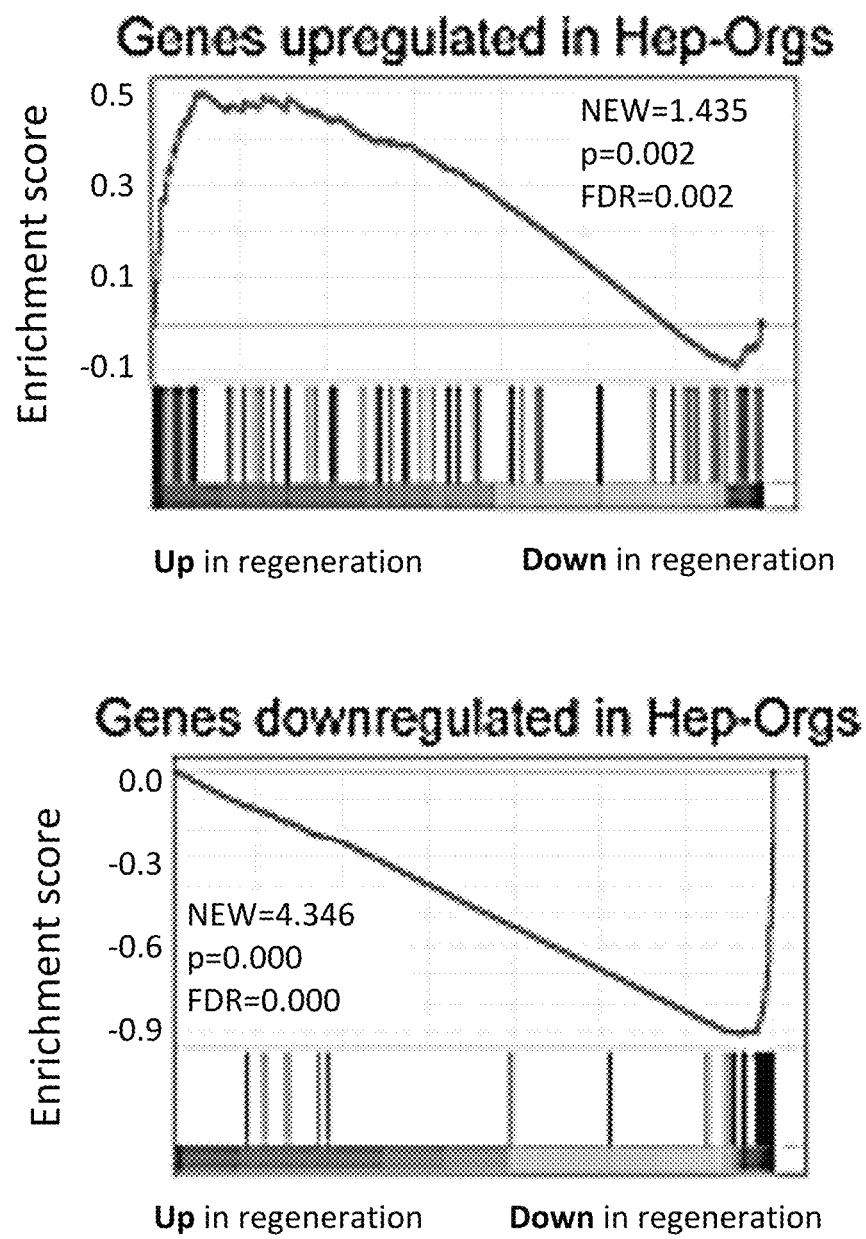
Figure 4J:
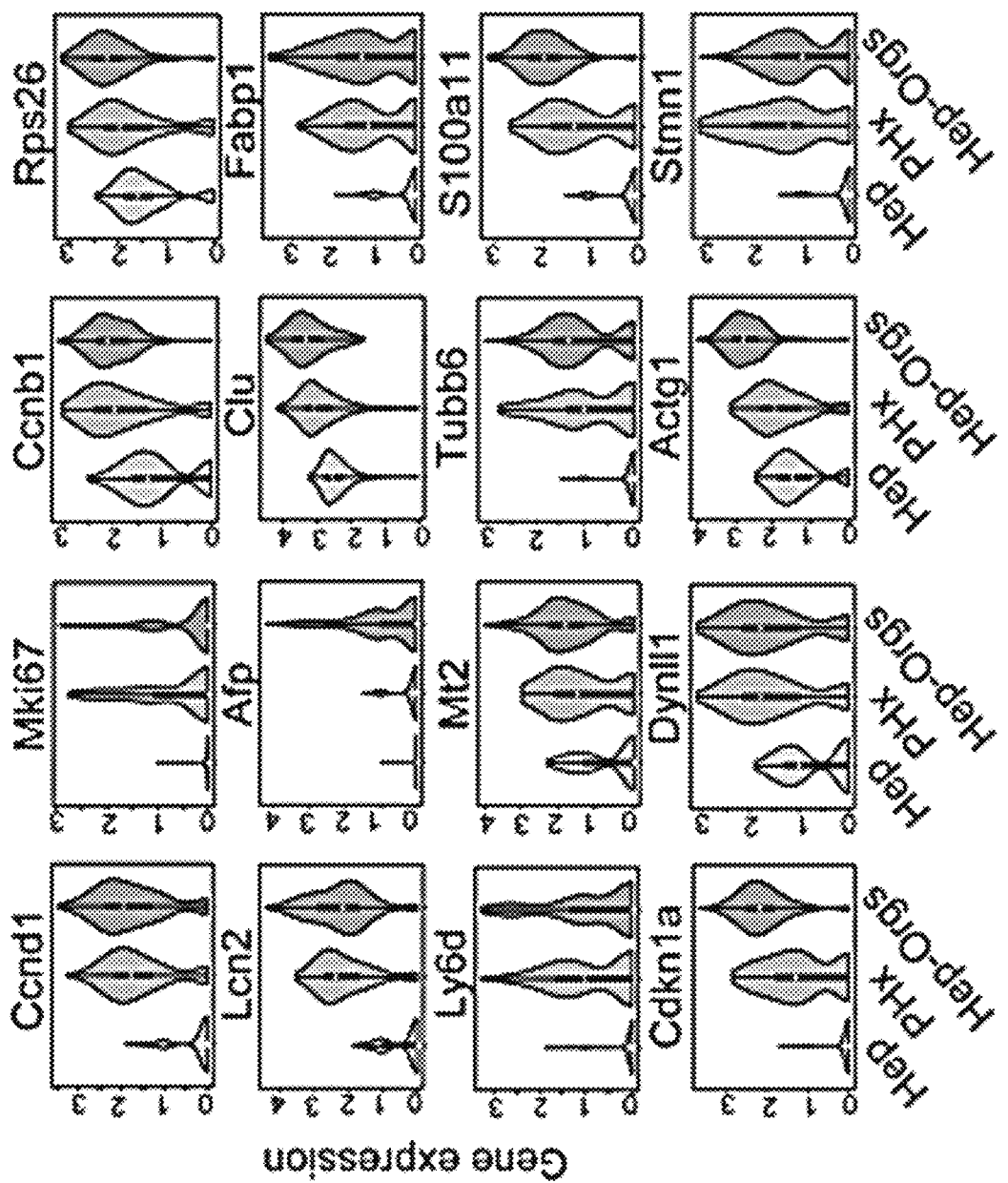
Figure 11F:
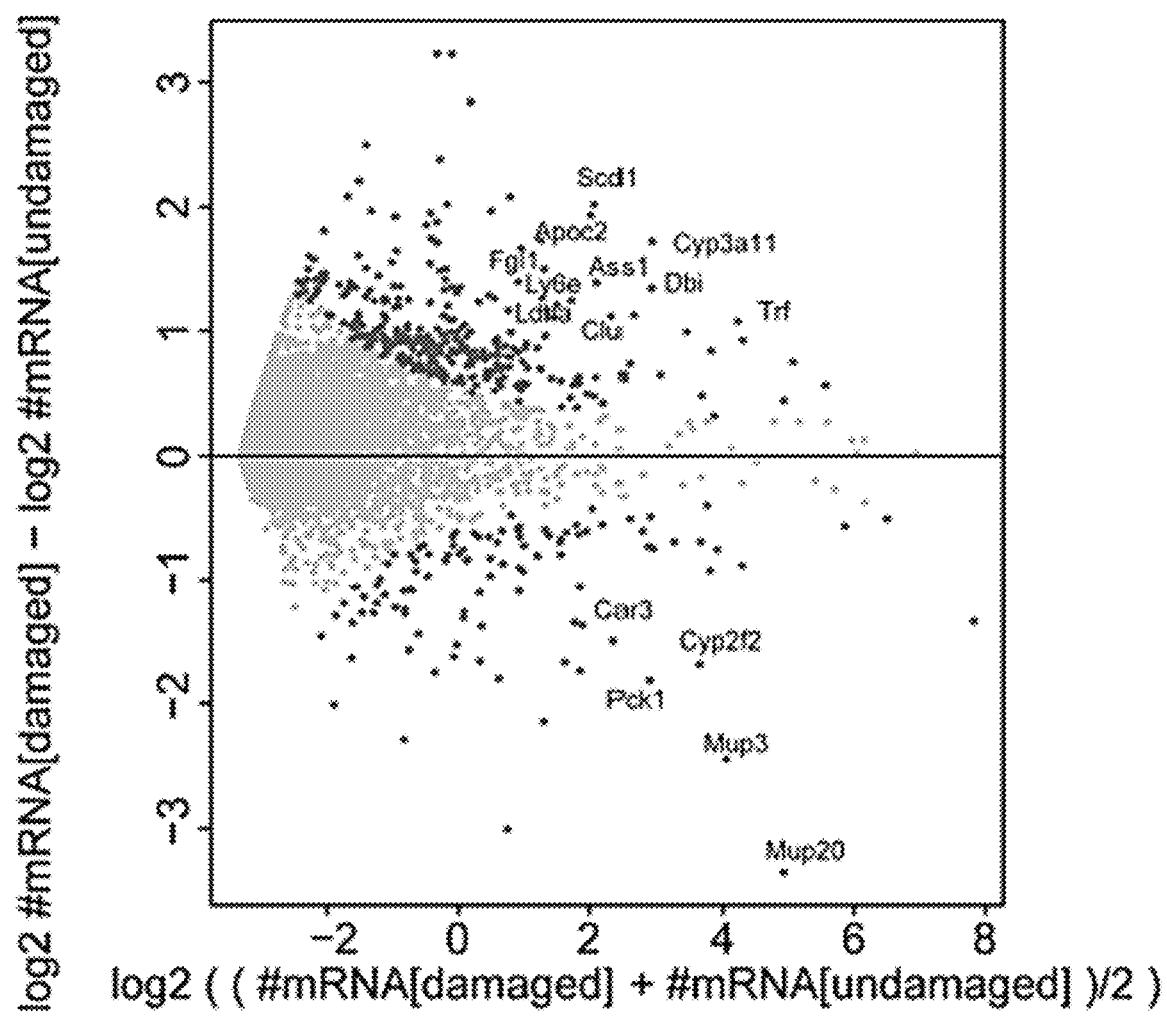

197 post PHx hepatocytes and 291 undamaged hepatocytes by single cell sequencing were also retained for analysis after filtering for >3000 transcripts per cell. The top 100 differentially expressed genes between these were grouped in a gene set that was then used for GSEA of Hep-Orgs (FIG. 11F). Hep-Orgs were more comparable to proliferating, post-PHx hepatocytes than to control hepatocytes (FIG. 4I). We used violin plots to visualize gene expression in undamaged hepatocytes, in PHx hepatocytes and in cells from Hep-Orgs. As expected, cell cycle-related and ribosome synthesis genes were significantly increased in both Hep-Org cells and in post-PHx hepatocytes (FIG. 4J). Typical non-cell-cycle-related genes that were up-regulated after partial-hepatectomy showed concordant expression in Hep-Orgs. These included Afp, Lcn2, Actg1, Fabp5, Clu, Ly6d, Mt2, S100a11, Stmn1, Tubb6, Cdkn1a, and Dynll1 (FIG. 4J).

Figure 12A:
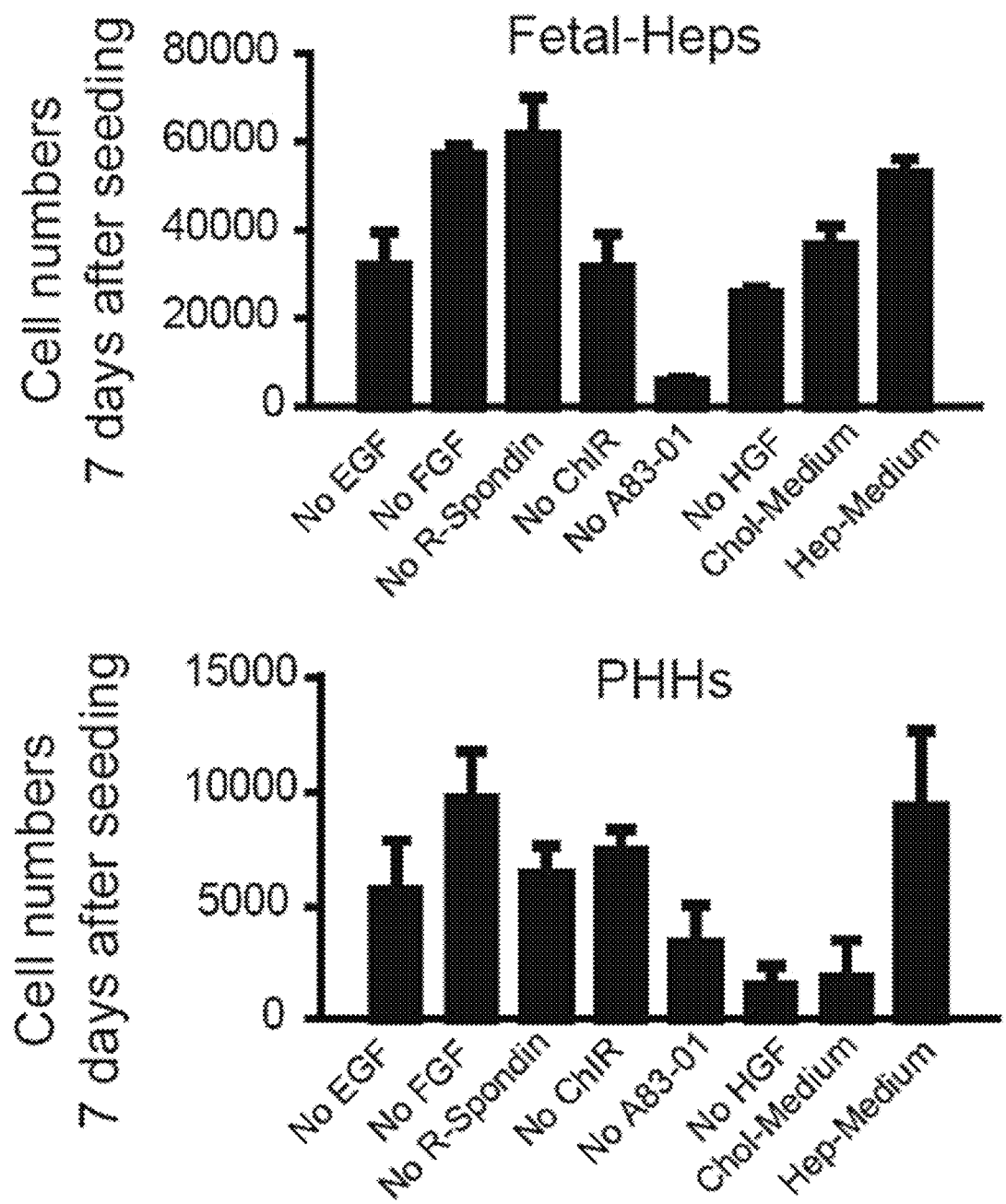
Figure 12B:
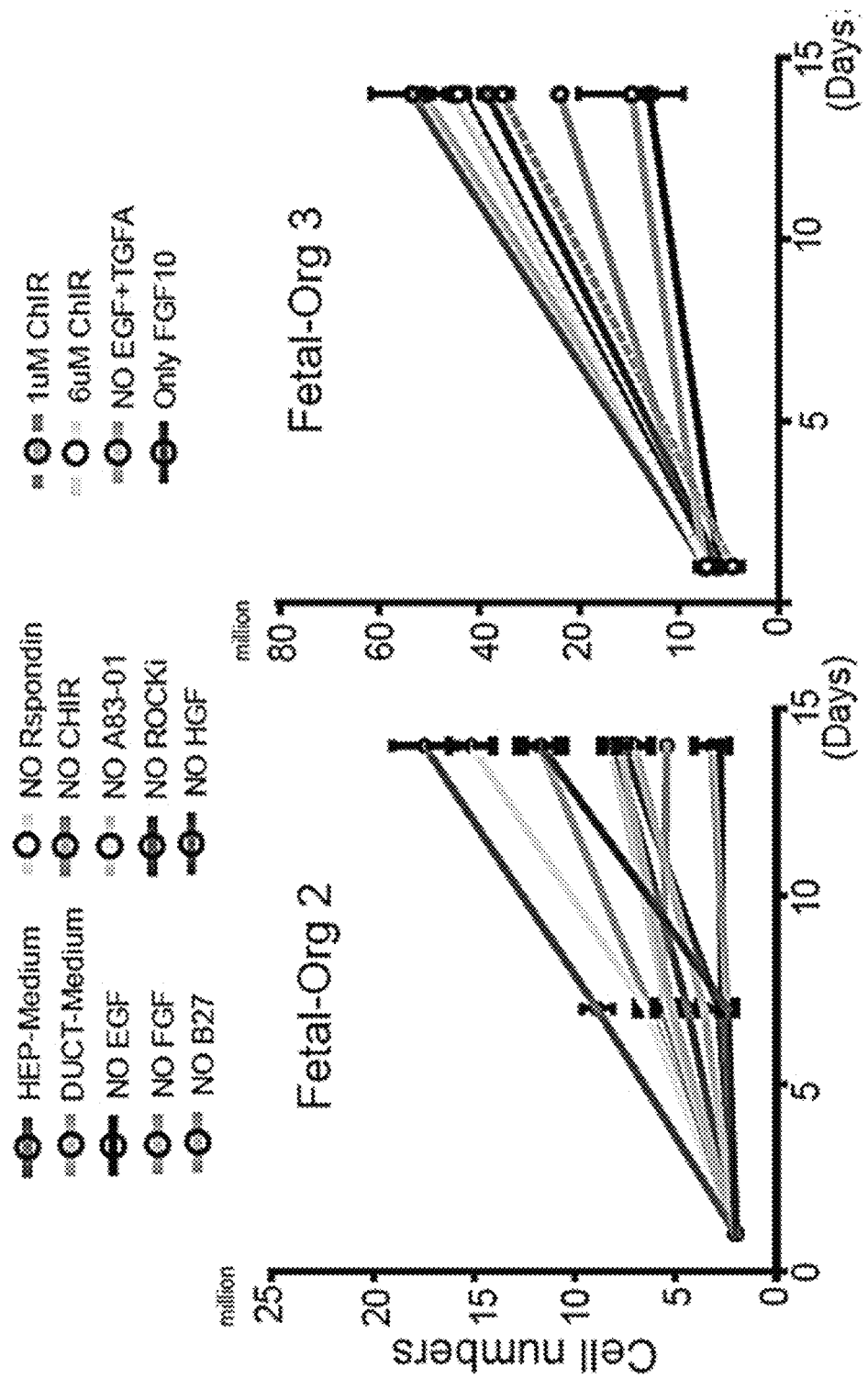
Figure 12G:
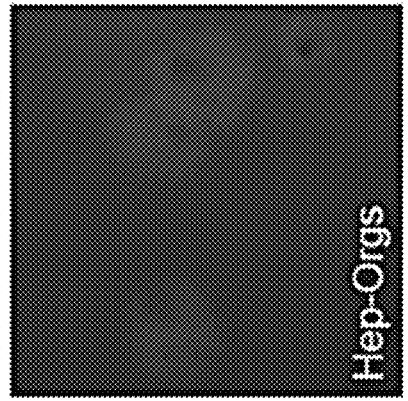
Figure 12E:
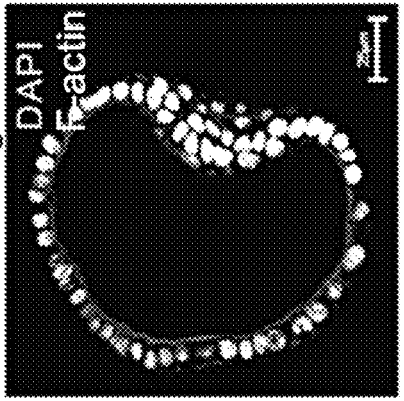
Figure 12C:
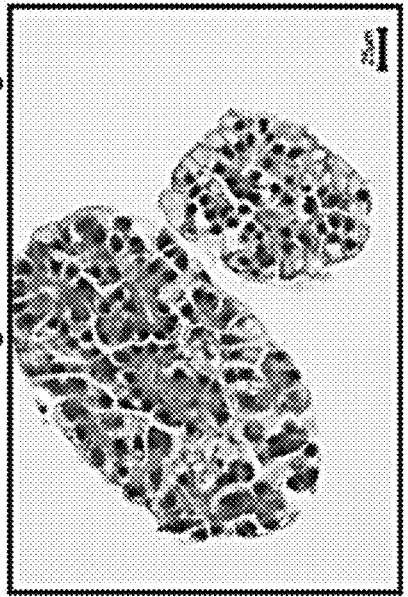

Example 7—Establishment and Characterization of Hepatocyte Organoids (Hep-Orgs) from Human Hepatocytes The Hep-Org medium was optimized for clonogenicity and expansion of human hepatocytes (Hep-Medium) (FIGS. 12A and 12B). We isolated human fetal liver cells from donor embryos of 11-20 weeks of gestation. Human fetal Hep-Orgs (Fetal-Orgs) could be established from 7 out of 8 fetal donor tissues, each displaying the typical grape-like structure (FIG. 5A). Five of these could be expanded for >16 passages and were still growing exponentially at a split ratio of 1:3 every 7-10 days at the time of manuscript resubmission. The longest culture is currently at Passage 28 (fetal origin: 18 weeks post gestation, 11 months of culture). We also established Hep-Orgs (PHH-Orgs) from cryopreserved pediatric and adult primary human hepatocytes (PHHs). These appeared to be more limited in their expansion times (2-2.5 months) yet yielded organoids of very similar composition when compared to the fetal cultures with plating efficiency of around 1% (FIGS. 5A and 5B). Unlike Chol-Orgs, human Hep-Orgs contained small lumina and consisted of large cells of hepatocyte morphology (FIG. 5C, FIGS. 12C-12E and Table 1). Human Hep-Orgs have a larger cell diameter than Chol-Orgs, and a lower nucleus/cytoplasm ratio (cell diameter/nucleus diameter: 30.08±8.17 μm/14.07±1.59 μm for Fetal-Orgs, 27.54±6.50 μm/11.69±1.64 μm for PHH-Orgs and 10.42±2.78/7.22±1.55 μm for Chol-Orgs). Transmission EM revealed an abundance of glycogen particles in the cytoplasm. Typical liver hepatocyte features included nuclei with prominent nucleoli with fibrillar centers and de-condensed chromatin, large numbers of mitochondria with few and short cristae, and individual cisternae of RER organized around them. Also, Golgi apparatus saccule stacks, bile canaliculi, tight junctions, peroxisomes, lysosomes, multi-vesicular bodies and autophagic vacuoles were present in human Hep-Orgs, closely resembling those of hepatocytes (FIGS. 5D and 5E).

Figure 12F:
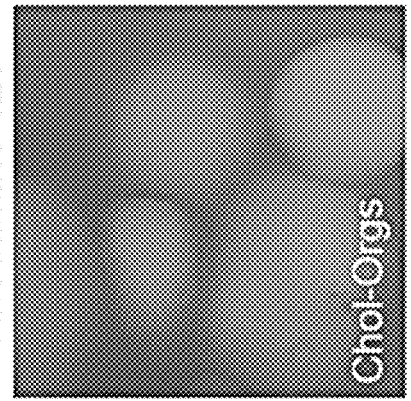
Figure 12F:
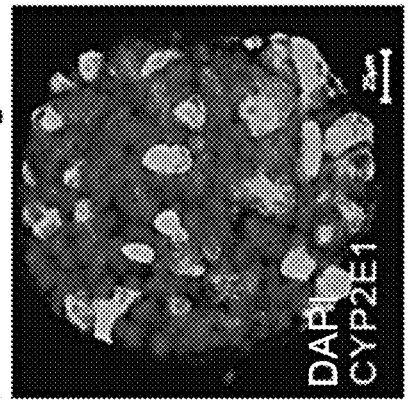
Figure 12D:
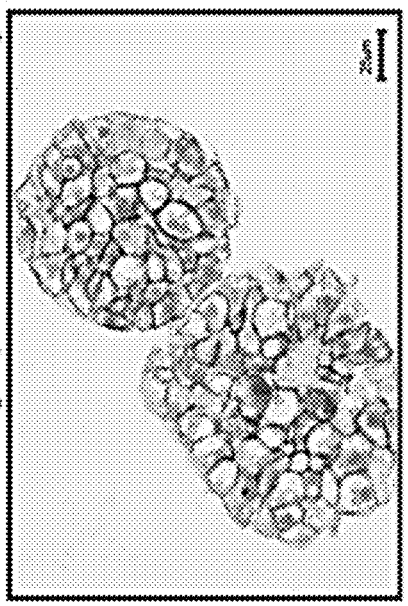
Figure 12I:
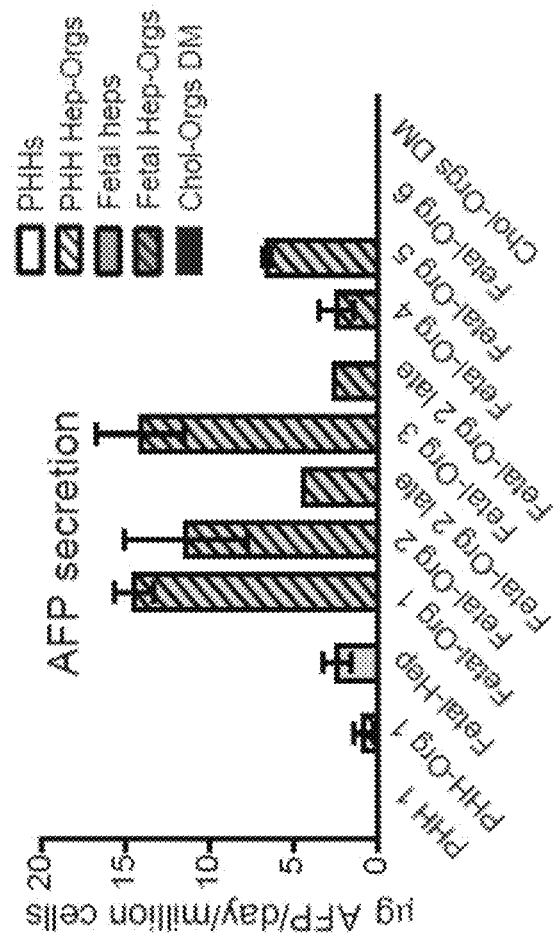
Figure 12H:
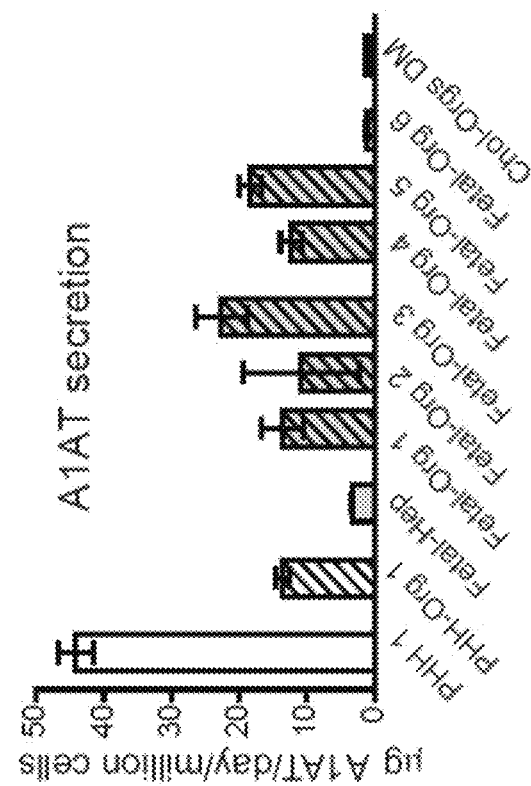

Fetal-Orgs abundantly expressed ALB and HNF4A, while a significant portion of cells expressed CYP2E1 (FIG. 5F and FIG. 12F). Striking networks of bile canaliculi were revealed by MRP2 staining (FIG. 5G). DiI-Ac-LDL and strong periodic acid-Schiff (PAS) staining in Fetal-Orgs indicated functional LDL uptake and confirmed glycogen accumulation (FIGS. 5H and 5I). Hep-Orgs did not demonstrate cholangiocyte function: Rhodamine123, a fluorescent substrate for the cholangiocyte surface glycoprotein multi-drug resistance protein-1 (MDR1), was actively transported into the lumen of Chol-Orgs but not of Hep-Orgs (FIG. S5G). Notably, albumin secretion by Hep-Orgs (6 fetal donors, 1 PHH donor) was comparable to that of PHHs (FIG. 5J). A1AT secretion by Hep-Orgs was 25%-50% of the level produced by PHHs (FIG. 12H). While ALB slightly increased with increasing Fetal-Org passage number (compare Fetal-Orgs 2 and 3 with Fetal-Orgs 2 late and 3 late in FIG. 5J), AFP secretion decreased over time (FIG. 12I). CYP3A4 activity in Hep-Orgs derived from PHHs was higher than that of PHHs, while activity in Fetal-Orgs was 2-8 fold lower than that of PHHs (FIG. 5K).

Figure 6A:
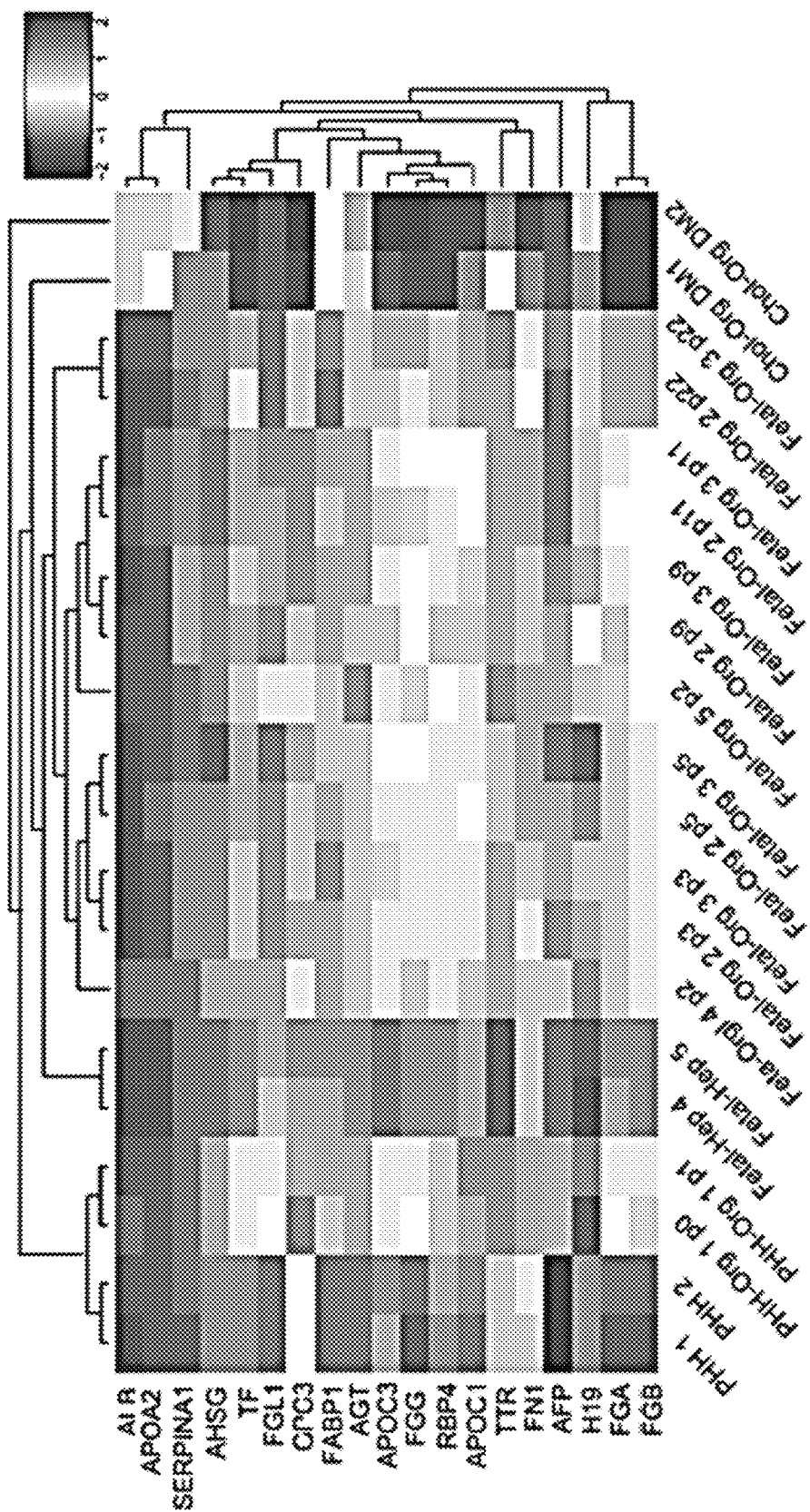
Figure 13A:
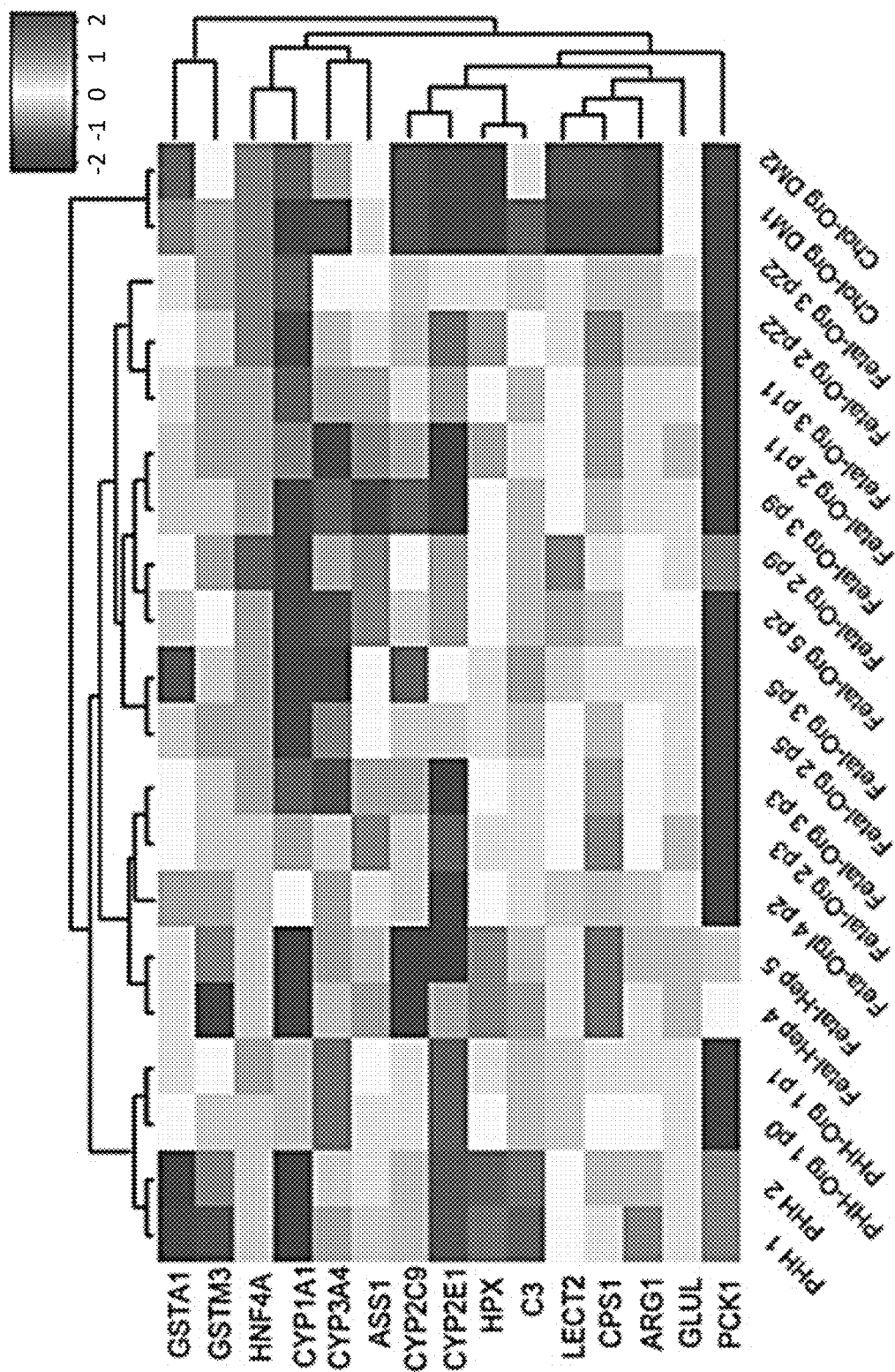
Figure 13B:
Figure 13C:
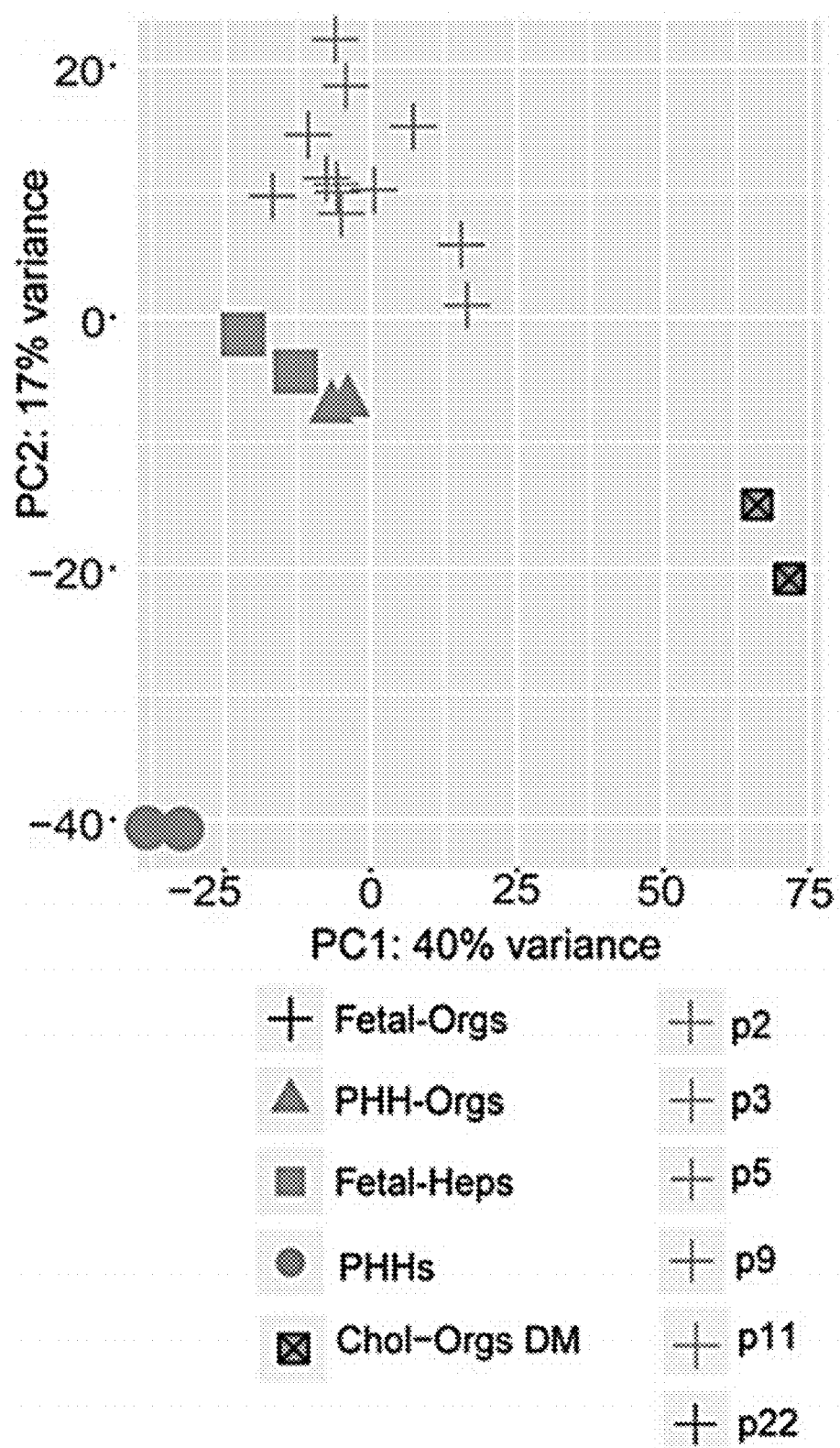

Bulk mRNA sequencing was performed to compare Fetal-Orgs of different passages and PHH-Orgs to Fetal-Heps and PHHs. The heatmap represents a broad array of hepatocyte genes such as ALB, APOA2 and SERPINA1 in Fetal-Orgs and PHH-Orgs that remained comparable to PHHs over multiple passages (FIG. 6A). Expression levels of functional hepatocyte genes (cytochrome P450 activity, glycogen/lipid metabolism and urea cycle) all displayed comparable expression levels between late passage Fetal-Orgs and PHH-Orgs with Fetal-Heps/PHHs (FIG. 13A). These levels were much higher than those of hepatocyte-like cells in Chol-Orgs after differentiation. By contrast, progenitor/cholangiocyte markers like EPCAM, SOX9, KRT8/18 and KRT7/19 remained higher in Chol-Orgs in differentiation medium (DM), when compared to Hep-Orgs (FIG. 13B). The PCA plot underscored the difference between Chol-Orgs in DM and Hep-Orgs. It is noted that PHH-Orgs re-express AFP (FIG. 6A) which makes PHH-Orgs closer to Fetal-Heps than to PHHs in the PCA plot (FIG. 13A and FIG. 13C).

Figure 6D:
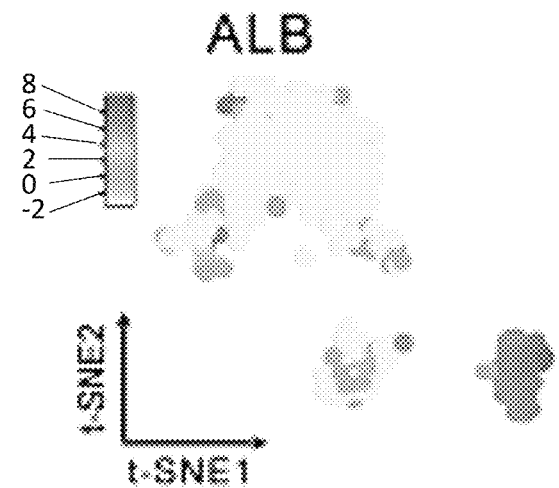
Figure 6E:
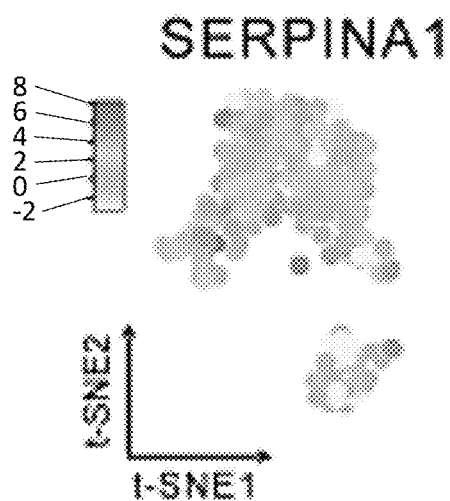
Figure 6E:
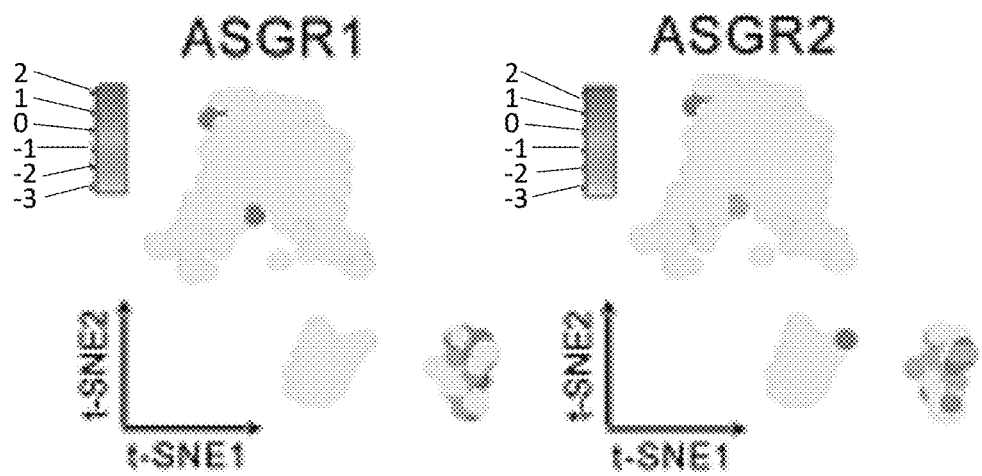
Figure 6F:
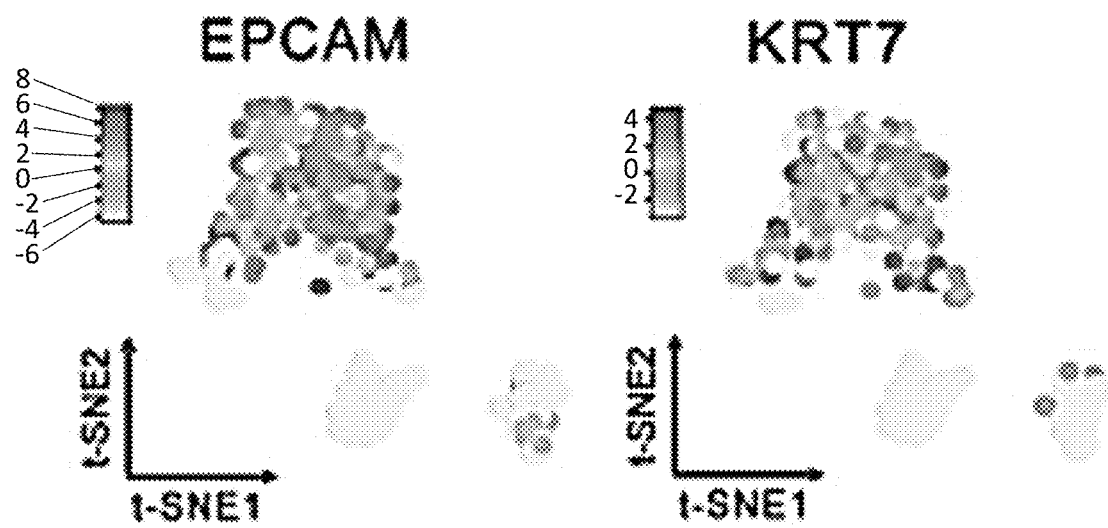
Figure 6G:
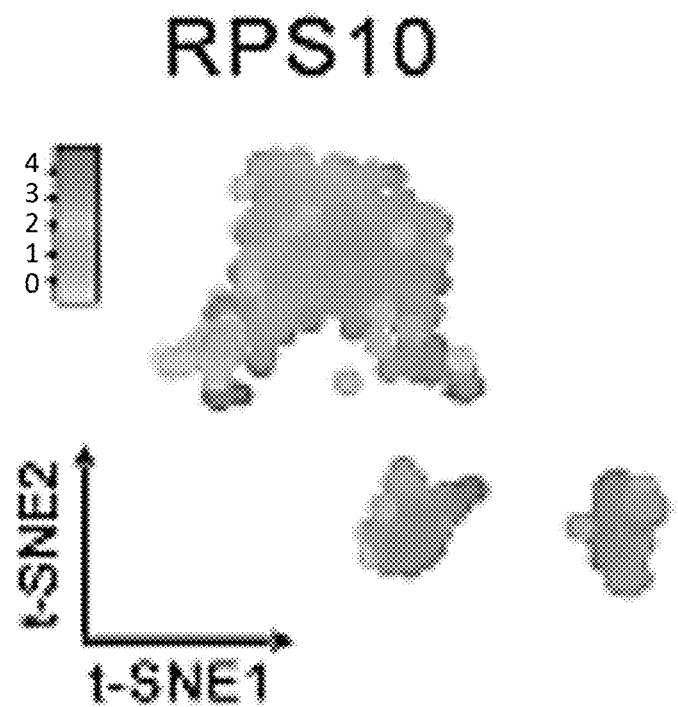

We then performed single-cell mRNA sequencing on 384 cells derived from Fetal-Orgs and 384 cells from human Chol-Orgs. After applying filtering criteria of a minimum of 4000 detected transcripts/cell, 161 and 197 cells were retained for analyses, respectively. Clustering analysis by RaceID2 on the combined Fetal-Orgs and Chol-Orgs datasets revealed six main clusters, as visualized in a t-SNE map (FIGS. 6B and 6C). Cluster i-iv cells almost exclusively derived from Fetal-Orgs. Marker expression analysis revealed that cluster i represented hepatocytes, marked for instance by high Albumin, SERPINA1 and ASGR (FIGS. 6D-6E and FIG. 13D). Cluster ii was defined by mesenchymal markers such as COL1A2 and FSTL1 (FIG. 13E). Cluster iii and iv expressed liver progenitor markers such as CD24 and IL32, while some cells were rich in mitochondrial gene mRNAs that are also highly expressed during liver regeneration. The large clusters v and vi expressed (early) cholangiocyte markers such as KRT19 and EPCAM (FIG. 6F). Indeed, almost all cells in these two clusters were derived from Chol-Orgs. Both Fetal-Orgs and Chol-Orgs cells expressed markers of proliferation (FIG. 6G and FIG. 13F).

Example 8—Hepatocyte Organoids (Hep-Orgs) from Human Hepatocytes can Engraft and Repopulate Damaged Liver We addressed whether human Hep-Orgs are able to engraft and repopulate damaged liver tissue. Since transplantability generally correlates with hepatocyte maturity, we defined a differentiation medium (DM, containing dexamethasone and oncostatin M) to increase maturation of Fetal-Orgs (Kamiya et al., 2001) (FIG. 14A). Fetal-Org line 2 (Passage 16) cells were seeded on collagen-coated plates for 5-7 days in DM (7-10 days). Subsequently, organoids were transplanted as single cells into immunodeficient Fah-/- NOD Rag1-/-Il2rg-/-(FNRG) mice (Aini et al., 2014; Billerbeck et al., 2016; Grompe, 2017) by splenic injection.

Figure 7B:
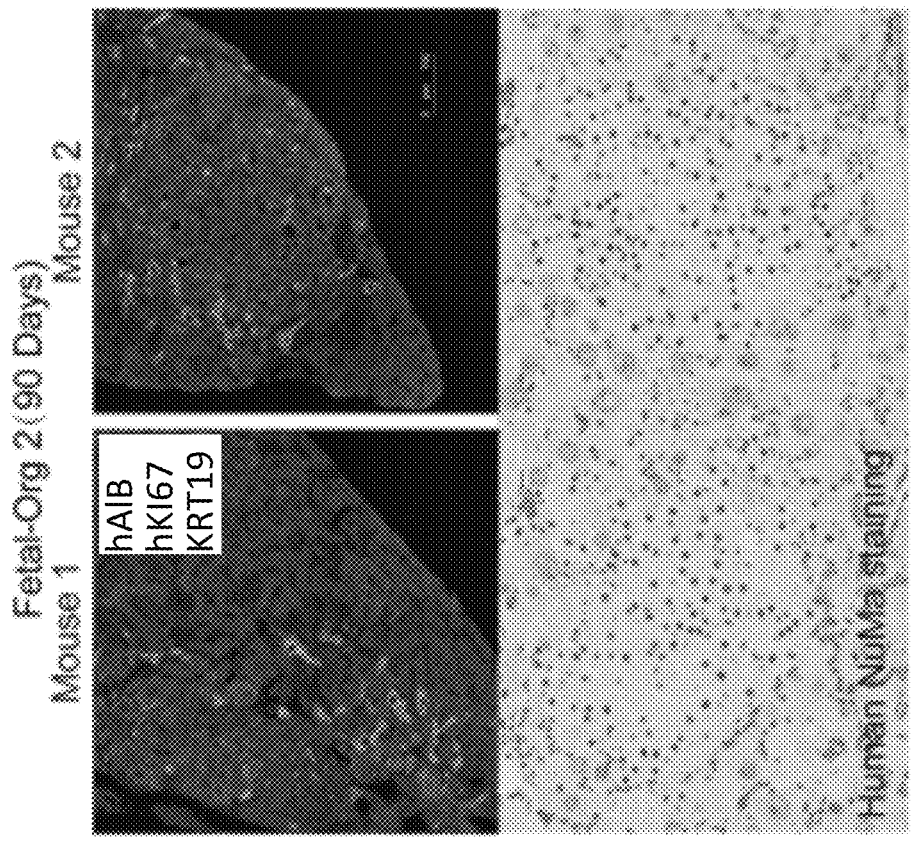
Figure 7A:
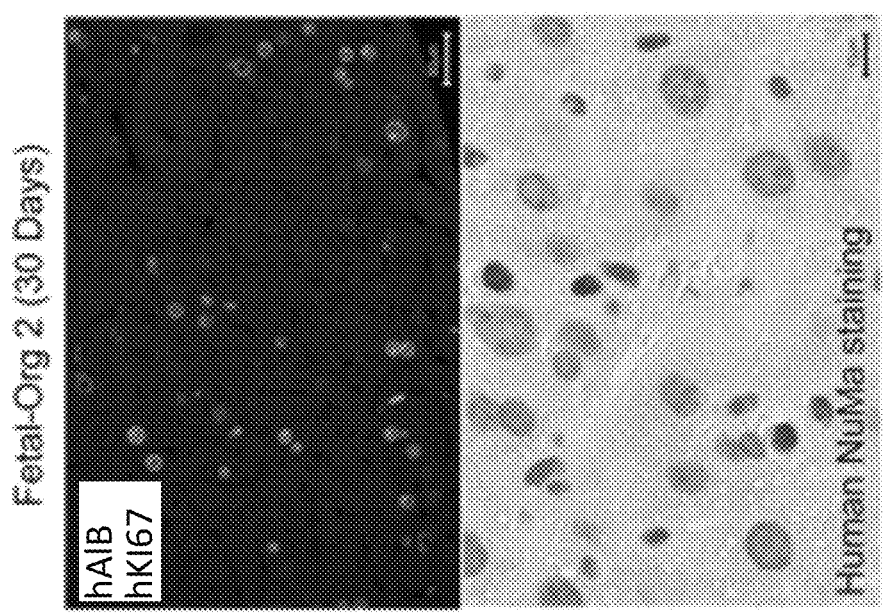
Figure 7C:
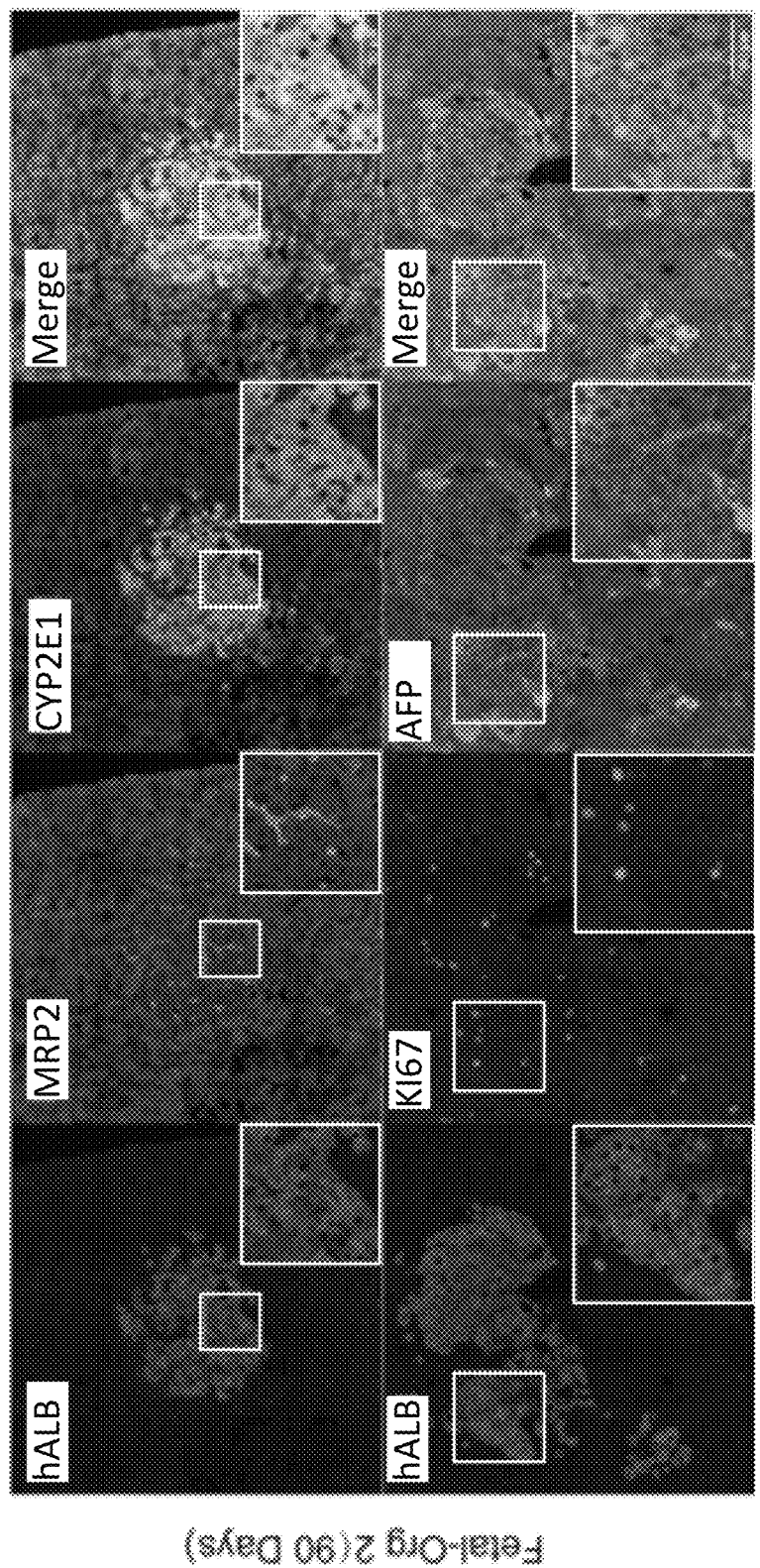
Figure 7D:
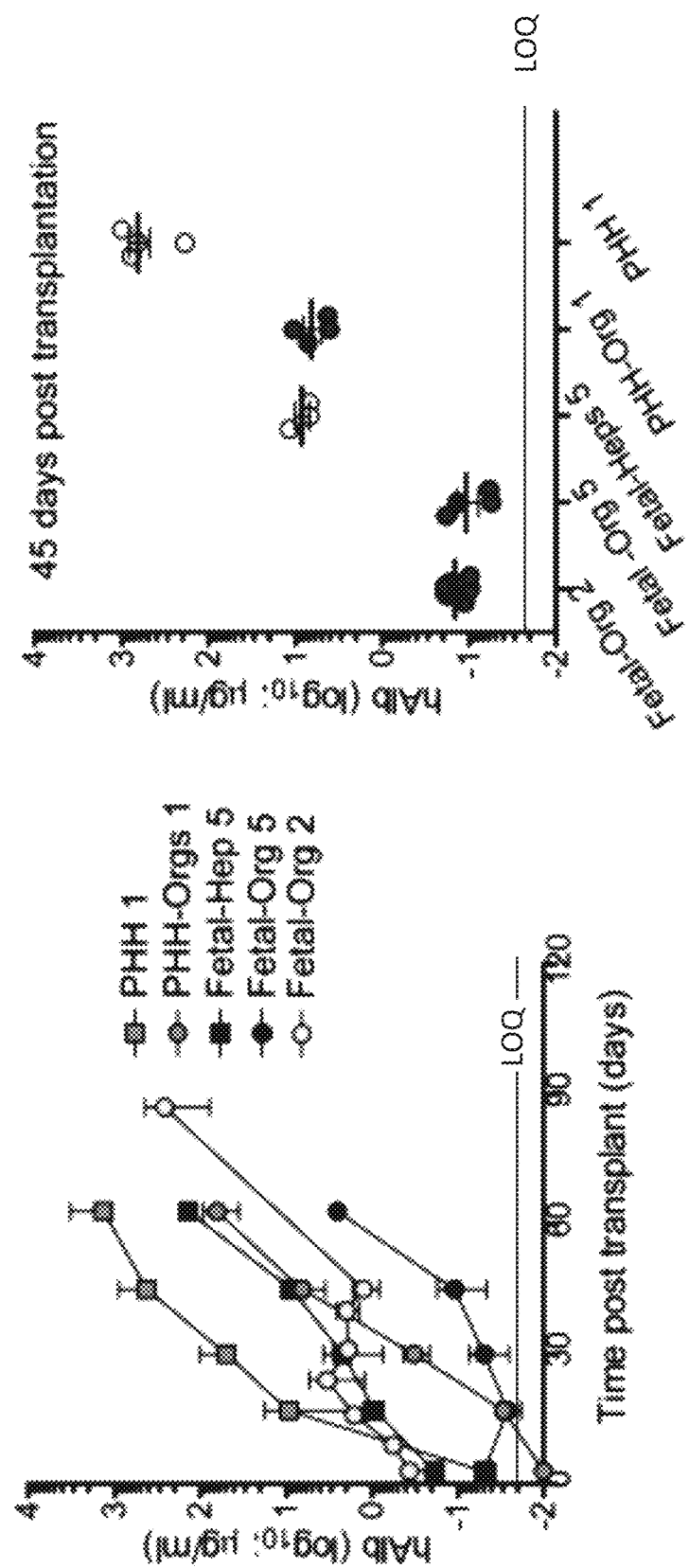
Figure 14D:
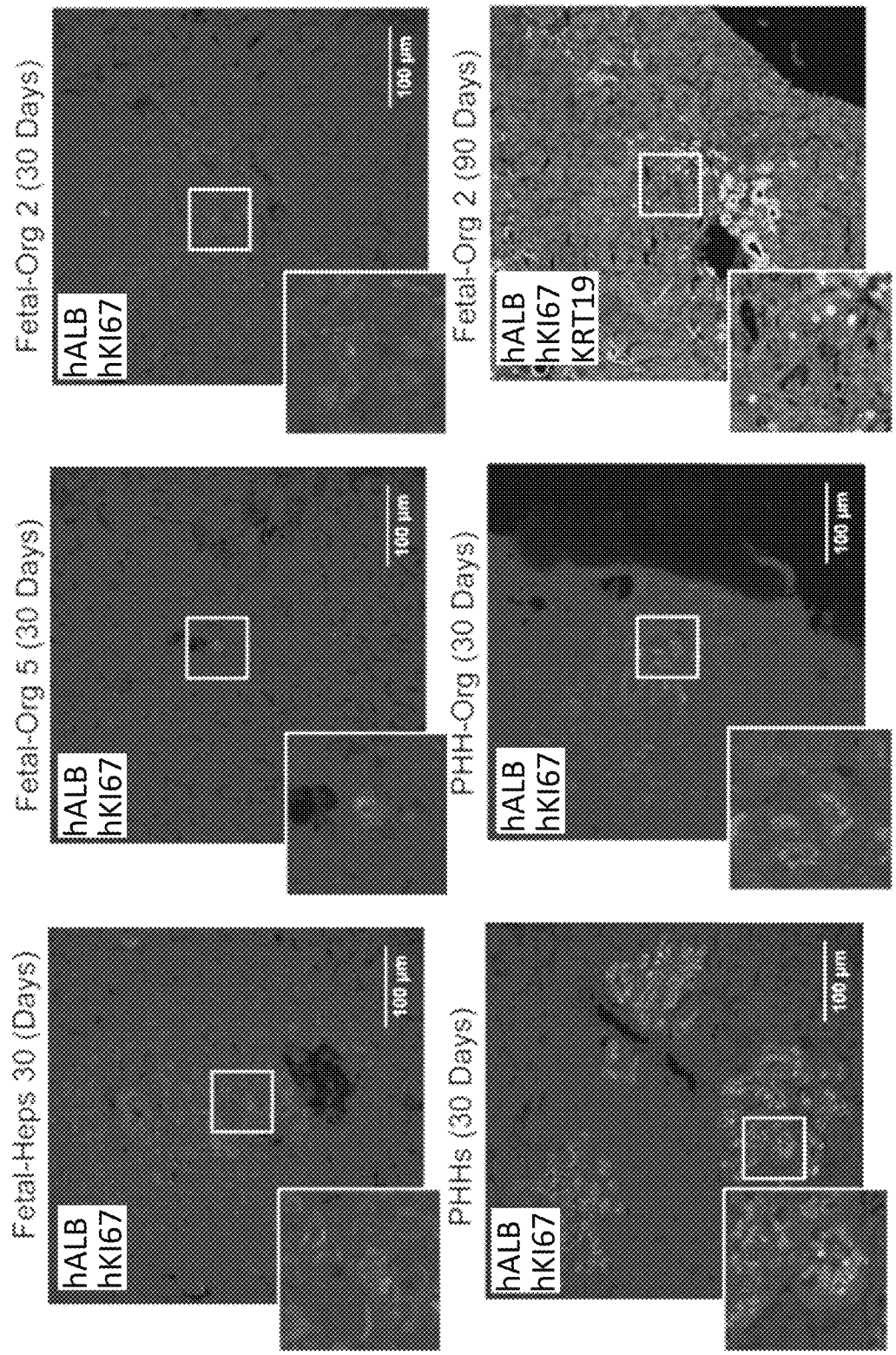

For the first 30 Days after transplantation, human ALB in mouse circulation remained stable and was clearly detectable in all mice that received Fetal-Orgs (FIG. 7D). Initial engraftment of small clusters of 1-2 cells was confirmed by human ALB and NuMa staining (Billerbeck et al, 2016) (FIG. 7A). Fetal-Heps of the same donor that were transplanted in parallel as positive control showed continuous increase in hAlb in the same time period and had formed bigger clusters at day 30 post transplantation. (FIGS. 7D and 14D). After day 30, however, the organoid graft started to proliferate more rapidly and expanded at the same rate as primary cells. 90 days after transplantation, serum hALB of Fetal-Orgs had risen 200-fold to more than 200 ug/ml on average. Clusters had grown significantly and demonstrated ongoing proliferation as confirmed by Ki67 staining and quantitative histology (FIGS. 7B and 14B). The repopulating grafts ('nodules') stained positive for ALB, MRP2 and CYP2E1, which indicated their functional maturity. (FIG. 7C) Almost none of the transplanted cell retained expression of AFP (fetal hepatocyte marker) and no KRT19 (cholangiocyte marker) could be detected within the graft (FIG. 7C and FIG. 14C). The same experiment was performed with an organoid culture grown from one pediatric PHH donor. Since we had access to hepatocytes and Hep-Orgs from the same donor, we were again able to compare engraftment side-by-side. Similar to Fetal-Orgs, mature organoid grafts showed an initial lag phase before proliferating at the same rate as primary hepatocyte controls (FIGS. 7D and 14D). Mature primary cells and organoids clearly outperformed their fetal counterparts in engraftment level and graft proliferation, which demonstrates the regenerative potential of Hep-Orgs and the faithful conservation of basic tissue features (e.g. transplantability) in organoid culture. In summary, our data show that Hep-Orgs are able to successfully repopulate damaged livers and demonstrate significant graft expansion after transplantation.

REFERENCES

Aini, W., Miyagawa-Hayashino, A., Ozeki, M., Adeeb, S., Hirata, M., Tamaki, K., Uemoto, S., and Haga, H. (2014). Accelerated telomere reduction and hepatocyte senescence in tolerated human liver allografts. Transpl Immunol 31, 55-59.

Bahar Halpern, K., Shenhav, R., Matcovitch-Natan, O., Toth, B., Lemze, D., Golan, M., Massasa, E. E., Baydatch, S., Landen, S., Moor, A. E., et al. (2017). Single-cell spatial reconstruction reveals global division of labour in the mammalian liver. Nature 542, 352-356.

Bartfeld, S., Bayram, T., van de Wetering, M., Huch, M., Begthel, H., Kujala, P., Vries, R., Peters, P. J., and Clevers, H. (2015). In vitro expansion of human gastric epithelial stem cells and their responses to bacterial infection. Gastroenterology 148, 126-136 e126.

Billerbeck, E., Mommersteeg, M. C., Shlomai, A., Xiao, J. W., Andrus, L., Bhatta, A., Vercauteren, K., Michailidis, E., Dorner, M., Krishnan, A., et al. (2016). Humanized mice efficiently engrafted with fetal hepatoblasts and syngeneic immune cells develop human monocytes and NK cells. J Hepatol 65, 334-343.

Broutier, L., Andersson-Rolf, A., Hindley, C. J., Boj, S. F., Clevers, H., Koo, B. K., and Huch, M. (2016). Culture and establishment of self-renewing human and mouse adult liver and pancreas 3D organoids and their genetic manipulation. Nat Protoc 11, 1724-1743.

Broutier, L., Mastrogiovanni, G., Verstegen, M. M., Francies, H. E., Gavarro, L. M., Bradshaw, C. R., Allen, G. E., Arnes-Benito, R., Sidorova, O., Gaspersz, M. P., et al. (2017). Human primary liver cancer-derived organoid cultures for disease modeling and drug screening. Nat Med 23, 1424-1435.

Burke, Z. D., Reed, K. R., Phesse, T. J., Sansom, O. J., Clarke, A. R., and Tosh, D. (2009). Liver zonation occurs through a beta-catenin-dependent, c-Myc-independent mechanism. Gastroenterology 136, 2316-2324 e2311-2313.

de La Coste, A., Romagnolo, B., Billuart, P., Renard, C. A., Buendia, M. A., Soubrane, O., Fabre, M., Chelly, J., Beldjord, C., Kahn, A., et al. (1998). Somatic mutations of the beta-catenin gene are frequent in mouse and human hepatocellular carcinomas. Proc Natl Acad Sci USA 95, 8847-8851.

Dolle, L., Theise, N. D., Schmelzer, E., Boulter, L., Gires, O., and van Grunsven, L. A. (2015). EpCAM and the biology of hepatic stem/progenitor cells. Am J Physiol Gastrointest Liver Physiol 308, G233-250.

Drost, J., Karthaus, W. R., Gao, D., Driehuis, E., Sawyers, C. L., Chen, Y., and Clevers, H. (2016). Organoid culture systems for prostate epithelial and cancer tissue. Nat Protoc 11, 347-358.

Duncan, A. W., Taylor, M. H., Hickey, R. D., Hanlon Newell, A. E., Lenzi, M. L., Olson, S. B., Finegold, M. J., and Grompe, M. (2010). The ploidy conveyor of mature hepatocytes as a source of genetic variation. Nature 467, 707-710.

Engelhardt, N. V., Lazareva, M. N., Abelev, G. I., Uryvaeva, I. V., Factor, V. M., and Brodsky, V. Y. (1976). Detection of alpha-foetoprotein in mouse liver differentiated hepatocytes before their progression through S phase. Nature 263, 146-148.

Evarts, R. P., Nagy, P., Marsden, E., and Thorgeirsson, S. S. (1987). A precursor-product relationship exists between oval cells and hepatocytes in rat liver. Carcinogenesis 8, 1737-1740.

Fan, B., Malato, Y., Calvisi, D. F., Naqvi, S., Razumilava, N., Ribback, S., Gores, G. J., Dombrowski, F., Evert, M., Chen, X., et al. (2012). Cholangiocarcinomas can originate from hepatocytes in mice. J Clin Invest 122, 2911-2915.

Font-Burgada, J., Shalapour, S., Ramaswamy, S., Hsueh, B., Rossell, D., Umemura, A., Taniguchi, K., Nakagawa, H., Valasek, M. A., Ye, L., et al. (2015). Hybrid Periportal Hepatocytes Regenerate the Injured Liver without Giving Rise to Cancer. Cell 162, 766-779.

Furuyama, K., Kawaguchi, Y., Akiyama, H., Horiguchi, M., Kodama, S., Kuhara, T., Hosokawa, S., Elbahrawy, A., Soeda, T., Koizumi, M., et al. (2011). Continuous cell supply from a Sox9-expressing progenitor zone in adult liver, exocrine pancreas and intestine. Nat Genet 43, 34-41.

Greene, A. K., and Puder, M. (2003). Partial hepatectomy in the mouse: technique and perioperative management. J Invest Surg 16, 99-102.

Grompe, M. (2014). Liver stem cells, where art thou? Cell Stem Cell 15, 257-258.

Grompe, M. (2017). Fah Knockout Animals as Models for Therapeutic Liver Repopulation. Adv Exp Med Biol 959, 215-230.

Grun, D., Lyubimova, A., Kester, L., Wiebrands, K., Basak, O., Sasaki, N., Clevers, H., and van Oudenaarden, A. (2015). Single-cell messenger RNA sequencing reveals rare intestinal cell types. Nature 525, 251-255.

Hashimshony, T., Senderovich, N., Avital, G., Klochendler, A., de Leeuw, Y., Anavy, L., Gennert, D., Li, S., Livak, K. J., Rozenblatt-Rosen, O., et al. (2016). CEL-Seq2: sensitive highly-multiplexed single-cell RNA-Seq. Genome Biol 17, 77.

Huang, P., He, Z., Ji, S., Sun, H., Xiang, D., Liu, C., Hu, Y., Wang, X., and Hui, L. (2011). Induction of functional hepatocyte-like cells from mouse fibroblasts by defined factors. Nature 475, 386-389.

Huang, P., Zhang, L., Gao, Y., He, Z., Yao, D., Wu, Z., Cen, J., Chen, X., Liu, C., Hu, Y., et al. (2014). Direct reprogramming of human fibroblasts to functional and expandable hepatocytes. Cell Stem Cell 14, 370-384.

Huch, M., and Clevers, H. (2011). Sox9 marks adult organ progenitors. Nat Genet 43, 9-10.

Huch, M., Dorrell, C., Boj, S. F., van Es, J. H., Li, V. S., van de Wetering, M., Sato, T., Hamer, K., Sasaki, N., Finegold, M. J., et al. (2013). In vitro expansion of single Lgr5+ liver stem cells induced by Wnt-driven regeneration. Nature 494, 247-250.

Huch, M., Gehart, H., van Boxtel, R., Hamer, K., Blokzijl, F., Verstegen, M. M., Ellis, E., van Wenum, M., Fuchs, S. A., de Ligt, J., et al. (2015). Long-term culture of genome-stable bipotent stem cells from adult human liver. Cell 160, 299-312.

Kamiya, A., Kinoshita, T., and Miyajima, A. (2001). Oncostatin M and hepatocyte growth factor induce hepatic maturation via distinct signaling pathways. FEBS Lett 492, 90-94.

Katsuda, T., Kawamata, M., Hagiwara, K., Takahashi, R. U., Yamamoto, Y., Camargo, F. D., and Ochiya, T. (2017). Conversion of Terminally Committed Hepatocytes to Culturable Bipotent Progenitor Cells with Regenerative Capacity. Cell Stem Cell 20, 41-55.

Khetani, S. R., and Bhatia, S. N. (2008). Microscale culture of human liver cells for drug development. Nat Biotechnol 26, 120-126.

Levy, G., Bomze, D., Heinz, S., Ramachandran, S. D., Noerenberg, A., Cohen, M., Shibolet, O., Sklan, E., Braspenning, J., and Nahmias, Y. (2015). Long-term culture and expansion of primary human hepatocytes. Nat Biotechnol 33, 1264-1271.

Li, B., Dorrell, C., Canaday, P. S., Pelz, C., Haft, A., Finegold, M., and Grompe, M. (2017). Adult Mouse Liver Contains Two Distinct Populations of Cholangiocytes. Stem Cell Reports 9, 478-489.

Li, F., Liu, P., Liu, C., Xiang, D., Deng, L., Li, W., Wangensteen, K., Song, J., Ma, Y., Hui, L., et al. (2010a). Hepatoblast-like progenitor cells derived from embryonic stem cells can repopulate livers of mice. Gastroenterology 139, 2158-2169 e2158.

Li, W. C., Ralphs, K. L., and Tosh, D. (2010b). Isolation and culture of adult mouse hepatocytes. Methods Mol Biol 633, 185-196.

Liang, G., and Zhang, Y. (2013). Genetic and epigenetic variations in iPSCs: potential causes and implications for application. Cell Stem Cell 13, 149-159.

Lin, S., Nascimento, E. M., Gajera, C. R., Chen, L., Neuhofer, P., Garbuzov, A., Wang, S., and Artandi, S. E. (2018). Distributed hepatocytes expressing telomerase repopulate the liver in homeostasis and injury. Nature 556, 244-248.

Liu, Y., Cao, L., Chen, R., Zhou, X., Fan, X., Liang, Y., Jia, R., Wang, H., Liu, G., Guo, Y., et al. (2015). Osteopontin Promotes Hepatic Progenitor Cell Expansion and Tumorigenicity via Activation of beta-Catenin in Mice. Stem Cells 33, 3569-3580.

Love, M. I., Huber, W., and Anders, S. (2014). Moderated estimation of fold change and dispersion for RNA-seq data with DESeq2. Genome Biol 15, 550.

Lund, R. J., Narva, E., and Lahesmaa, R. (2012). Genetic and epigenetic stability of human pluripotent stem cells. Nat Rev Genet 13, 732-744.

Malato, Y., Naqvi, S., Schurmann, N., Ng, R., Wang, B., Zape, J., Kay, M. A., Grimm, D., and Willenbring, H. (2011). Fate tracing of mature hepatocytes in mouse liver homeostasis and regeneration. J Clin Invest 121, 4850-4860.

Marquardt, J. U., Andersen, J. B., and Thorgeirsson, S. S. (2015). Functional and genetic deconstruction of the cellular origin in liver cancer. Nat Rev Cancer 15, 653-667.

Michalopoulos, G. K. (2010). Liver regeneration after partial hepatectomy: critical analysis of mechanistic dilemmas. Am J Pathol 176, 2-13.

Miyajima, A., Tanaka, M., and Itoh, T. (2014). Stem/progenitor cells in liver development, homeostasis, regeneration, and reprogramming. Cell Stem Cell 14, 561-574.

Nakamura, T., Nishizawa, T., Hagiya, M., Seki, T., Shimonishi, M., Sugimura, A., Tashiro, K., and Shimizu, (1989). Molecular cloning and expression of human hepatocyte growth factor. Nature 342, 440-443.

Nault, J. C., Mallet, M., Pilati, C., Calderaro, J., Bioulac-Sage, P., Laurent, C., Laurent, A., Cherqui, D., Balabaud, C., and Zucman-Rossi, J. (2013). High frequency of telomerase reverse-transcriptase promoter somatic mutations in hepatocellular carcinoma and preneoplastic lesions. Nat Commun 4, 2218.

Planas-Paz, L., Orsini, V., Boulter, L., Calabrese, D., Pikiolek, M., Nigsch, F., Xie, Y., Roma, G., Donovan, A., Marti, P., et al. (2016). The RSPO-LGR4/5-ZNRF3/RNF43 module controls liver zonation and size. Nat Cell Biol 18, 467-479.

Raven, A., Lu, W. Y., Man, T. Y., Ferreira-Gonzalez, S., O'Duibhir, E., Dwyer, B. J., Thomson, J. P., Meehan, R. R., Bogorad, R., Koteliansky, V., et al. (2017). Cholangiocytes act as facultative liver stem cells during impaired hepatocyte regeneration. Nature 547, 350-354.

Sato, T., Stange, D. E., Ferrante, M., Vries, R. G., Van Es, J. H., Van den Brink, S., Van Houdt, W. J., Pronk, A., Van Gorp, J., Siersema, P. D., et al. (2011). Long-term expansion of epithelial organoids from human colon, adenoma, adenocarcinoma, and Barrett's epithelium. Gastroenterology 141, 1762-1772.

Schaub, J. R., Malato, Y., Gormond, C., and Willenbring, H. (2014). Evidence against a stem cell origin of new hepatocytes in a common mouse model of chronic liver injury. Cell Rep 8, 933-939.

Schuler, M., Dierich, A., Chambon, P., and Metzger, D. (2004). Efficient temporally controlled targeted somatic mutagenesis in hepatocytes of the mouse. Genesis 39, 167-172.

Sekiya, S., and Suzuki, A. (2011). Direct conversion of mouse fibroblasts to hepatocyte-like cells by defined factors. Nature 475, 390-393.

Sekiya, S., and Suzuki, A. (2014). Hepatocytes, rather than cholangiocytes, can be the major source of primitive ductules in the chronically injured mouse liver. Am J Pathol 184, 1468-1478.

Sell, S., Nichols, M., Becker, F. F., and Leffert, H. L. (1974). Hepatocyte proliferation and alpha 1-fetoprotein in pregnant, neonatal, and partially hepatectomized rats. Cancer Res 34, 865-871.

Si-Tayeb, K., Noto, F. K., Nagaoka, M., Li, J., Battle, M. A., Duris, C., North, P. E., Dalton, S., and Duncan, (2010).

Highly efficient generation of human hepatocyte-like cells from induced pluripotent stem cells. Hepatology 51, 297-305.

Stanger, B. Z. (2015). Cellular homeostasis and repair in the mammalian liver. Annu Rev Physiol 77, 179-200.

Swenson, E. S. (2012). Direct conversion of mouse fibroblasts to hepatocyte-like cells using forced expression of endodermal transcription factors. Hepatology 55, 316-318.

Tanimizu, N., Nishikawa, Y., Ichinohe, N., Akiyama, H., and Mitaka, T. (2014). Sry HMG box protein 9-positive (Sox9+) epithelial cell adhesion molecule-negative (Ep-CAM-) biphenotypic cells derived from hepatocytes are involved in mouse liver regeneration. J Biol Chem 289, 7589-7598.

Tarlow, B. D., Pelz, C., Naugler, W. E., Wakefield, L., Wilson, E. M., Finegold, M. J., and Grompe, M. (2014). Bipotential adult liver progenitors are derived from chronically injured mature hepatocytes. Cell Stem Cell 15, 605-618.

van Amerongen, R., Bowman, A. N., and Nusse, R. (2012). Developmental stage and time dictate the fate of Wnt/beta-catenin-responsive stem cells in the mammary gland. Cell Stem Cell 11, 387-400.

Verma, S., Tachtatzis, P., Penrhyn-Lowe, S., Scarpini, C., Jurk, D., Von Zglinicki, T., Coleman, N., and Alexander, G. J. (2012). Sustained telomere length in hepatocytes and cholangiocytes with increasing age in normal liver. Hepatology 56, 1510-1520.

Wang, B., Zhao, L., Fish, M., Logan, C. Y., and Nusse, R. (2015). Self-renewing diploid Axin2(+) cells fuel homeostatic renewal of the liver. Nature 524, 180-185.

Yanger, K., Knigin, D., Zong, Y., Maggs, L., Gu, G., Akiyama, H., Pikarsky, E., and Stanger, B. Z. (2014). Adult hepatocytes are generated by self-duplication rather than stem cell differentiation. Cell Stem Cell 15, 340-349.

Yanger, K., Zong, Y., Maggs, L. R., Shapira, S. N., Maddipati, R., Aiello, N. M., Thung, S. N., Wells, R. G., Greenbaum, L. E., and Stanger, B. Z. (2013). Robust cellular reprogramming occurs spontaneously during liver regeneration. Genes Dev 27, 719-724.

Yokoyama, H. O., Wilson, M. E., Tsuboi, K. K., and Stowell, R. E. (1953). Regeneration of mouse liver after partial hepatectomy. Cancer Res 13, 80-85.

Zhu, S., Rezvani, M., Harbell, J., Mattis, A. N., Wolfe, A. R., Benet, L. Z., Willenbring, H., and Ding, S. (2014). Mouse liver repopulation with hepatocytes generated from human fibroblasts. Nature 508, 93-97.

The invention claimed is:

1. A method for expanding hepatocytes in vitro to form a hepatocyte organoid, wherein the method comprises culturing isolated primary hepatocytes in a hepatocyte culture medium, wherein the hepatocyte culture medium comprises:
   i) 50 to 500 ng/ml of a Fibroblast Growth Factor (FGF) selected from FGF7, FGF10, and a combination thereof;
   ii) a Wnt agonist comprising an R-spondin selected from R-spondin 1, R-spondin 2, R-spondin 3, and R-spondin 4; and at least one glycogen synthase kinase 3 (GSK3) inhibitor;
   iii) 5 to 100 ng/ml of epidermal growth factor (EGF);
   iv) 5 to 100 ng/ml of hepatocyte growth factor (HGF); and
   v) a transforming growth factor beta (TGF-β) inhibitor, comprising an inhibitor of activin receptor-like kinase ALK4, ALK5 and/or ALK7 signalling pathway;

wherein the hepatocyte organoid is formed, wherein the hepatocyte organoid does not express KRT7 and KRT19, and wherein the hepatocyte organoid expresses albumin.

2. The method of claim 1, wherein:
   (a) the R-spondin is at a concentration of 5%-50% (vol/vol) within the hepatocyte culture medium;
   (b) the GSK3 inhibitor is at a concentration of 1 to 10 µM, and wherein the GSK3 inhibitor is selected from: CHIR99021, SB216763, TWS119, 5-bromoindole, SB415286, BIO, AZD2858, AZD1080, AR-A014418, TDZD-8, LY2090314, BIO-acetoxime, 1-Azakenpaullone, and a combination thereof;
   (c) the hepatocyte culture medium comprises FGF7 at a concentration of 50 to 400 ng/ml;
   (d) the hepatocyte culture medium comprises FGF10 at a concentration of 50 to 400 ng/ml;
   (e) the EGF is at a concentration of 10 ng/ml to 100 ng/ml;
   (f) the HGF is at a concentration of 10 ng/ml to 100 ng/ml;
   (g) wherein the TGF-β inhibitor is at a concentration of 1 to 10 µM, 0.5 to 5 µM, 1 to 4 µM, 1 to 3 µM, or about 2 µM; and/or
   (h) the TGF-β inhibitor is an inhibitor of activin receptor-like kinase ALK4, ALK5 and/or ALK7 selected from: A83-01, SB-431542, SB-505124, EW-7197, LY-2157299, GW6604, and a combination thereof.

3. The method of claim 1, wherein:
   (a) R-spondin 1 is at a concentration of about 15%;
   (b) the GSK inhibitor is CHIR99021 at a concentration of about 3 µM; and/or
   (c) the inhibitor of activin receptor-like kinase ALK4, ALK5 and/or ALK7 signaling pathway is A83-01 at a concentration of about 2 µM.

4. The method of claim 1, wherein the hepatocyte culture medium further comprises:
   (a) nicotinamide at a concentration of 1 to 100 mM;
   (b) gastrin at a concentration of 1 to 100 nM;
   (c) transforming growth factor alpha (TGF-α) at a concentration of 1 to 50 ng/ml;
   (d) a Rho-associated protein kinase (ROCK) inhibitor selected from: Y-27632, GSK429286A, Fasudil, Thiazovivin, Rho Kinase Inhibitor IV and a combination thereof, wherein the ROCK inhibitor is at a concentration of 1 to 50 µM;
   (e) N-acetylcysteine, wherein the N-acetylcysteine is at a concentration of 0.5 to 5 mM; and/or
   (f) a cell growth medium.

5. The method of claim 1, wherein the hepatocyte culture medium does not comprise a cAMP pathway activator.

6. The method of claim 1, wherein the hepatocytes are cultured in contact with a three dimensional extracellular matrix (ECM) in the presence of the hepatocyte culture medium.

7. The method of claim 6, wherein the three dimensional extracellular matrix is selected from: a synthetic ECM, a natural ECM, and a combination thereof.

8. The method of claim 1, wherein the hepatocytes comprise cells selected from: fetal hepatocytes, adult hepatocytes, and a combination thereof.

9. The method of claim 1, further comprising:
   (a) expanding the hepatocyte organoids in culture for at least 10 passages; and/or
   (b) expanding the hepatocyte organoids in culture for at least 3 months.

10. The method of claim 1, wherein:
(a) the hepatocyte organoids comprise a lumen; and/or
(b) the hepatocyte organoids secrete at least one of albumin, alpha-1 antitrypsin (A1AT), alpha-fetoglobulin (Afp), and a combination thereof.

11. A method for expanding hepatocytes in vitro to form a hepatocyte organoid, wherein the method comprises culturing isolated primary hepatocytes in a hepatocyte culture medium,
wherein the hepatocyte culture medium comprises: about 100 ng/ml FGF7; about 100 ng/ml FGF10; about 20 ng/ml TGFa; about 50 ng/ml EGF; about 50 ng/ml HGF; about 2 μM A83-01; about 10 μM Y-27632; about 3 μM CHIR99021; about 10 mM nicotinamide; about 10 nM gastrin; about 1.25 mM N-acetylcysteine; and about 15% R-spondin conditioned medium;
wherein the hepatocyte organoid is formed,
wherein the hepatocyte organoid does not express KRT7 and KRT19, and
wherein the hepatocyte organoid expresses albumin.

* * * * *